US012362461B2

(12) United States Patent
Li et al.

(10) Patent No.: US 12,362,461 B2
(45) Date of Patent: Jul. 15, 2025

(54) BASE STATION ANTENNAS HAVING AT LEAST ONE GRID REFLECTOR AND RELATED DEVICES

(71) Applicant: Outdoor Wireless Networks LLC, Claremont, NC (US)

(72) Inventors: Haifeng Li, Richardson, TX (US); Peter J. Bisiules, LaGrange Park, IL (US); Ruixin Su, Jiangsu (CN); Bo Wu, Jiangsu (CN); PuLiang Tang, Jiangsu (CN); Nengbin Liu, Jiangsu (CN); Pengfei Guo, Jiangsu (CN); Xun Zhang, Jiangsu (CN); Yutong Liu, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 17/787,619

(22) PCT Filed: Mar. 14, 2022

(86) PCT No.: PCT/CN2022/080578
§ 371 (c)(1),
(2) Date: Mar. 9, 2023

(87) PCT Pub. No.: WO2023/029431
PCT Pub. Date: Mar. 9, 2023

(65) Prior Publication Data

US 2024/0186711 A1 Jun. 6, 2024

Related U.S. Application Data

(60) Provisional application No. 63/254,446, filed on Oct. 11, 2021.

(30) Foreign Application Priority Data

Aug. 31, 2021 (CN) ........................ 202122068204.7

(51) Int. Cl.
*H01Q 1/24* (2006.01)
*H01Q 5/45* (2015.01)
(Continued)

(52) U.S. Cl.
CPC ............... *H01Q 1/246* (2013.01); *H01Q 5/45* (2015.01); *H01Q 15/0013* (2013.01); *H01Q 19/108* (2013.01); *H01Q 21/062* (2013.01)

(58) Field of Classification Search
CPC H01Q 1/246; H01Q 5/40; H01Q 5/42; H01Q 5/45; H01Q 5/48; H01Q 15/0013;
(Continued)

(56) References Cited

U.S. PATENT DOCUMENTS 5,184,145 A 2/1993 Devillers et al.
5,451,969 A 9/1995 Toth et al.
(Continued)

FOREIGN PATENT DOCUMENTS

CN 1886864 A 12/2006
CN 100492763 C 5/2009
(Continued)

OTHER PUBLICATIONS

Communication pursuant to Article 94(3) EPC corresponding to European Patent Application No. 22712791.7 (14 pages) (dated May 2, 2024).
(Continued)

*Primary Examiner* — Robert Karacsony
(74) *Attorney, Agent, or Firm* — Myers Bigel, P.A.

(57) ABSTRACT

Base station antennas include at least one passive internal grid reflector with an array of low band radiating elements projecting forward of a front one of the at least one grid reflector. A mMIMO antenna array resides behind a back one
(Continued)

of the at least one grid reflector and is configured to transmit signal through the grid reflector and out a front radome of the base station antenna.

20 Claims, 35 Drawing Sheets

(51) Int. Cl.
*H01Q 15/00* (2006.01)
*H01Q 19/10* (2006.01)
*H01Q 21/06* (2006.01)

(58) Field of Classification Search
CPC . H01Q 15/0026; H01Q 19/108; H01Q 21/062
See application file for complete search history.

(56) References Cited

U.S. PATENT DOCUMENTS

| | | | |
|---|---|---|---|
| 5,982,339 | A | 11/1999 | Lalezari et al. |
| 6,025,812 | A | 2/2000 | Gabriel et al. |
| 6,339,047 | B1 | 1/2002 | Christopherson et al. |
| 6,388,637 | B1 | 5/2002 | Davis |
| 6,831,615 | B2 | 12/2004 | Goettl |
| 7,679,576 | B2 | 3/2010 | Riedel et al. |
| 7,907,096 | B2 | 3/2011 | Timofeev et al. |
| 7,999,752 | B2 | 8/2011 | Riedel |
| 10,396,460 | B2 | 8/2019 | Kosaka et al. |
| 11,070,269 | B2 | 7/2021 | Lee et al. |
| 11,482,774 | B2 | 10/2022 | Hou et al. |
| 11,658,372 | B2 | 5/2023 | Kosaka |
| 11,749,881 | B2 | 9/2023 | Hou et al. |
| 2004/0169612 | A1 | 9/2004 | Song et al. |
| 2004/0201542 | A1 | 10/2004 | Gottl et al. |
| 2004/0259597 | A1 | 12/2004 | Gothard et al. |
| 2005/0134522 | A1 | 6/2005 | Waltho |
| 2005/0264463 | A1 | 12/2005 | Gottl et al. |
| 2006/0273865 | A1 | 12/2006 | Timofeev et al. |
| 2007/0229385 | A1 | 10/2007 | Deng et al. |
| 2007/0241979 | A1 | 10/2007 | Yang |
| 2008/0036674 | A1 | 2/2008 | Riedel et al. |
| 2009/0135076 | A1 | 5/2009 | Foo |
| 2009/0224994 | A1 | 9/2009 | Le et al. |
| 2012/0075155 | A1 | 3/2012 | Lindmark et al. |
| 2012/0087284 | A1 | 4/2012 | Linehan et al. |
| 2012/0280874 | A1 | 11/2012 | Kim et al. |
| 2013/0234883 | A1 | 9/2013 | Ma et al. |
| 2014/0313095 | A1 | 10/2014 | Pu et al. |
| 2015/0084823 | A1 | 3/2015 | Wang et al. |
| 2015/0097739 | A1 | 4/2015 | Samuel |
| 2015/0263424 | A1 | 9/2015 | Sanford et al. |
| 2016/0365618 | A1 | 12/2016 | Kim et al. |
| 2016/0372839 | A1 | 12/2016 | Watson et al. |
| 2017/0040665 | A1 | 2/2017 | Takashima et al. |
| 2017/0040679 | A1 | 2/2017 | Fröhler et al. |
| 2017/0099041 | A1 | 4/2017 | Wall |
| 2017/0170549 | A1 | 6/2017 | Buondelmonte |
| 2018/0040948 | A1 | 2/2018 | Göttl et al. |
| 2018/0269577 | A1 | 9/2018 | Kosaka et al. |
| 2018/0290356 | A1 | 10/2018 | Isohätäläet al. |
| 2018/0323513 | A1 | 11/2018 | Varnoosfaderani et al. |
| 2019/0123426 | A1 | 4/2019 | Bryce |
| 2019/0173162 | A1 | 6/2019 | Farzaneh et al. |
| 2019/0181557 | A1 | 6/2019 | Isik et al. |
| 2019/0190146 | A1 | 6/2019 | Hand et al. |
| 2019/0267700 | A1 | 8/2019 | Hendrix et al. |
| 2019/0267701 | A1 | 8/2019 | Kim et al. |
| 2019/0268046 | A1 | 8/2019 | Kim et al. |
| 2019/0312338 | A1 | 10/2019 | Guntupalli et al. |
| 2019/0312394 | A1 | 10/2019 | Paynter et al. |
| 2019/0372204 | A1 | 12/2019 | Varnoosfaderani et al. |
| 2019/0393597 | A1 | 12/2019 | Kosaka et al. |
| 2020/0076079 | A1 | 3/2020 | Shan et al. |
| 2020/0099139 | A1 | 3/2020 | Rebegea et al. |
| 2020/0288495 | A1 | 9/2020 | Gao et al. |
| 2020/0321700 | A1 | 10/2020 | Wu et al. |
| 2021/0218156 | A1 | 7/2021 | Patel et al. |
| 2021/0226344 | A1 | 7/2021 | Wu et al. |
| 2021/0305717 | A1 | 9/2021 | Hou et al. |
| 2022/0021123 | A1 | 1/2022 | Koul et al. |
| 2022/0102842 | A1 | 3/2022 | Li et al. |
| 2022/0285858 | A1 | 9/2022 | Xiao et al. |
| 2023/0056237 | A1 | 2/2023 | Hou et al. |
| 2023/0216205 | A1 * | 7/2023 | Li ............................ H01Q 5/42 343/835 |

FOREIGN PATENT DOCUMENTS

| | | | |
|---|---|---|---|
| CN | 201528038 | U | 7/2010 |
| CN | 101950846 | A | 1/2011 |
| CN | 201893434 | U | 7/2011 |
| CN | 102800956 | A | 11/2012 |
| CN | 103490175 | A | 1/2014 |
| CN | 103715521 | A | 4/2014 |
| CN | 104319486 | A | 1/2015 |
| CN | 206225553 | U | 6/2017 |
| CN | 107453044 | A | 12/2017 |
| CN | 107834198 | A | 3/2018 |
| CN | 108242596 | A | 7/2018 |
| CN | 109219905 | A | 1/2019 |
| CN | 110323564 | A | 10/2019 |
| CN | 111129769 | A | 5/2020 |
| CN | 107459805 | B | 11/2020 |
| CN | 111989824 | A | 11/2020 |
| CN | 112201939 | A | 1/2021 |
| CN | 215418610 | U | 1/2022 |
| CN | 114094347 | A | 2/2022 |
| EP | 0982800 | A2 | 3/2000 |
| EP | 1204161 | A1 | 5/2002 |
| EP | 2784876 | A1 | 10/2014 |
| EP | 2827449 | A2 | 1/2015 |
| EP | 3544204 | A2 | 9/2019 |
| EP | 3614491 | A1 | 2/2020 |
| EP | 3751665 | A1 | 12/2020 |
| EP | 3966898 | A2 | 3/2022 |
| JP | S6081902 | A | 5/1985 |
| JP | 2006108841 | A | 4/2006 |
| KR | 102129787 | B1 | 7/2020 |
| WO | 9700586 | A1 | 1/1997 |
| WO | 2009061966 | A1 | 5/2009 |
| WO | 2011160649 | A2 | 12/2011 |
| WO | 2011160849 | A1 | 12/2011 |
| WO | 2013016939 | A1 | 2/2013 |
| WO | 2019100325 | A1 | 5/2019 |
| WO | 2019154362 | A1 | 8/2019 |
| WO | 2019236203 | A2 | 12/2019 |
| WO | 2020010039 | A1 | 1/2020 |
| WO | 2020072880 | A1 | 4/2020 |
| WO | 2020159902 | A1 | 8/2020 |
| WO | 2021150384 | A1 | 7/2021 |
| WO | 2021195040 | A2 | 9/2021 |
| WO | 2021222217 | A1 | 11/2021 |
| WO | 2022055764 | A1 | 3/2022 |
| WO | 2023029431 | A1 | 3/2023 |

OTHER PUBLICATIONS

Chang et al. "Equivalent Circuit Modeling of Active Frequency Selective Surfaces" Radio and Wireless Symposium, pp. 663-666 (2008).

He, Yejun , et al., "Novel Dual-Band, Dual-Polarized, Miniaturized and Low-Profile Base Station Antenna", IEEE Transactions On Antennas and Propagation, vol. 63, No. 12, Dec. 2015, 5399-5408.

International Search Report and the Written Opinion of the International Searching Authority corresponding to International Patent Application No. PCT/CN2022/080578 (31 pages) (mailed Sep. 26, 2022).

Joozdani et al. "Equivalent Circuit Model of Frequency Selective Surfaces Embedded in Non-homogeneous Dielectric Slab" 24th Iranian Conference on Electrical Engineering (ICEE), pp. 380-383 (2016).

(56) References Cited

OTHER PUBLICATIONS

Shepard et al. "Argos: Practical Many-Antenna Base Stations" Proceedings of the 18th Annual International Conference on Mobile Computing and Networking (12 pages) (Aug. 26, 2012).
Vasquez-Peralvo et al. "Inductive Frequency Selective Surface: An Application for Dichroic Sub-Reflectors" IEEE Access, vol. 8, pp. 22721-22732 (2020).
Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.
Invitation to Pay Additional Fees, and, Where Applicable Protest Fee corresponding to International Application No. PCT/CN2022/080578 (17 pages) (mailed Jun. 15, 2022).

* cited by examiner

BASE STATION ANTENNAS HAVING AT LEAST ONE GRID REFLECTOR AND RELATED DEVICES

RELATED APPLICATIONS

This patent application claims priority to Chinese Patent Application Serial Number 202122068204.7, filed Aug. 31, 2021, and U.S. Provisional Patent Application Ser. No. 63/254,446, filed Oct. 11, 2021, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements. The radios for these beamforming arrays may be integrated into the antenna so that the antenna may perform active beamforming (i.e., the shapes of the antenna beams generated by the antenna may be adaptively changed to improve the performance of the antenna). These beamforming arrays typically operate in higher frequency bands, such as various portions of the 3.3-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

With the development of wireless communication technology, an integrated base station antenna including a passive module and an active antenna module with an active antenna has emerged. The passive module may include one or more passive arrays of radiating elements that are configured to generate relatively static antenna beams, such as antenna beams that are configured to cover a 120 degree sector (in the azimuth plane) of a base station antenna. The passive arrays may comprise arrays that operate under second generation (2G), third generation (3G) or fourth generation (4G) cellular standards. These passive arrays are not configured to perform active beamforming operations, although they typically have remote electronic tilt (RET) capabilities which allows the shape of the antenna beam to be changed via electromechanical means in order to change the coverage area of the antenna beam. The active antenna module may include one or more arrays of radiating elements that operate under fifth generation (or later) cellular standards. These arrays typically have individual amplitude and phase control over subsets of the radiating elements therein and perform active beamforming.

FIGS. 1 and 2 illustrate an example of a prior art base station antenna 10 that includes a pair of beamforming arrays and associated beamforming radios. The base station antenna 10 is typically mounted with the longitudinal axis L of the antenna 10 extending along a vertical axis (e.g., the longitudinal axis L may be generally perpendicular to a plane defined by the horizon) when the antenna 10 is mounted for normal operation. The front surface of the antenna 10 is mounted opposite the tower or other mounting structure, pointing toward the coverage area for the antenna 10. The antenna 10 includes a radome 11 and a top end cap 20. The antenna 10 also includes a bottom end cap 30 which includes a plurality of connectors 40 mounted therein. As shown, the radome 11, top cap 20 and bottom cap 30 define an external housing **10*h* for the antenna 10. An antenna assembly is contained within the housing 10*h***.

FIG. 2 illustrates that the antenna 10 can include one or more radios 50 that are mounted to the housing **10*h*. As the radios 50 may generate significant amounts of heat, it may be appropriate to vent heat from the active antenna in order to prevent the radios 50 from overheating. Accordingly, each radio 50 can include a (die cast) heat sink 54 that is shown mounted on the rear surface of the radio 50. The heat sinks 54 are thermally conductive and include a plurality of fins 54*f*. Heat generated in the radios 50 passes to the heat sink 54 and spreads to the fins 54*f*. As shown in FIG. 2, the fins 54*f* are external to the antenna housing 10*h*. This allows the heat to pass from the fins 54*f*** to the external environment. Further details of example conventional base station antennas can be found in co-pending WO2019/236203 and WO2020/072880, the contents of which are hereby incorporated by reference as if recited in full herein.

SUMMARY

Embodiments of the present invention are directed to base station antennas with at least one grid reflector configured to allow high band radiating elements to propagate electromagnetic waves through the apertures and reflect lower band signal from lower band radiating elements in front of the grid reflector.

Embodiments of the present invention are directed to base station antennas that include at least one grid reflector with a respective array of unit cells.

The unit cells can be defined by conductive patches.

The unit cells can be defined by a pattern in sheet metal.

Embodiments of the present invention are directed to a base station antenna that includes a first frequency selective surface (FSS), a second FSS residing behind the first FSS, and an active antenna residing behind the first FSS.

The first FSS can have a first primary surface and the second FSS can have a second primary surface. The first and second primary surfaces can be parallel to each other.

The base station antenna can further include a first plurality of radiating elements residing in front of the first FSS and a second plurality of radiating elements residing behind the first FSS and behind the second FSS.

The first plurality of radiating elements can operate in a first frequency band and the second plurality of radiating elements can operate in a second frequency band.

The first plurality of radiating elements can include low band radiating elements that are configured to operate in a first frequency band, and the second plurality of radiating elements can include higher band radiating elements that are configured to operate in a second frequency band. The second frequency band can encompass higher frequencies than the first frequency band.

At least one of the first FSS and/or the second FSS can include a pattern of unit cells in sheet metal.

At least one of the first FSS and/or the second FSS can have a pattern of unit cells provided by conductive patches in or on a dielectric substrate.

The first FSS and the second FSS can both be configured to allow RF energy in the second frequency band to propagate therethrough.

The second FSS can be attached to a radome.

The second FSS can be attached to an internal facing surface of the rear radome of the base station antenna. The rear radome can cooperate with the first FSS for dielectric loading thereof.

The base station antenna can further include a primary reflector coupled to the first FSS. The primary reflector can have a first sub-length and a second sub-length. The second sub-length can have spaced apart right and left sides separated by a laterally extending opening. The first FSS can extend longitudinally and laterally across the laterally extending opening.

The base station antenna can further include a primary reflector. The first FSS can be parallel to or co-planar with the primary reflector. The first FSS can have a shorter length than the primary reflector.

The first FSS can be attached to a primary reflector.

The primary reflector and the first FSS can be defined by a monolithic unitary sheet metal body.

The first FSS can have a three-dimensional shape.

The first FSS can have laterally spaced apart right side and left side portions that extend longitudinally. The right and left side portions can define corners with orthogonal wall segments defining portions of the first FSS. Optionally, one or both wall segments can include unit cells of the grid of the first FSS.

The base station antenna can further include at least one matching layer behind the first FSS.

The base station antenna can further include at least one matching layer in front of the first FSS.

The first FSS can have a grid of unit cells configured to pass RF energy in the second frequency band and can also be configured to absorb and/or reflect at least one of RF energy in the first frequency band and RF energy in a third frequency band. The third frequency band can encompass frequencies between the first and second frequency bands.

The first FSS can include a grid of unit cells with a first subset of the unit cells that are tuned for blocking and/or reflecting RF energy in a first frequency band while allowing RF energy in a second frequency band to propagate therethrough. The first FSS can further include a second subset of the unit cells that are tuned for blocking and/or reflecting RF energy in the first frequency band and RF energy in a third frequency band. The third frequency band can include frequencies between the first and second frequency bands.

The first subset of the unit cells can be positioned at an upper portion of the base station antenna. The second subset of the unit cells can include unit cells that are positioned rearwardly of the first subset of the unit cells where some of the unit cells in the second subset of the unit cells can be to the right side of the first subset of the unit cells and other of the unit cells in the second subset of the unit cells can be to the left side of the first subset of the unit cells.

Other embodiments are directed to a base station antenna that includes a front radome and a three-dimensional frequency selective surface (FSS) positioned behind the front radome.

The FSS can have right and left side corners with first and second wall segments that are orthogonal. The first wall segment can extend laterally the second wall segment can extend in a front to back direction, rearward from the first wall segment.

The FSS can include a grid with an array of unit cells and some of the unit cells can be present on at least one of the first and second wall segments.

The right side and left side portions can reside on opposing sides of an open laterally and longitudinally extending space and the FSS can have a front surface that extends across at least part of the laterally extending space.

The base station antenna can further include a first plurality of radiating elements residing behind the FSS and a second plurality of radiating elements residing in front of the FSS.

The first plurality of radiating elements can operate in a first frequency band and the second plurality of radiating elements can operate in a second frequency band.

The first plurality of radiating elements can include high band radiating elements that operate in at least part of a 3.2-4.1 GHz frequency band. The second plurality of radiating elements can include radiating elements that operate in at least part of a lower frequency band that the high band radiating elements.

The FSS can include a pattern of unit cells in sheet metal.

The FSS can have a pattern of unit cells provided by conductive patches in or on a dielectric substrate.

The dielectric substrate/conductive patches can be provided by a flex circuit or a printed circuit board.

The FSS can be configured to allow RF energy in at least part of a 3.2-4.1 GHz frequency band to propagate therethrough.

The base station antenna can further include at least one matching layer positioned behind the FSS.

The second plurality of radiating elements can be provided in an active antenna module (also referred to as "active antenna").

Yet other embodiments are directed to a base station antenna that includes a radome, a frequency selective surface (FSS) inside the radome, and a matching layer behind the FSS inside the radome.

The base station antenna can further include a primary reflector in the radome. The primary reflector can have right side and left side portions that reside on opposing sides of an open laterally and longitudinally extending space. The FSS can have a front surface that extends across at least part of the laterally extending space.

The base station antenna can further include a first plurality of radiating elements residing behind the FSS and a second plurality of radiating elements residing in front of the FSS.

The first plurality of radiating elements can operate in a first frequency band and the second plurality of radiating elements can operate in a second frequency band that encompasses lower frequencies than the first frequency band.

The first plurality of radiating elements can include high band radiating elements that operate in at least part of a 2.5 GHz or greater frequency band, such as in a 3.1-4.2 GHz frequency band. The second plurality of radiating elements comprise radiating elements that operate in a lower frequency band than the high band radiating elements.

The FSS can have a pattern of unit cells in sheet metal.

The FSS can have a pattern of unit cells provided by conductive patches in or on a dielectric substrate.

The FSS can be configured to allow RF energy in at least part of a 3.1-4.2 GHz frequency band to propagate therethrough.

Still other embodiments are directed to a base station antenna includes a housing with a front radome and a rear radome and an interior compartment. The base station antenna also includes a frequency selective surface (FSS) attached to a front facing surface of the rear radome.

The base station antenna can also include a first plurality of radiating elements residing in front of the FSS and a second plurality of radiating elements residing behind the FSS.

The second plurality of radiating elements can include a massive multiple input multiple output (mMIMO) array provided in an active antenna module.

The first plurality of radiating elements can operate in a first frequency band and the second plurality of radiating elements can operate in a second frequency band.

The first plurality of radiating elements can include radiating elements that operate in a first frequency band and he second plurality of radiating elements can include radiating elements that operate in a second frequency band.

The FSS can include a pattern of unit cells in sheet metal.

The FSS can include a pattern of unit cells provided by conductive patches in or on a dielectric substrate.

The FSS can be configured to allow RF energy in at least part of a 3.1-4.2 GHz frequency band to propagate therethrough.

The rear radome can cooperate with the FSS for dielectric loading thereof, optionally the FSS can be attached to the rear radome and extends in front of, closely adjacent to or abutting, an internal facing surface of the rear radome.

Yet other embodiments are directed to a base station antenna that includes: a grid reflector having an array of unit cells arranged in sheet metal; a primary reflector that merges into and/or that is coupled to the grid reflector; and a passive antenna assembly that includes plurality of linear arrays of radiating elements that extend in front of the primary reflector.

The unit cells can have a respective open center space that can be devoid of metal and that can be surrounded by a perimeter of metal.

A first of the linear array can include a first plurality of first radiating elements that extend in front of the grid reflector and a second plurality of the first radiating elements extend in front of the primary reflector.

The grid reflector and the primary reflector can be defined by a monolithic structure of sheet metal. Right and left sides of the grid reflector can merge into right and left sides of the primary reflector. The right and left sides of the primary reflector can extend longitudinally and laterally with a continuous closed surface of metal and the right and left sides of the primary reflector can each have a lateral extent that is less than a lateral extent of the grid reflector.

The primary reflector can have a solid continuous primary surface that extends across at least a major portion of a lateral extent and longitudinal extent thereof.

The base station antenna can further include a dielectric cover attached to and residing in front and/or behind the grid reflector and extending over at least a majority of the unit cells.

Neighboring unit cells of the array of unit cells can have a shared metal segment forming part of respective perimeters. The grid reflector can be configured so that neighboring unit cells have at least one shaped metal region that extends across the shared metal segment and terminates offset from a center point of a respective unit cell to thereby increase a current path for radio frequency (RF) energy.

The shaped metal region can be a box with an open center space.

The shaped metal region can be a box with a closed center space.

The perimeter of each unit cell can have a plurality of shaped metal regions that are spaced apart about the perimeter of each of the unit cells.

The shaped metal regions are shaped as rectangles.

The grid reflector can include a metal line that can form part of a perimeter of first and second unit cells that are neighboring unit cells. At least one shaped metal region with first and second parts can extend inwardly from the metal line in opposed directions into the respective first and second unit cells such that the first part of the shaped metal region resides inside the first unit cell and the second part of the shaped metal region resides inside the second unit cell.

The plurality of shaped metal regions can have a perimeter surrounding an open space that is smaller than the open space of the unit cells and that has opposing first and second ends. The first end can extend into a first unit cell and the second end can extend into a second unit cell that is immediately adjacent the first unit cell.

Each unit cell can have a metal perimeter with corners and a shaped metal region extending along a sub-length of the perimeter between two of the corners.

Each unit cell can have (at least) four shaped metal regions spaced apart about respective perimeters. Each of the four shaped metal regions can extend about a shared perimeter segment of immediately adjacent unit cells.

The base station antenna can further include a plurality of shaped metal regions spaced apart about respective perimeters. A number of shaped metal regions spaced apart about respective perimeters can be equal to a number of unit cells immediately neighboring respective unit cells.

The plurality of linear arrays can include first and second laterally spaced apart linear arrays of low band radiating elements. The base station antenna can further include a plurality of linear arrays of mid-band radiating elements extending longitudinally spaced apart from and forward of the primary reflector or extending from the grid reflector.

The base station antenna can be in combination with an active antenna module coupled to a rear of the base station antenna. The active antenna module can have an array of radiating elements facing the grid reflector. The array of radiating elements of the active antenna module are configured to propagate RF energy through the grid reflector.

The array of radiating elements of the active antenna module can have a mMIMO array of radiating elements positioned behind the grid reflector.

The grid reflector can have a lateral extent that is a sub-distance of a lateral extent of the housing of the base station antenna and can reside at an upper portion of the base station antenna, aligned with the array of adiating elements of the active antenna module.

The grid reflector can be configured to allow RF energy to pass through at one or more defined frequency range and reflect RF energy at a different frequency band The grid reflector can be configured to reflect RF energy at a low band and pass RF energy at a higher band.

The plurality of linear arrays can include low band dipole antenna with feed stalks. The feed stalks can project forward of the grid reflector.

The active antenna module can have a radome and the radome of the active antenna module can reside adjacent to and face the rear of the base station antenna.

Additional embodiments are directed to base station antenna assemblies that include: a plurality of columns of first radiating elements configured for operating in a first operational frequency band, each column of first radiating elements comprising a plurality of first radiating elements arranged in a longitudinal direction; and a grid reflector positioned behind the plurality of columns of first radiating elements. The grid reflector is configured to reflect electromagnetic waves within the first operational frequency band.

The base station antenna can further include a plurality of columns of second radiating elements configured for operating in a second operational frequency band that is different from and does not overlap with the first operational frequency band. Each column of second radiating elements can have a plurality of second radiating elements arranged in the longitudinal direction. The grid reflector can be further configured such that electromagnetic waves within the second operational frequency band can propagate through the reflector.

The second operational frequency band can be higher than the first operational frequency band.

The grid reflector can be defined by a sheet of metal configured with an array of unit cells. The unit cells can have open center spaces devoid of metal that are surrounded by a perimeter of metal.

The base station antenna can further include a dielectric cover attached to and residing in front and/or behind the grid reflector and extending over the unit cells to thereby improve low band reflection relative to a unit cell with an interior that is open to atmosphere. Optionally, the dielectric cover can have a dielectric constant of at least one.

The grid reflector can provide a pair of neighboring unit cells with a shared metal segment forming part of respective perimeters. The grid reflector can have at least one shaped metal region that extends across the shared metal segment and can terminate inside each of the pair of neighboring unit cells, offset from a center point of each of the pair of neighboring unit cells thereof.

The shaped metal region can be a box with an open center space.

The shaped metal region can be a box with a closed center space.

The grid reflector can be configured so that a plurality of shaped metal regions are spaced apart about the perimeter of the unit cells.

The shaped metal regions can be shaped as rectangles.

The grid reflector can include a metal line that forms part of a perimeter of first and second unit cells that are immediately adjacent neighboring first and second unit cells. The grid reflector can further include at least one shaped metal region with first and second parts that extend inwardly from the metal line in opposed directions into the respective first and second unit cells such that the first part of the shaped metal region resides inside the first unit cell and the second part of the shaped metal region resides inside the second unit cell.

At least some of the plurality of shaped metal regions can have a perimeter surrounding an open space that is smaller than the open spaces of the unit cells and that has opposing first and second ends. The first end can extend into a first unit cell and the second end can extend into an immediately adjacent neighboring second unit cell.

The grid reflector can be defined by sheet metal configured with an array of unit cells, with the unit cells having open centers devoid of metal and are surrounded by metal perimeters.

The grid reflector can be defined by a monolithic body of sheet metal that provides the grid reflector and a primary reflector with a closed metal surface.

The grid reflector can have an asymmetric array of unit cells.

The grid reflector can have a greater density of unit cells at a first position relative to a density of unit cells at a second position.

The grid reflector can have unit cells with a greater lateral and/or longitudinal extent at first position relative to unit cells at a second position.

The plurality of columns of first radiating elements can be provided in a base station antenna.

The second operational frequency band is higher than the first operational frequency band.

The plurality of columns of second radiating elements can be provided by an active antenna module coupled to a rear of the base station antenna.

Still other embodiments are directed to a reflector for a base station antenna that includes: a sheet meal grid reflector with an array of unit cells; and a dielectric cover attached to and residing in front and/or behind the grid reflector and extending over at least a majority of the unit cells.

The dielectric cover can have a dielectric constant that is 1 or greater

The dielectric cover can be fiberglass.

The grid reflector can have an asymmetric array of unit cells.

The grid reflector can have a greater density of unit cells at a first position relative to a density of unit cells at a second position.

The grid reflector can have unit cells with a greater lateral and/or longitudinal extent (width and/or height) at first position relative to unit cells at a second position.

The array of unit cells can be symmetrical.

Yet other aspects are directed to a frequency selective reflector that includes a main body and a frequency selective section provided in the main body. The frequency selective section is composed of a plurality of pattern units periodically arranged in transverse and longitudinal directions, each of the pattern units has a predetermined pattern and includes a capacitor structure and an inductor structure connected in series with the capacitor structure such that the frequency selective section allows electromagnetic waves within a predetermined frequency range to pass.

The plurality of pattern units (unit cells) can be electrically connected to each other through the inductor structure.

Each of the pattern units may be in a shape of any one of a triangle, a square, a rectangle, a rhombus, a pentagon, a hexagon, a circle, and an oval and/or combinations thereof.

Each of the pattern units can include a sheet structure and a linear structure, the sheet structure can form the capacitor structure and the linear structure can form the inductor structure.

The area of the sheet structure and the length of the linear structure in the plurality of pattern units can be configured to change in a predetermined manner.

Some of the plurality of pattern units can have different configurations.

The frequency selective section/surface can be configured to allow high-frequency electromagnetic waves within the range of 2300 MHz to 4000 MHz to pass through.

The frequency selective section and the main body can be integrally formed of a metal plate.

The frequency selective section and the main body can be configured as separate components and are fixedly connected to each other to form the frequency selective reflector.

The frequency selective section and the main body can be made of different materials.

The frequency selective section can be made by punching or laser direct structuring.

The frequency selective section can include a substrate and a plurality of metal pattern units provided on the substrate.

The plurality of metal pattern units can be formed on the substrate by a selective electroplating process or a metal ink transfer printing process.

The substrate can be formed of plastic, and the metal pattern unit can be formed of any one of copper, aluminum, gold, and silver.

A base station antenna can be provided which includes a frequency selective reflector according to the present disclosure.

The base station antenna can include a passive module and/or a passive antenna assembly and an active antenna module, the active antenna module can be installed at a position corresponding to the frequency selective section of the frequency selective reflector.

According to embodiments of the present disclosure, the frequency selective section can be configured to allow electromagnetic waves emitted by the active module to pass.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

DETAILED DESCRIPTION

Figure 1:
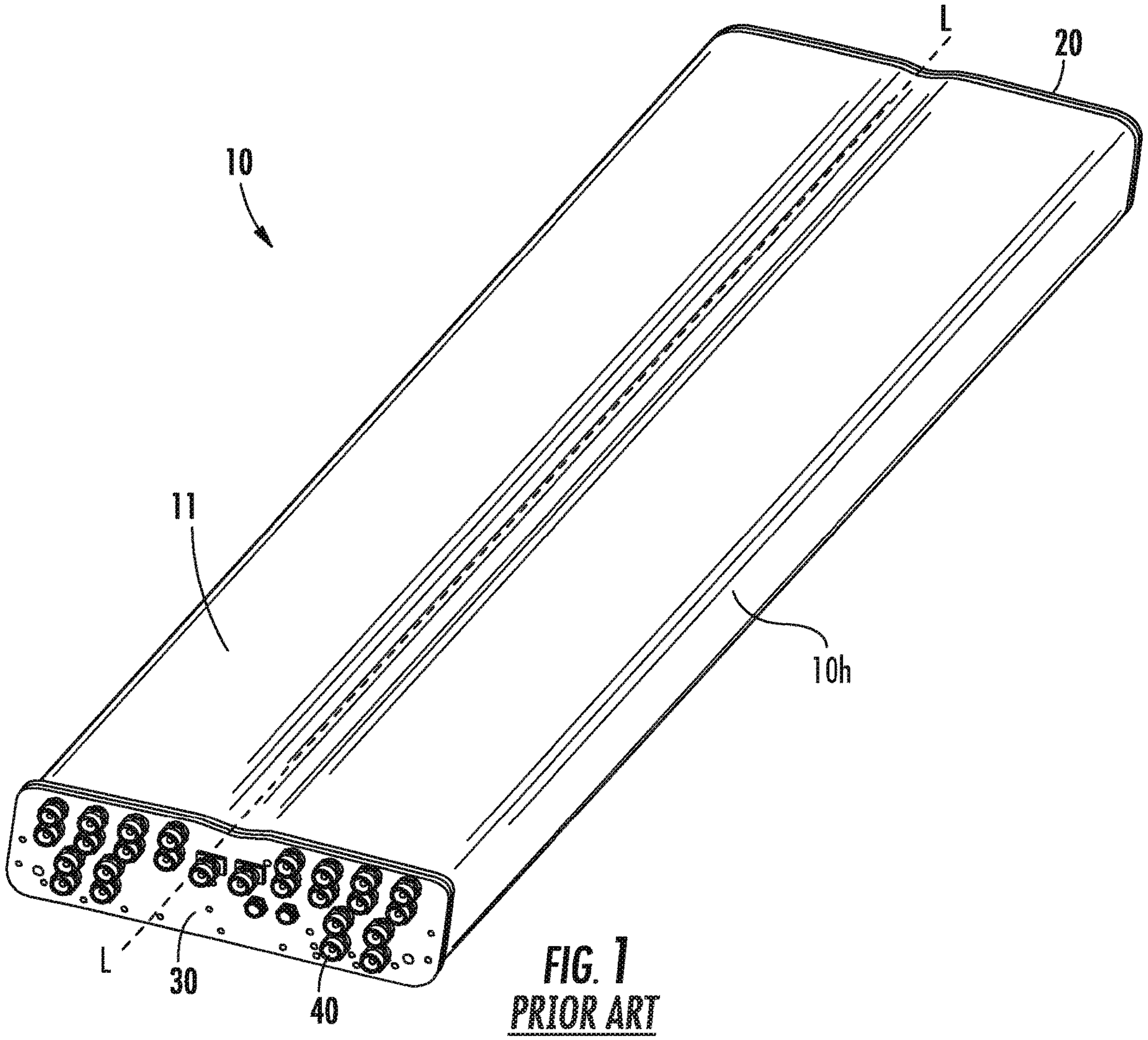
FIG. 1 PRIOR ART
FIG. 1 is a perspective view of a prior art base station antenna.
Figure 2:
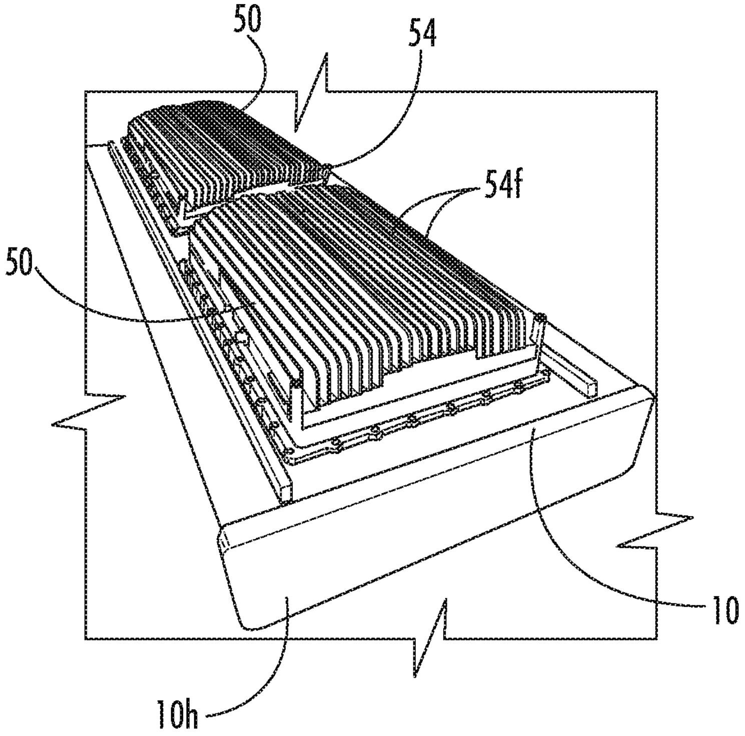
FIG. 2 PRIOR ART
FIG. 2 is a back view of another prior art base station antenna.
Figure 3A:
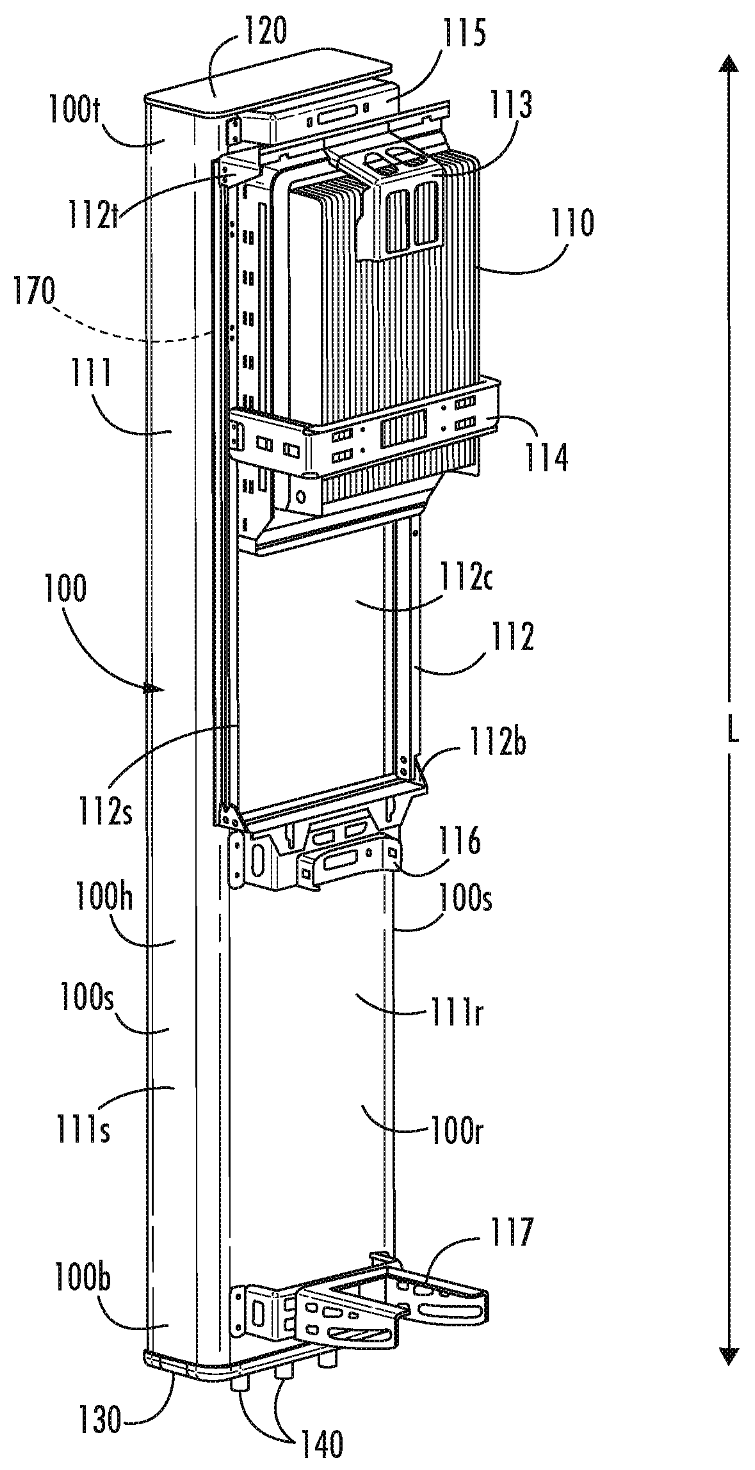
FIG. 3A is a back perspective view of an example base station antenna coupled to an active antenna module according to embodiments of the present invention.

FIG. 3A illustrates a base station antenna 100 according to certain embodiments of the present invention. In the description that follows, the base station antenna 100 will be described using terms that assume that the base station antenna 100 is mounted for use on a tower, pole or other mounting structure with the longitudinal axis L of the base station antenna 100 extending along a vertical axis and the front of the base station antenna 100 mounted opposite the tower, pole or other mounting structure pointing toward the target coverage area for the base station antenna 100 and the rear **100*r* of the base station antenna 100 facing the tower or other mounting structure. It will be appreciated that the base station antenna 100 may not always be mounted so that the longitudinal axis L thereof extends along a vertical axis. For example, the base station antenna 100 may be tilted slightly (e.g., less than 10°) with respect to the vertical axis so that the resultant antenna beams formed by the base station antenna 100** each have a small mechanical downtilt.

The base station antenna 100 can couple to or include at least one active antenna module 110. The term "active antenna module" is used interchangeably with "active antenna unit" and "AAU" and "active antenna" and refers to a cellular communications unit comprising radio circuitry and associated radiating elements. The radio circuitry is capable of electronically adjusting the amplitude and/or phase of the subcomponents of an RF signal that are output to different radiating elements of an array or groups thereof. The active antenna module 110 comprises the radio circuitry and the radiating elements (e.g., a multi-input-multi-output (mMIMO) beamforming antenna array) and may include other components such as filters, a calibration network, an antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with a multi-column array of radiating elements and the first and second sub-units stackably attach together in a front to back direction of the base station antenna 100, with the radiating elements 1195 of an antenna assembly 1190 (FIGS. 25, 26A, 26B) closer to the front radome 111*f* of the housing 100*h*/radome 111 of the base station antenna 100 than the radio circuitry unit 1120. In some embodiments, the radiating elements 1195 may comprise a separate sub-unit from the radio circuitry and the radiating element sub-unit may be mounted within the base station antenna 100 instead of being external to the base station antenna 100.

As will be discussed further below, the base station antenna 100 includes an antenna assembly 190, which can be referred to as a "passive antenna assembly". The term "passive antenna assembly" refers to an antenna assembly having arrays of radiating elements that are coupled to radios that are external to the antenna, typically remote radio heads that are mounted in close proximity to the base station antenna 100. The arrays of radiating elements included in the passive antenna assembly 190 (FIGS. 23A, 24) are configured to form static antenna beams (e.g., antenna beams that are each configured to cover a sector of a base station). The passive antenna assembly 190 can comprise a reflector 170, 214 with radiating elements projecting in front of the reflector and the radiating elements can include one or more linear arrays of low band radiating elements that operate in all or part of the 617-960 MHz frequency band and/or one or more linear arrays of mid-band radiating elements that operate in all or part of the 1427-2690 MHz frequency band. The passive antenna assembly 190 is mounted in the housing 100*h* of base station antenna 100 and one or more active antenna modules 110 can releasably (detachably) couple (e.g., directly or indirectly attach) to base station antenna 100.

The base station antenna 100 has a housing 100*h*. The housing 100*h* may be substantially rectangular with a flat rectangular cross-section. The housing 100*h* may be provided to define at least part of a radome 111 with at least the front side 111*f* configured as a dielectric cover that allows RF energy to pass through in certain frequency bands. The housing 100*h* may also be configured to that the rear 100*r* defines a rear side 111*r* radome opposite the front side radome 111*f*. Optionally, the housing 100*h* and/or the radome 111 can also comprise two (narrow) sidewalls 100*s*, 111*s* facing each other and extending rearwardly between the front side 111*f* and the rear side 111*r*. Typically, the top side 100*t* of the housing 100*h* may be sealed in a waterproof manner and may comprise an end cap 120 and the bottom 100*b* of the housing 100*h* may be sealed with a separate end cap 130. The front side 111*f*, the sidewalls 111*s* and typically at least part of the rear side 111*r* of the radome 111 are substantially transparent to radio frequency (RF) energy within the operating frequency bands of the base station antenna 100 and active antenna module 110. The radome 111 may be formed of, for example, fiberglass or plastic.

Still referring to FIG. 3A, in some embodiments, an active antenna module 110 can attach to the base station antenna 100 using a frame 112 and accessory mounting brackets 113, 114. The rear 111*r* of the housing 100*h* may be a flat surface extending along a common plane over an entire longitudinal extent thereof or along at least a portion of the longitudinal extent thereof.

Figure 3B:
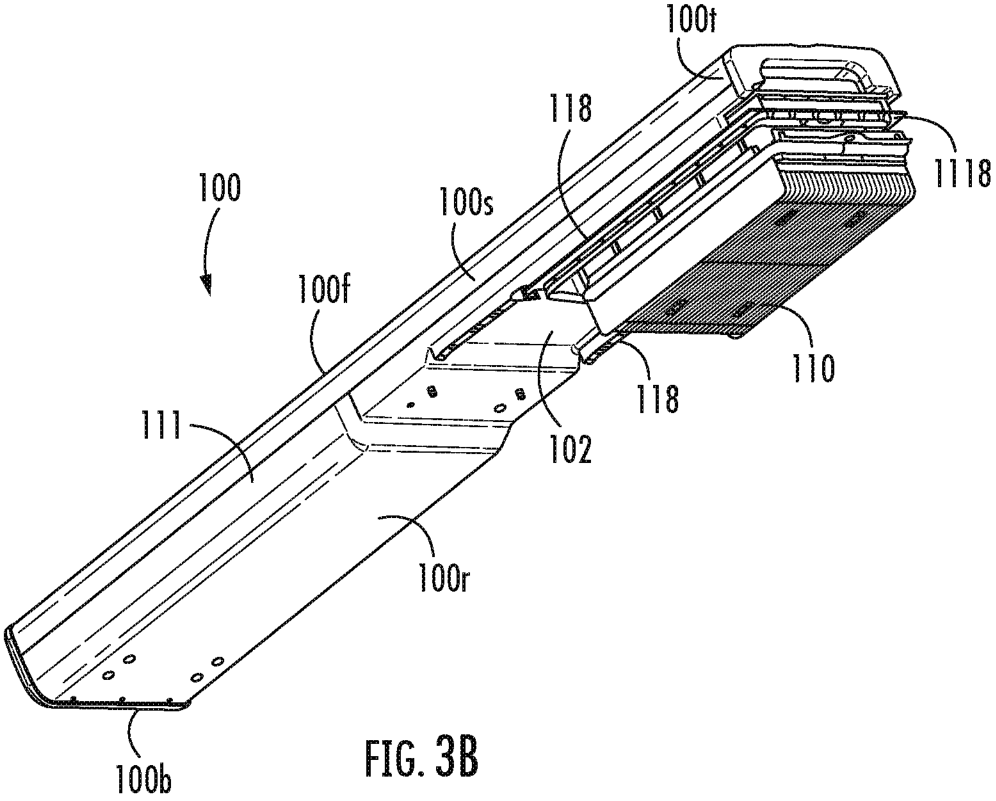
FIG. 3B is a side, back perspective view of another example base station antenna coupled to an active antenna module according to embodiments of the present invention.

FIG. 3B illustrates that the rear surface 100*r* can comprise a recessed and/or stepped segment 102 facing the active antenna module 110. The stepped segment 102 resides closer to a front 100*f* of the housing than the back wall that is defined by a primary segment of the rear 100*r* of the housing 100*h*. The stepped segment 102 can have a lateral and longitudinal extent that is the same or greater than a lateral and longitudinal extent of the active antenna module 110. The rear surface 100*r* can also comprise a pair of spaced apart longitudinally extending rails 118 that engage an adapter mounting bracket 1118 on the active antenna module 110 to attach the active antenna module 110 to the base station antenna housing 100*h*.

Referring again to FIG. 3A, in another embodiment, the rear surface 100*r* can comprise a plurality of longitudinally spaced apart mounting structure brackets, shown as upper, medial, and lower brackets, 115, 116, 117, respectively, that extend rearwardly from the housing 100*h*. In some embodiments, the mounting structure brackets 115, 116, 117 may be configured to couple to one or more mounting structures such as, for example, a tower, pole or building (not shown). At least two of the mounting structure brackets 115, 116 can also be configured to attach to the frame 112 of the base station antenna arrangement, where used. The frame 112 may extend over a sub-length of a longitudinal extent L of base station antenna 100, where the sub-length is shown in FIG. 3A as being at least a major portion thereof (at least 50% of a length thereof). The frame 112 can comprise a top 112*t*, a bottom 112*b* and two opposing long sides 112*s* that extend between the top 112*t* and the bottom 112*b*. The frame 112 can have an open center space 112*c* extending laterally between the sides 112*s* and longitudinally between the top 112*t* and bottom 112*b*.

The frame 112, where used, may be configured so that a variety of different active antenna modules 110 can be mounted to the frame 112 using appropriate accessory mounting brackets 113, 114. As such, a variety of active antenna modules 110 may be interchangeably attached to the same base station antenna 100. While the frame 112 is shown by way of example, other mounting systems may be used.

In some embodiments, a plurality of active antenna modules 110 may be concurrently attached to the same base station antenna 100 at different longitudinal locations using one or more frames 112. Such active antenna modules 110 may have different dimensions, for example, different lengths and/or different widths and/or different thicknesses.

Figure 4:
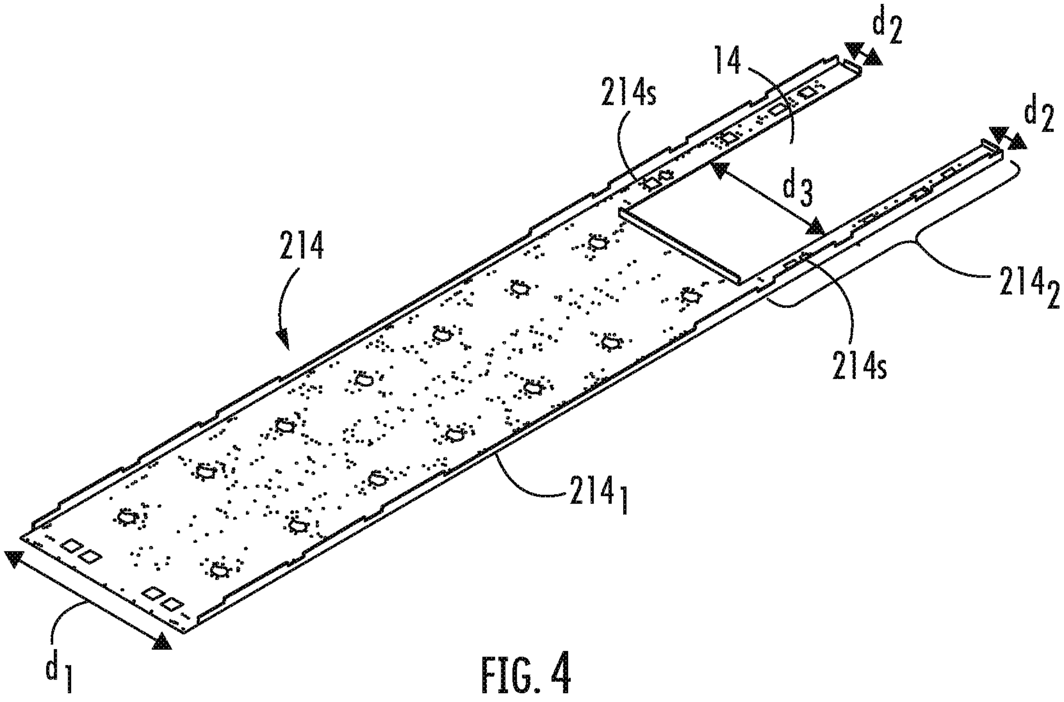
FIG. 4 is a perspective view of an example primary reflector that can be provided in a base station antenna, such as the base station antenna shown in FIG. 3A or FIG. 3B, according to embodiments of the present invention.

Turning now to FIG. 4, an example primary reflector 214 for a base station antenna 100 is shown. As shown, the primary reflector 214 has a first section $\mathbf{214}_1$ that extends a first longitudinal distance and that merges into a second section $\mathbf{214}_2$ with spaced apart right and left side segments 214*s* having a lateral extent d2 that is less than a lateral extent d1 of the first section $214_1$. An open medial region 14 can extend longitudinally and laterally about the second section $214_2$. The open medial region 14 can have a lateral extent d3 that is 60-95% of the lateral extent d1, in some embodiments. The first section $214_1$ can have a longitudinal extent that is greater than the second section $214_2$, typically at least 20% greater, such as 30%-80% greater, in some embodiments.

Figure 5A:
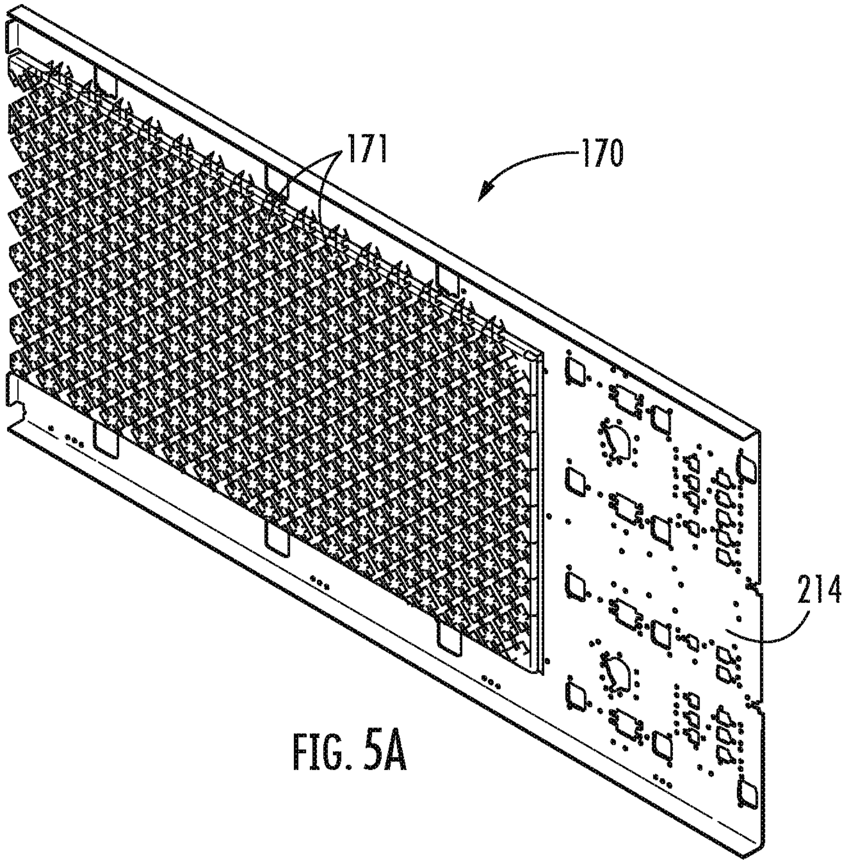
FIG. 5A is a front perspective view of a grid reflector for a base station antenna according to embodiments of the present invention.
Figure 5B:
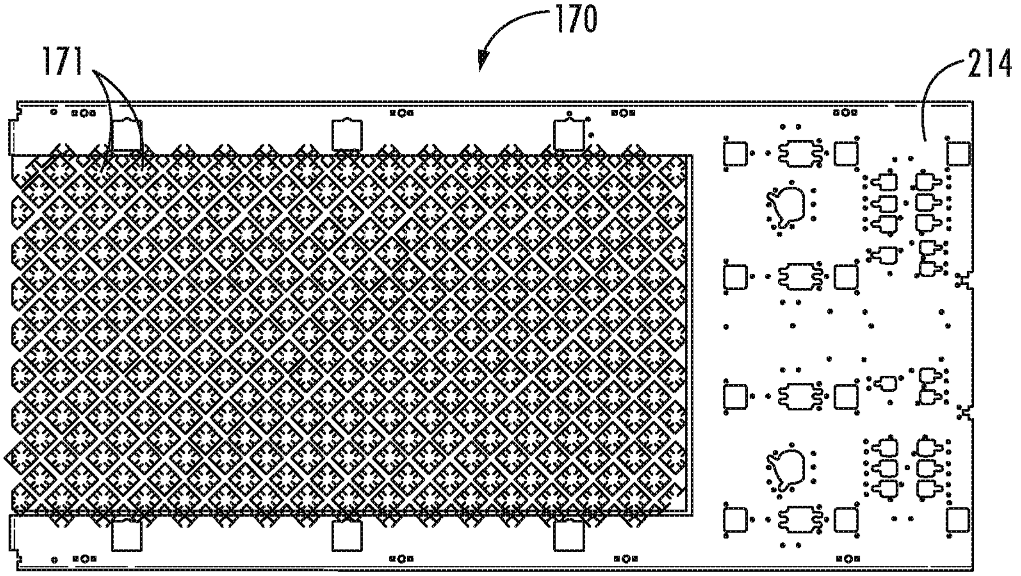
FIG. 5B is a front view of the grid reflector shown in FIG. 5A.

FIGS. 5A and 5B illustrate an example grid reflector 170 for base station antennas 100. The grid reflector 170 comprises a frequency selective surface and may interchangeably be referred to as a "frequency selective reflector". The grid reflector 170 can extend part of or a full lateral extent of the base station antenna 100 and at least a part of a length of the base station antenna 100.

In some embodiments, the grid reflector 170 can be electrically and/or mechanically coupled to the primary reflector 214. In some embodiments, the grid reflector 170 can be positioned to reside between the right and left sides 214*s* of the primary reflector in the open medial region 14 (FIG. 4).

The grid reflector 170 can be provided as a non-metallic substrate(s) with metal patches arranged to define an array of unit cells 171 (also interchangeably referred to as "pattern units") or can be a metal grid and comprises an array of unit cells 171.

The non-metallic substrate can be provided as a multiple-layer printed circuit board which can be rigid, semi-rigid or a flex circuit. The non-metallic substrate can be a plastic, polymer, co-polymer with a metallized surface(s) providing conductive patches.

The grid reflector 170 can be provided as a sheet of metal, such as aluminum, with the grid shaped to form the array of unit cells 171 punched or laser formed through the sheet metal or otherwise formed.

The grid reflector 170 provides a frequency selective surface and/or substrate that is configured to allow RF energy (electromagnetic waves) to pass through at one or more first defined frequency range and that is configured to reflect RF energy at a different second frequency band. The frequency selective surface and/or substrate may be interchangeably referred to as a "FSS" herein. The reflector 170 of the base station antenna 100, can reside behind at least some antenna elements (see radiating elements 222, FIGS. 26A, 26B) and can selectively reject some frequency bands and permit other frequency bands to pass therethrough by including the frequency selective surface and/or substrate to operate as a type of "spatial filter". See, e.g., Ben A. Munk, Frequency Selective Surfaces: Theory and Design, ISBN: 978-0-471-37047-5; DOI: 10.1002/0471723770; April 2000, Copyright @ 2000 John Wiley & Sons, Inc. the contents of which are hereby incorporated by reference as if recited in full herein.

The frequency selective surface and/or substrate material of the grid reflector 170 can comprise one or more of a metamaterial, a suitable RF material or even air (although air may require a more complex assembly). The term "metamaterial" refers to composite electromagnetic (EM) materials. Metamaterials may comprise sub-wavelength periodic microstructures.

The FSS material can be provided as one or more cooperating layers. The FSS material can include a substrate that has a dielectric constant in a range of about 2-4, such as about 3.7 and a thickness of about 5 mil and metal patterns formed on the dielectric substrate. The thickness can vary but thinner materials can provide lower loss.

Figure 25:
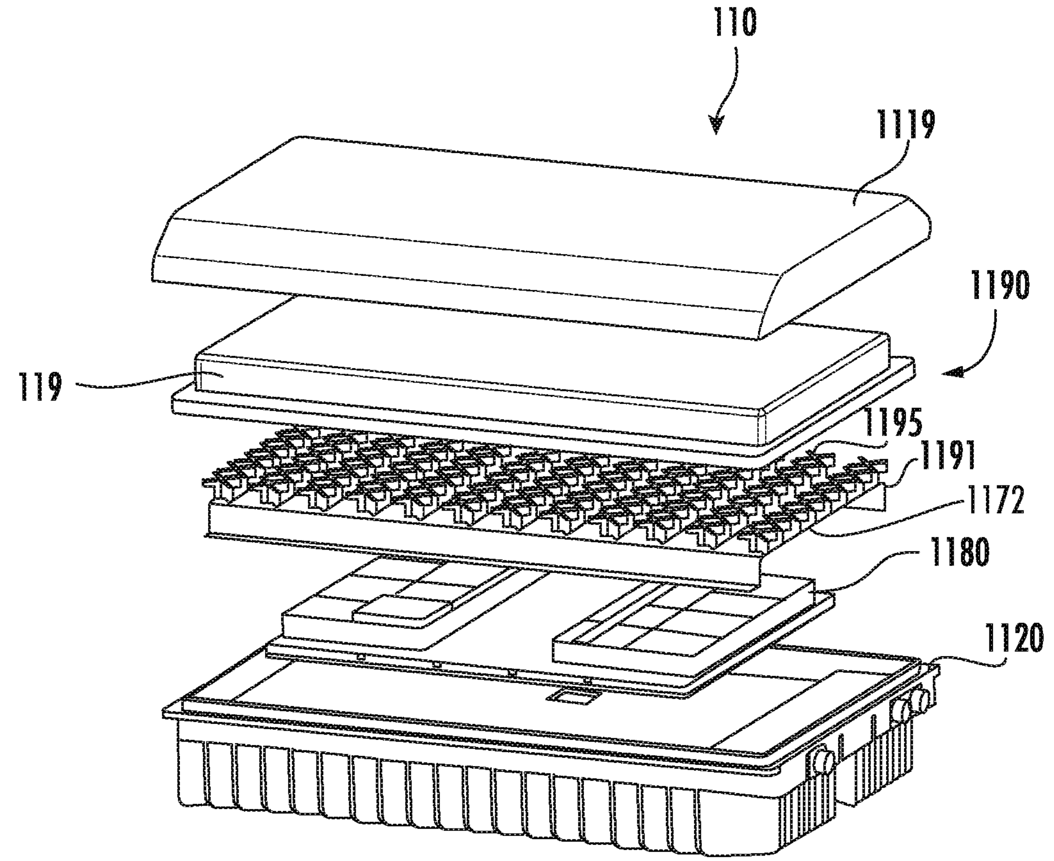
FIG. 25 is a partially exploded view of an example active antenna module according to embodiments of the present invention.
Figure 26A:
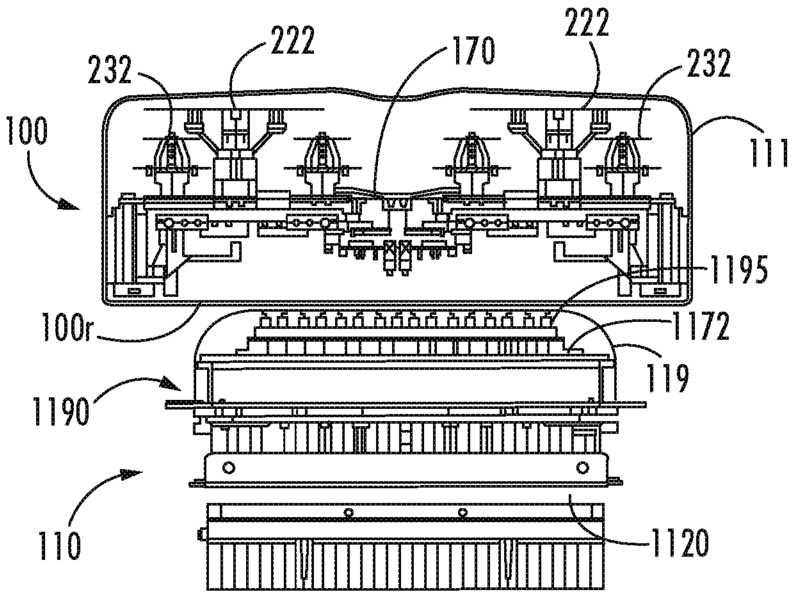
FIGS. 26A and 26B are simplified lateral section views of example base station antennas and cooperating active antenna modules according to embodiments of the present invention.

In some embodiments, the frequency selective substrate/surface of the grid reflector 170 can be configured to act like a High Pass Filter essentially allowing low band energy to completely reflect (the FSS can act like a sheet of metal) while allowing higher band energy, for example, about 3.5 GHz or greater, to completely pass through. Thus, the frequency selective substrate/surface is transparent or invisible to the higher band energy and a suitable out of band rejection response from the FSS can be achieved. The FSS material may allow a reduction in filters or even eliminate filter requirements for looking back into the radio 1120 (FIGS. 25, 26A).

As discussed above, in some embodiments, the grid reflector 170 with the FSS may be implemented by forming the frequency selective surface on a printed circuit board, optionally a flex circuit board. In some embodiments, the grid reflector 170, for example, may be implemented as a multi-layer printed circuit board, one or more layers of which formed with a frequency selective surface configured such that electromagnetic waves within a predetermined frequency range cannot propagate through the grid reflector 170, and wherein one or more other predetermined frequency range associated with the one or more layers of the multi-layer printed circuit board is allowed to pass therethrough.

Referring to FIGS. 5A and 5B, a grid (frequency selective) reflector 170 according to embodiments of the present disclosure is shown. The grid reflector 170 can be used in the base station antenna 10 shown in FIGS. 3A, 3B, for example. The grid reflector/frequency selective reflector 170 may include a main body 21 and a frequency selective section 22 provided in the main body 21. At least the main body 21 may be metallic (e.g., formed of aluminum). The frequency selective section 22 may be provided at a position of the frequency selective reflector 170 corresponding to the installation position of the active antenna module 110 of the base station antenna 100 and may be configured to allow electromagnetic waves within a predetermined frequency range (for example, high-frequency electromagnetic waves within the range of 2300 to 4200 MHz or a portion thereof) to pass. In this way, when the base station antenna 100 is assembled, the high-frequency electromagnetic waves emitted by the active antenna module 110 can pass through the frequency selective reflector 20 via the frequency selective section 22.

The frequency selective section 22 may be composed of a plurality of pattern units or unit cells 171 that are periodically arranged in the transverse and longitudinal directions of the base station antenna. Each of the pattern units/unit cells 171 may have a predetermined pattern and may include a capacitor structure and an inductor structure connected in series with the capacitor structure. In addition, each of the pattern units 171 may be electrically connected to each other through the inductor structure. For example, the inductor structure in each pattern unit/unit cell 171 may be electrically connected to the inductor structure of an adjacent pattern unit.

The resonance frequency of the frequency selective section 22 may be configured by selecting or designing the pattern and size of the capacitor structure and the inductor structure of each pattern unit/unit cell 171, as well as the spacing and arrangement of a plurality of pattern units 171 such that the electromagnetic waves within a predetermined frequency range can pass through the frequency selective section 22.

Referring to FIGS. 6A-11, example grid reflectors 170 are shown with embodiments of frequency selective sections and pattern units/unit cells 171 thereof according to different embodiments of the present disclosure are shown.

Figure 6A:
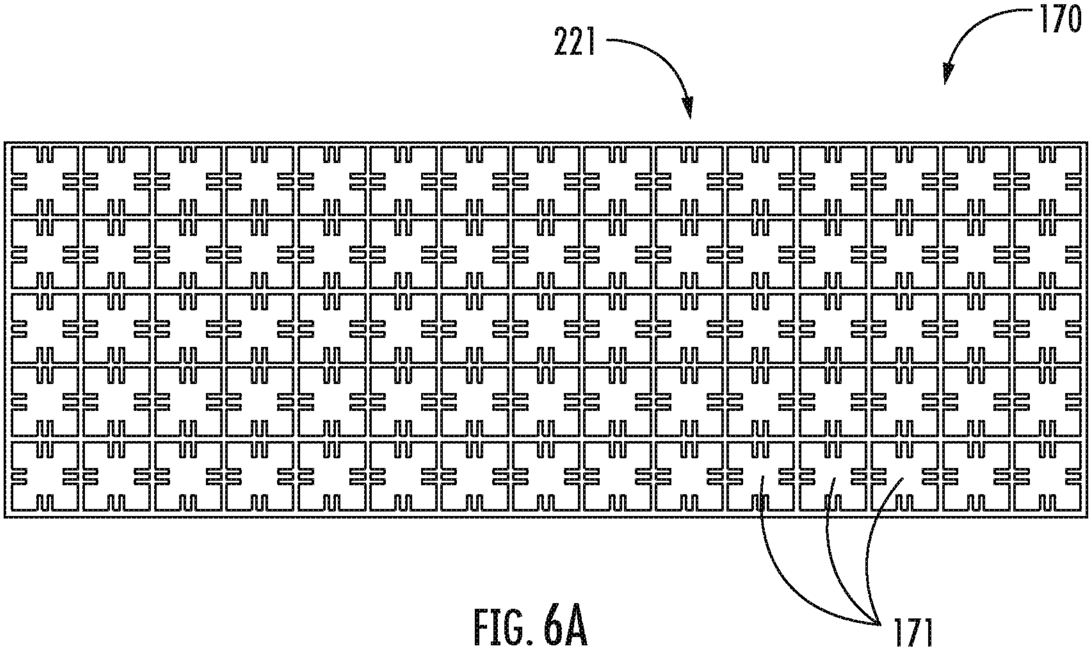
FIG. 6A is a front view of a section of a grid reflector according to embodiments of the present invention.
Figure 6B:
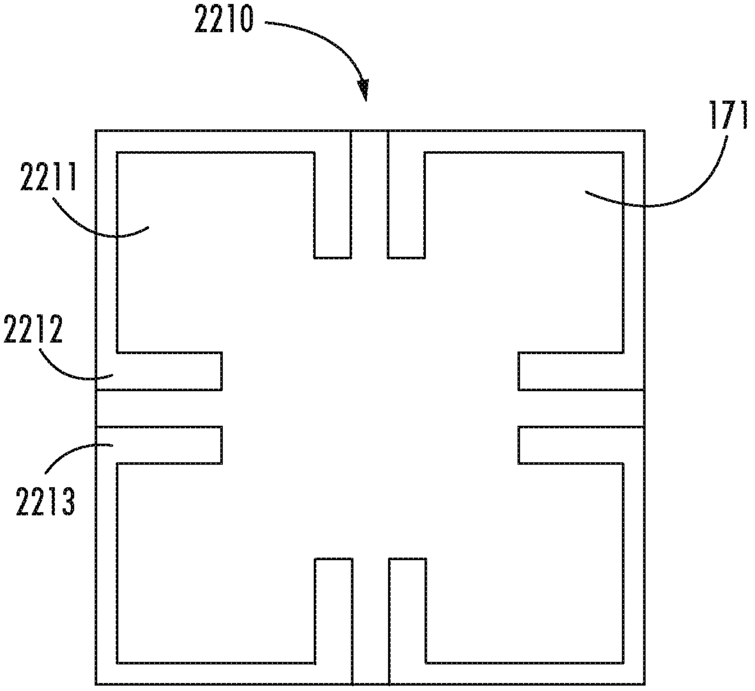
FIG. 6B is an enlarged front view of a unit cell of the grid reflector shown in FIG. 6A.

FIG. 6A shows a frequency selective section 221 with an array according to an embodiment of the present disclosure, and FIG. 6B shows a schematic view of a single unit cell 171 of the array with a pattern unit 2210 in the frequency selective section 221 shown in FIG. 6A. As shown in FIG. 6A and FIG. 6B, the pattern unit 2210 may be substantially square. The pattern unit 2210 may include a sheet structure 2211 and a plurality of linear structures 2212. The linear structures 2212 may extend outward from a concave portion 2213 of the sheet structure 2211. The sheet structure 2211 may have a substantially square shape with four concave openings 2213, with a linear structure protruding outwardly from each concave opening. The substantially square shape of the sheet structure 2211 allows the linear structures 2212 to electrically connect to the linear structures 2212 in adjacent pattern units. The sheet structure 2211 forms a capacitor structure, and the linear structure 2212 forms an inductor structure.

Referring to FIG. 6A, a circuit in which a capacitor and an inductor are connected in series can be formed using the pattern unit/unit cell 171 shown in FIG. 6B. The magnitude of the capacitance can be adjusted by adjusting the distance between adjacent pattern units (for example, the distance between adjacent sheet structures 2211) and the size (for example, area, side length, etc.) of the sheet structure 2211. In addition, the magnitude of the inductance can be adjusted by adjusting the size (for example, length, width, etc.) of the linear structure 2212. The resonance frequency of the frequency selective section 22 may be adjusted by adjusting various parameters of the pattern unit 2210 so as to allow electromagnetic waves within a predetermined frequency range to pass. In the example shown in FIG. 6B, by increasing the "depth" of the concave portions 2213 the length of each linear structure 2212 may be increased, thereby increasing the inductance value of the pattern unit 2210. In addition, the concave portion 2213 and the gaps among the pattern units spaced apart from each other may run through the entire frequency selective section 22.

Figure 7A:
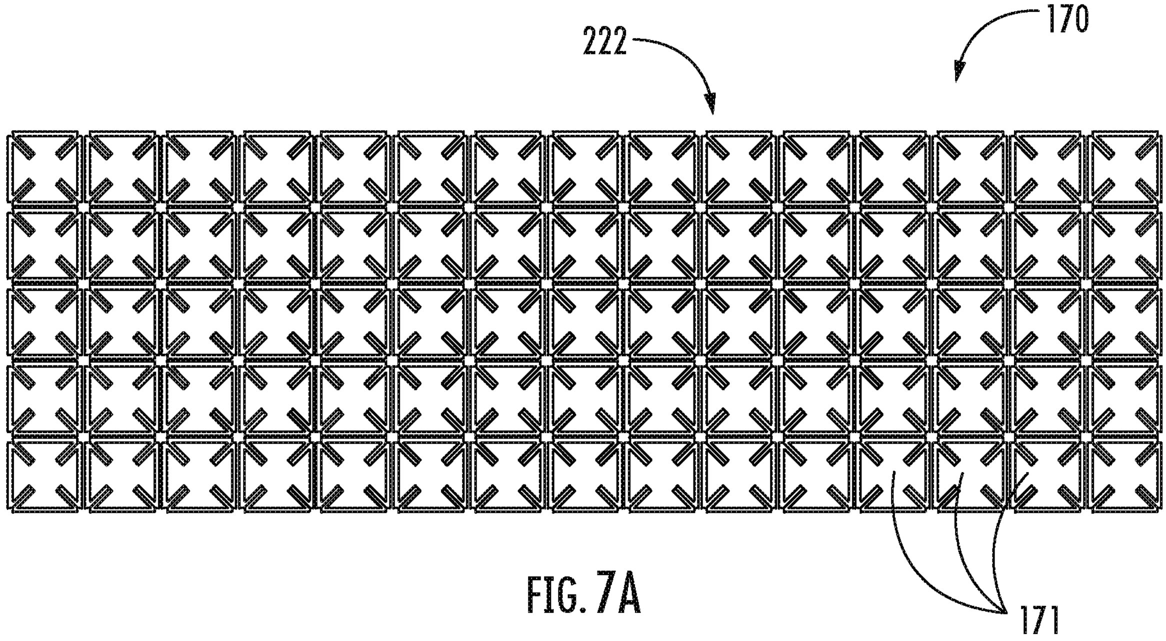
FIG. 7A is a front view of a section of another embodiment of a grid reflector according to embodiments of the present invention.
Figure 7B:
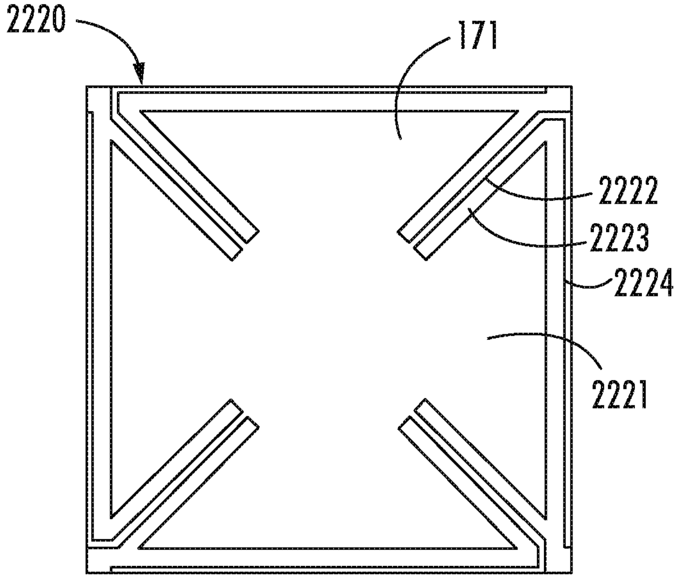
FIG. 7B is an enlarged front view of a unit cell of the grid reflector shown in FIG. 7A.

FIG. 7A is a front view of a grid reflector 170 with a frequency selective section 222 according to another embodiment of the present disclosure. FIG. 7B is a schematic front view of a single unit cell 171 showing pattern unit 2220 in the frequency selective section 222 shown in FIG. 7A. As shown in FIG. 7A and FIG. 7B, the pattern unit 2220 may be rectangular or substantially square, e.g., bounded by four sides of equal or about equal lengths. For the "substantially" square configuration, the lengths can vary in a range of about +/−20% from one another. The pattern unit 2220 may include a sheet structure 2221 and a plurality of linear structures 2222. The linear structures 2222 may extend outwardly from respective concave portions 2223 of the sheet structure 2221. The sheet structure 2221 has a substantially square shape. The linear structures 222 are electrically connected to respective linear structures 2222 in an adjacent pattern unit 2220. The sheet structure 2221 forms a capacitor structure, and the linear structures 2222 form respective inductor structures. The concave portions 2223 are located at corners of the square. As such, the linear structures 2222 extend long the diagonal direction of the square, which is beneficial to increase the length of each linear structure 2222. In addition, in order to further increase the length of the linear structure 2222, each linear structure 2222 may also have a part 2224 that is parallel to a side of the square. The parallel part 2224 may significantly increase the length of the linear structure 2222, thereby increasing the inductance value of the pattern unit 2220.

Figure 8A:
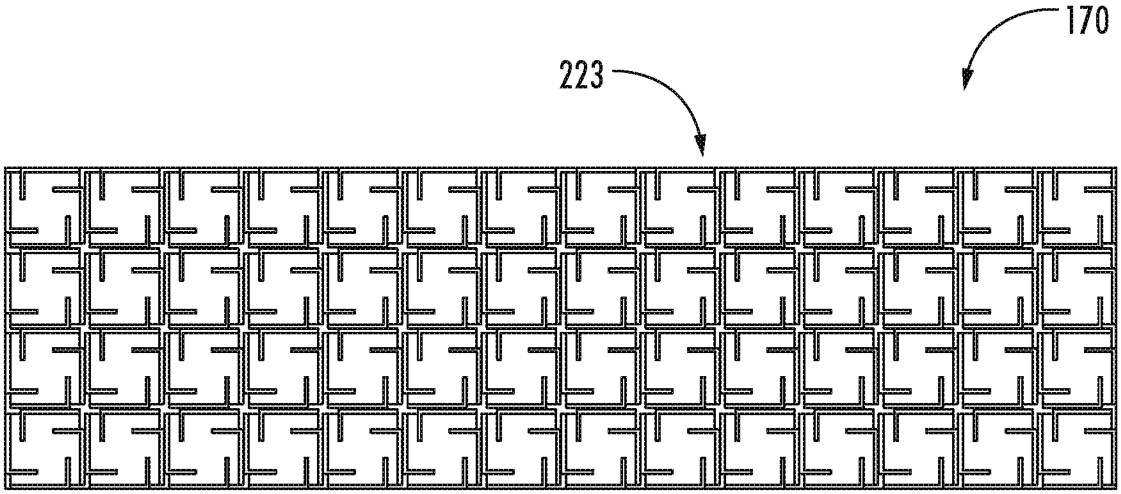
FIG. 8A is a front view of a section of another embodiment of a grid reflector according to embodiments of the present invention.
Figure 8B:
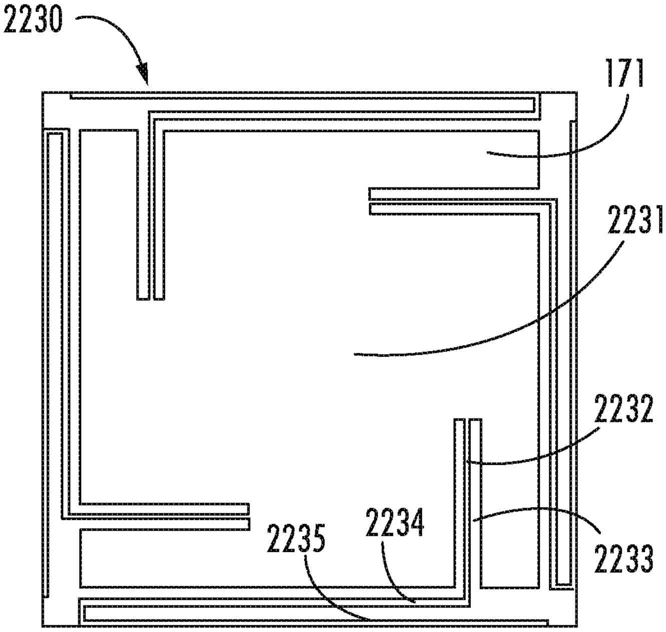
FIG. 8B is an enlarged front view of a unit cell of the grid reflector shown in FIG. 8A.

FIG. 8A is a front view of a grid reflector 170 with a frequency selective section 223 and unit cells 171 according to another embodiment of the present disclosure. FIG. 8B is a schematic front view of a single unit cell 171 showing pattern unit 2230 in the frequency selective section 223 shown in FIG. 8A. As shown, the pattern unit 2230 may be substantially square or rectangular, similar to the perimeter discussed with respect to FIGS. 7A/7B. The pattern unit 2230 may include a sheet structure 2231 and a plurality of linear structures 2232, and each linear structure 2232 may extend outward from a respective concave portion 2233 of the sheet structure 2231. The sheet structure 2231 may have a substantially square shape. Each linear structure 2232 may be electrically connected to a respective linear structure 2232 in an adjacent pattern unit 2230. The sheet structure 2231 forms a capacitor structure, and the linear structures 2232 forms inductor structures. In addition, in order to increase the length of each linear structure 2232, the linear structure 2232 may also have parts 2234 and 2235 that extend parallel to a side of the substantially square-shaped sheet structure 2231. With the two parallel parts 2234 and 2235, the length of each linear structure 2232 can be increased to increase the inductance value of the pattern unit 2230.

Figure 9A:
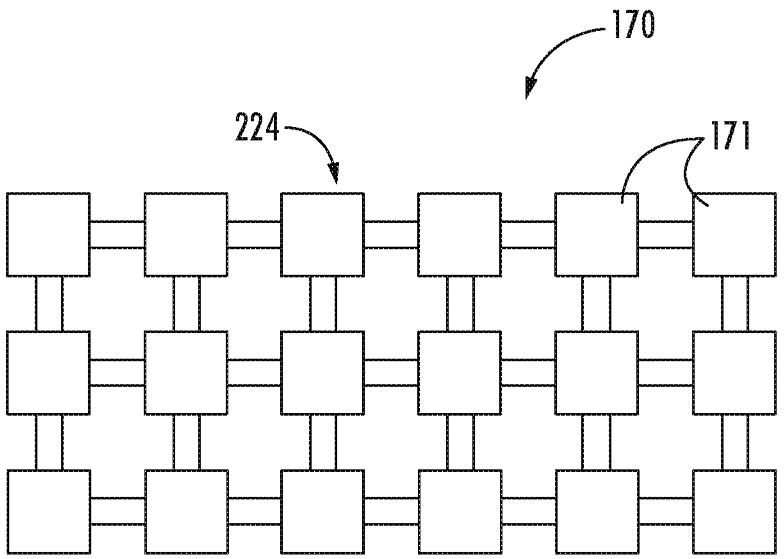
FIG. 9A is a front view of a section of another embodiment of a grid reflector of according to embodiments of the present invention.
Figure 9B:
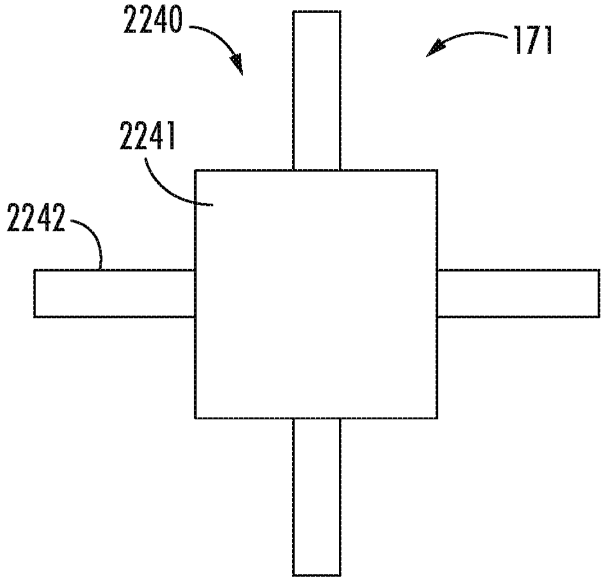
FIG. 9B is an enlarged front view of a unit cell of the grid reflector shown in FIG. 9A.

FIG. 9A is a schematic front view of a grid reflector 170 with a frequency selective section 224 according to still further embodiments of the present disclosure. FIG. 9B is a schematic front view of a single unit cell 171 with the pattern unit 2240 in the frequency selective section 224 shown in FIG. 9A. As shown in FIGS. 9A, 9B, the pattern unit 2240 may include a sheet structure 2241 and a plurality of linear structures 2242. The linear structures 2242 extend outwardly from the corresponding sides of the substantially square-shaped sheet structure 2241 so as to be electrically connected to the linear structures 2242 in adjacent pattern units 2240. The sheet structure 2241 forms a capacitor structure, and the linear structures 2242 form respective inductor structures.

Figure 10:
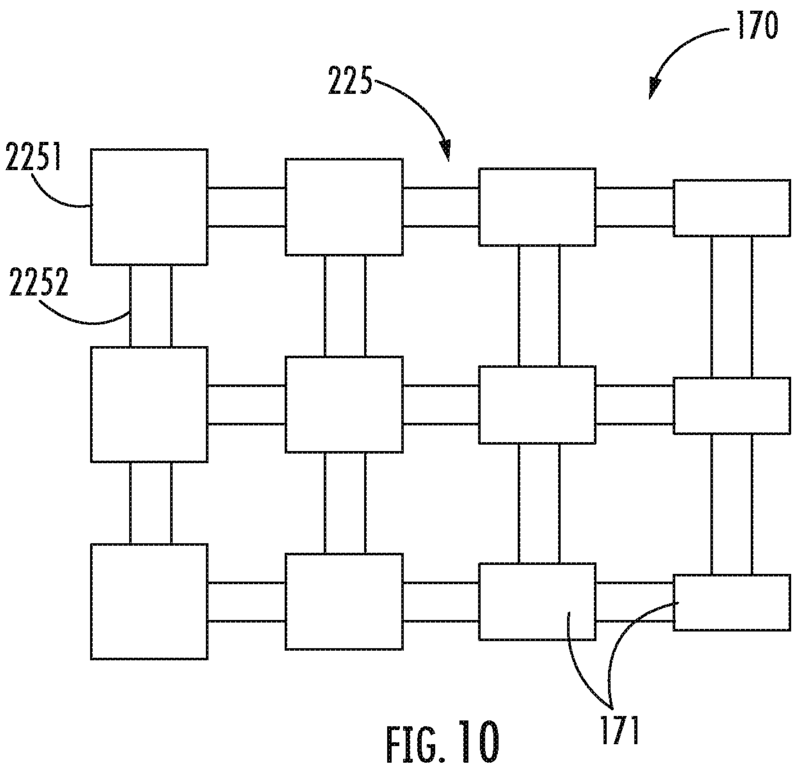
FIG. 10 is a front view of another embodiment of a grid reflector according to embodiments of the present invention.

In some embodiments according to the present disclosure, one or more, even each, unit cell/pattern unit 171 may have a different size. FIG. 10 is a schematic front view of a grid reflector 170 with a frequency selective section 225 according to an embodiment of the present disclosure, in which the area of the sheet structure 2251 in each pattern unit gradually decreases from left to right. Correspondingly, the length of the linear structure 2252 in each pattern unit gradually increases from left to right. Of course, the present disclosure is not limited thereto, and the area of the sheet structure 2251 in each pattern unit may also gradually increase from left to right and/or have other configurations. Correspondingly, the length of the linear structure 2252 in each pattern unit gradually decreases from left to right. In addition, the area of the sheet structure 2251 and the length of the linear structure 2252 in each pattern unit may also change in other ways, for example, may alternately increase and decrease, etc. By reasonably setting parameters such as the area of the sheet structure 2251 and the length of the linear structure 2252, it is possible to achieve the passage of electromagnetic waves within a predetermined frequency range by using the example embodiment of a frequency selective section 225 shown in FIG. 10.

Figure 11:
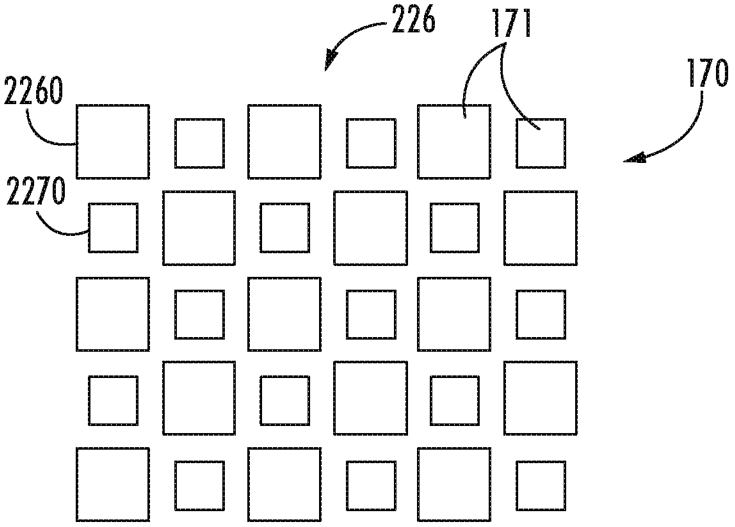
FIG. 11 is a front view of another embodiment of a grid reflector according to embodiments of the present invention.
Figure 12A:
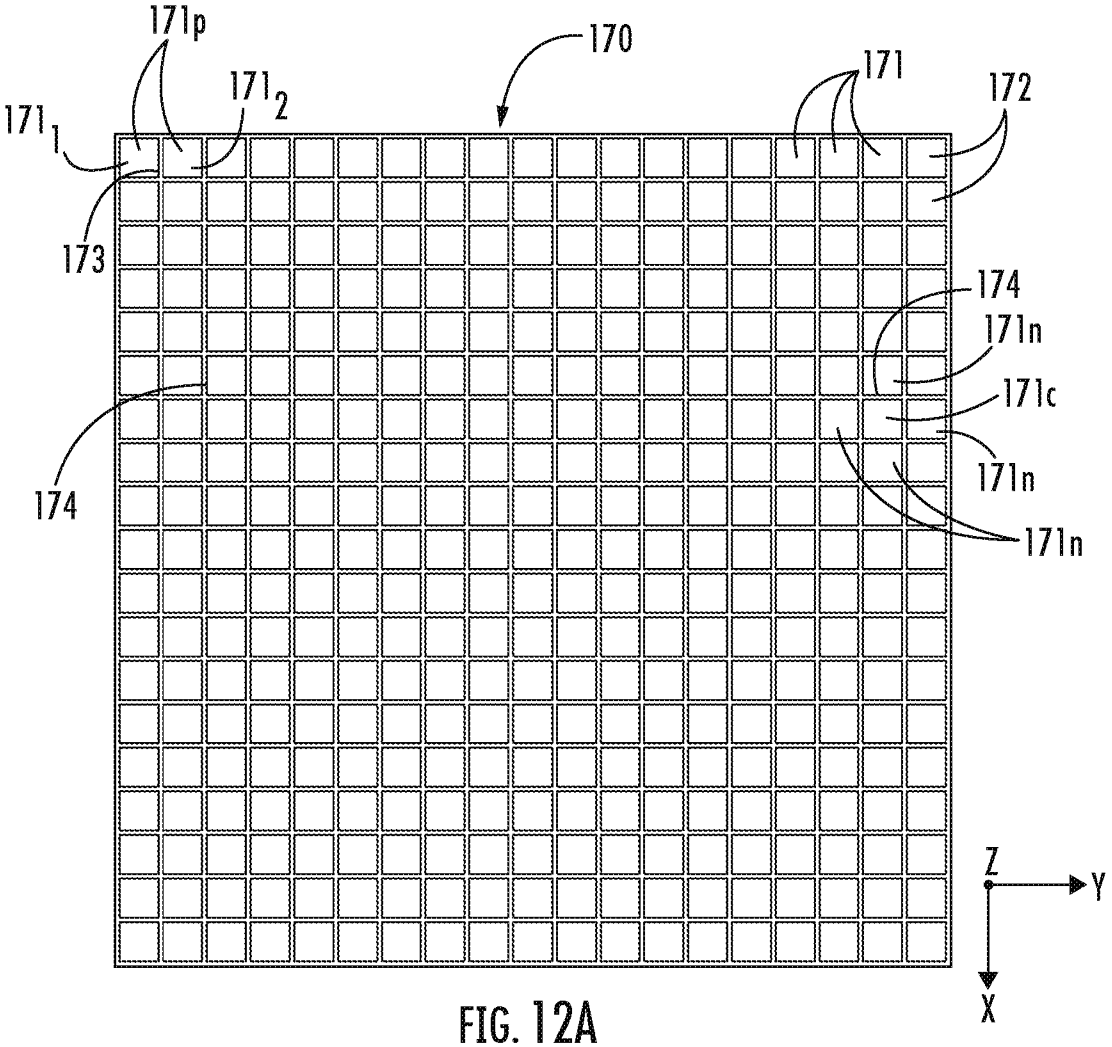
FIG. 12A is a front view of another embodiment of a grid reflector for a base station antenna according to embodiments of the present invention.
Figure 12B:
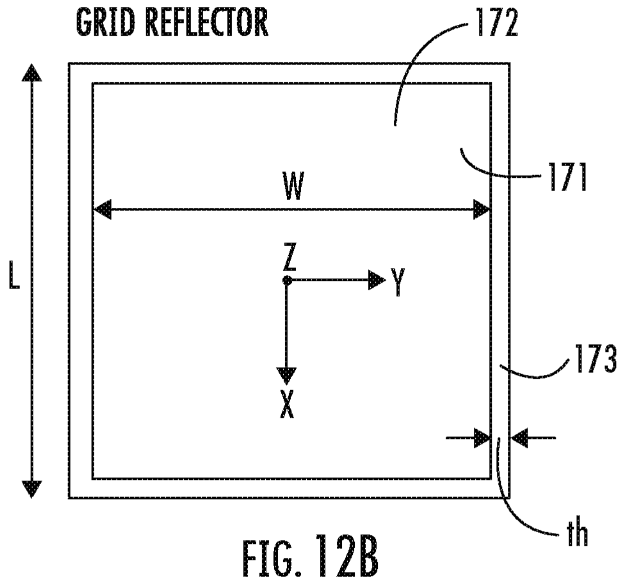
FIG. 12B is a greatly enlarged front view of a unit cell of the grid reflector shown in FIG. 12A.

In some embodiments according to the present disclosure, the grid reflector 170 can have a frequency selective section that may alternatively or also have a plurality of unit cells/pattern units 171 with different configurations. FIG. 11 shows a grid reflector 170 with a frequency selective section 226 having pattern units/unit cells 171 of different configurations according to an embodiment of the present disclosure. As shown in FIG. 11, the frequency selective section 226 may include pattern units 2260 and 2270 with two different configurations. The pattern units 2260 and 2270 may be arranged alternately. It should be noted that FIG. 11 does not show the specific configurations of the pattern units 2260 and 2270. Those skilled in the art can design suitable configurations and parameters such as the spacing of the pattern units according to the teaching of the present disclosure such that the frequency selective section 226 shown in FIG. 11 can allow electromagnetic waves within a predetermined frequency range to pass. For example, each unit cell 171 and/or pattern unit 2260 may have any of the pattern unit configurations discussed above and each pattern unit 2270 may have any of the pattern unit configurations discussed above.

In addition, although the pattern units in the illustrated embodiments are rectangular or substantially square, the present disclosure is not limited thereto. The unit cells/pattern unit 171 may have various shapes, such as triangle, rectangle, rhombus, pentagon, hexagon, circle, oval, and the like and combinations of different shapes for different unit cells.

In some embodiments according to the present disclosure, the frequency selective section may be configured as a slotted frequency selective section, which may be achieved by periodically opening slots of metal units on a metal plate and forming various pattern units periodically arranged as shown in FIGS. 5A to 11, for example. To this end, in an embodiment according to the present disclosure, a slot may be formed by punching or laser direct structuring (LSD) at a corresponding position of the metallic main body 21 to form a frequency selective section. The main body 21 and the frequency selective section 22 may be integrally formed of a metal plate, thereby ensuring that the formed frequency selective reflector 20 has sufficient strength. In other embodiments, the main body 21 and the frequency selective section 22 may be formed as separate components and then coupled or fixed together in an appropriate manner to form the grid (frequency selective) reflector 170. In some embodiments, the main body 21 and the frequency selective section 22 may also be made of different materials.

In some embodiments according to the present disclosure, the grid reflector 170 can comprise a patch type frequency selective section, which may be achieved by forming periodically arranged metal pattern units on a substrate. The plurality of metal pattern units may be formed on the substrate by a selective electroplating process or a metal ink transfer printing process. In some embodiments, the substrate may be formed of plastic, and the metal pattern unit may be formed of metal materials such as copper, aluminum, gold, and silver. In order to increase the strength of the frequency selective reflector 170, the substrate may be formed of high-strength plastic.

Turning now to FIGS. 12A-22, the grid reflector 170 can be configured with the unit cells 171 having an open center interior 172 devoid of metal and each unit cell 171 can include a metal perimeter 173. The grid reflector 170 can be provided as a single layer of sheet metal providing the unit cells 171 with the open centers or interiors 172 devoid of metal.

In some embodiments, the open centers 172 can be open to atmosphere/local environmental conditions. In other embodiments, the grid reflector 170 comprises a dielectric cover 271 (FIG. 23C) extending over the unit cells 171. The dielectric cover 271 can comprise fiberglass, a printed circuit board, or a plastic, such as polymer or copolymer. The dielectric cover 271 may improve low and/or mid band reflection. The dielectric cover 271 (FIG. 23C) may be attached to the grid reflector 170 to extend over (in front of and/or behind) each unit cell 171.

The grid reflector 170 is configured to allow RF energy (electromagnetic waves) to pass through at one or more first defined frequency range and is also configured to reflect RF energy at a different second frequency range/band.

A pair 171*p* of neighboring unit cells 171 can share a metal (line) segment 174 defining part of each unit cells' outer perimeter 173. As shown, one unit cell 171*c* can be surrounded by a plurality of neighboring unit cells 171*n*, each neighboring unit cell 171*n* (shown as four neighboring unit cells 171*n* in this embodiment) sharing a perimeter metal line segment 174 with the center cell 171*c*.

Figure 13A:
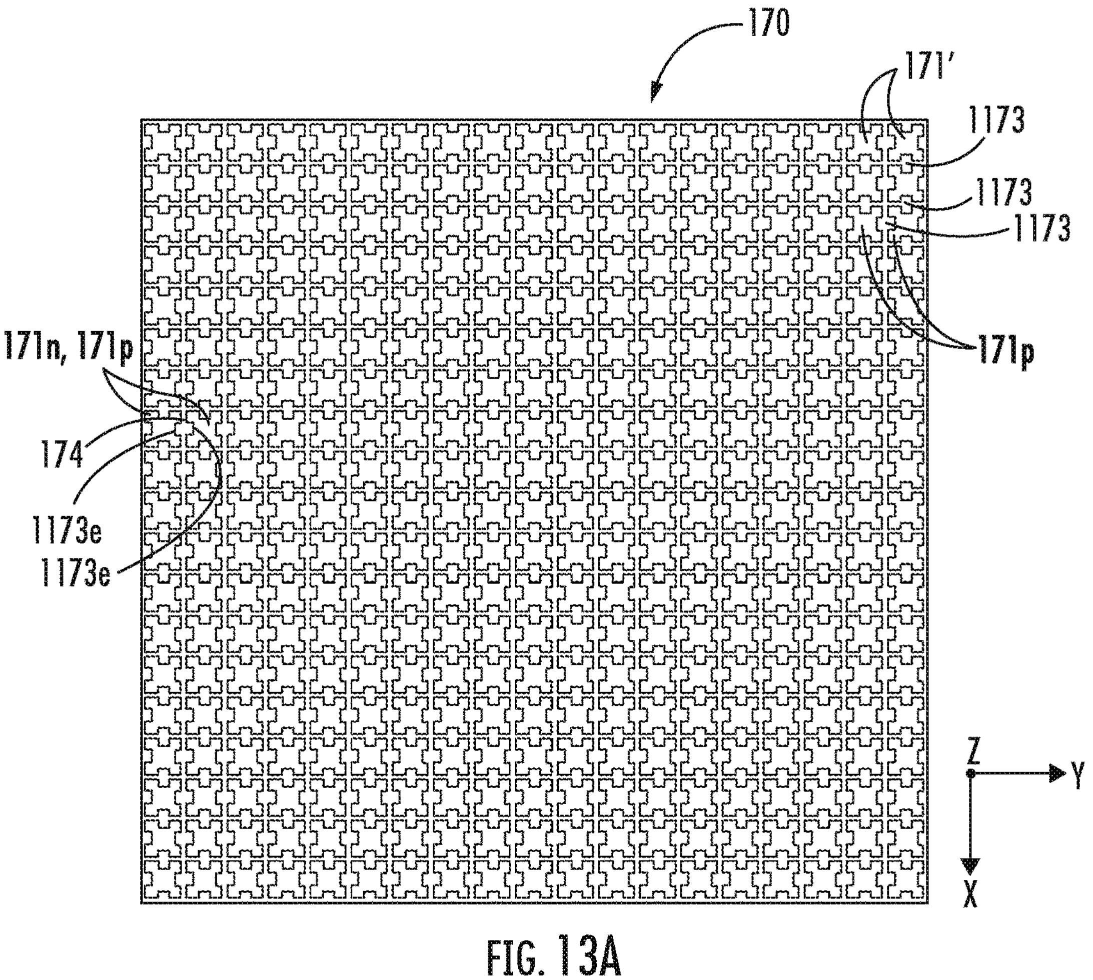
FIG. 13A is a front view of an example grid reflector for a base station antenna according to embodiments of the present invention.
Figure 13B:
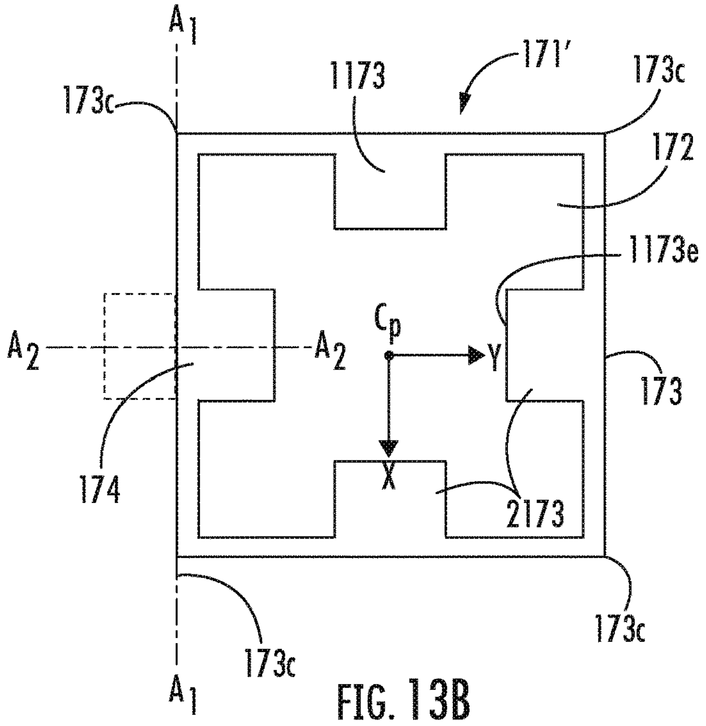
FIG. 13B is a greatly enlarged front view of a unit cell of the grid reflector shown in FIG. 13A.

Referring to FIGS. 13A and 13B, in this example, the grid reflector 170 comprises at least one shaped metal region 1173 positioned about the perimeter 173 of the respective unit cells 171'. A shared metal segment 174, which can be a line of metal, forming part of respective perimeters 173 of neighboring 171*n* unit cells 171, can merge into or extend across least one shaped metal segment 1173. The shaped metal region 1173 can extend beyond the shared metal segment 174 such that opposing inner free ends 1173*e* can project inwardly toward the center space 172 and terminate at a location laterally and/or longitudinally offset from a center of a respective unit cell 171'.

Figure 14A:
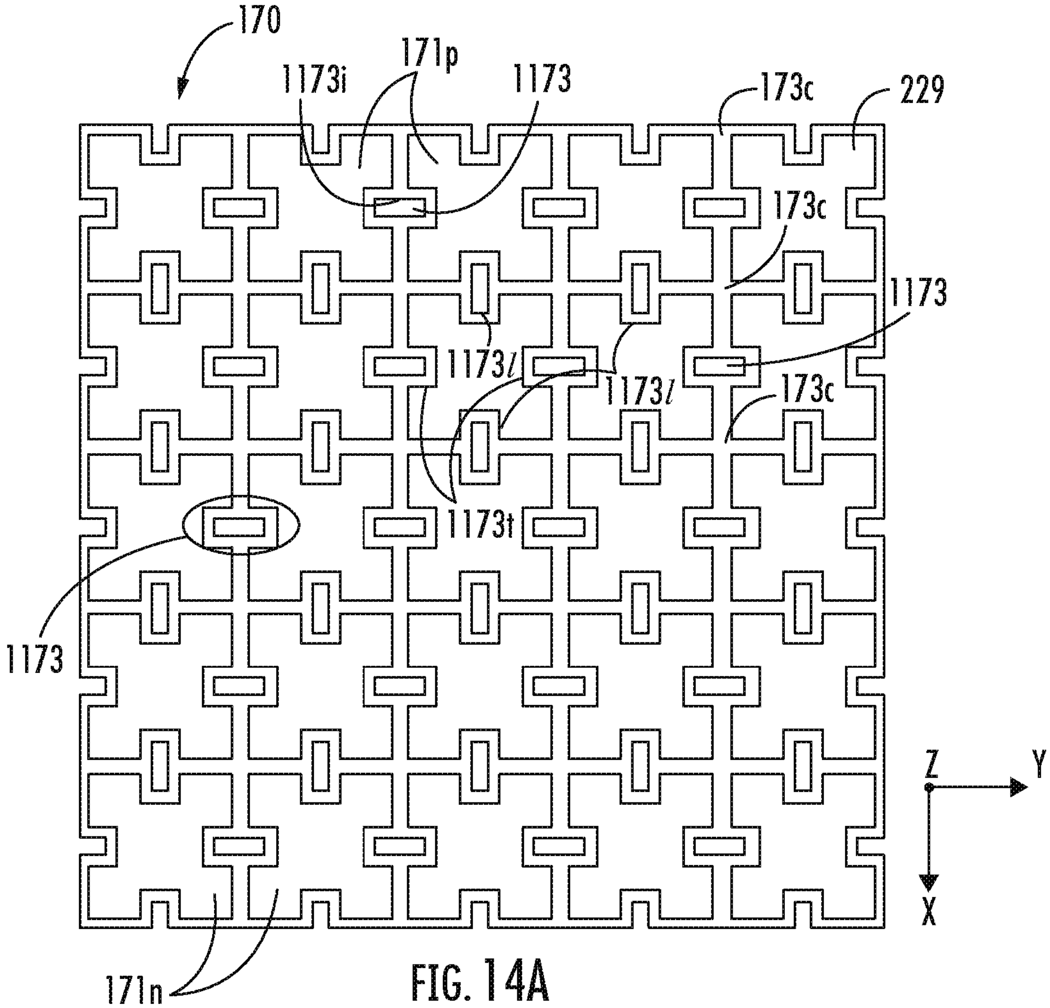
FIG. 14A is a front view of an example grid reflector for a base station antenna according to embodiments of the present invention.
Figure 14B:
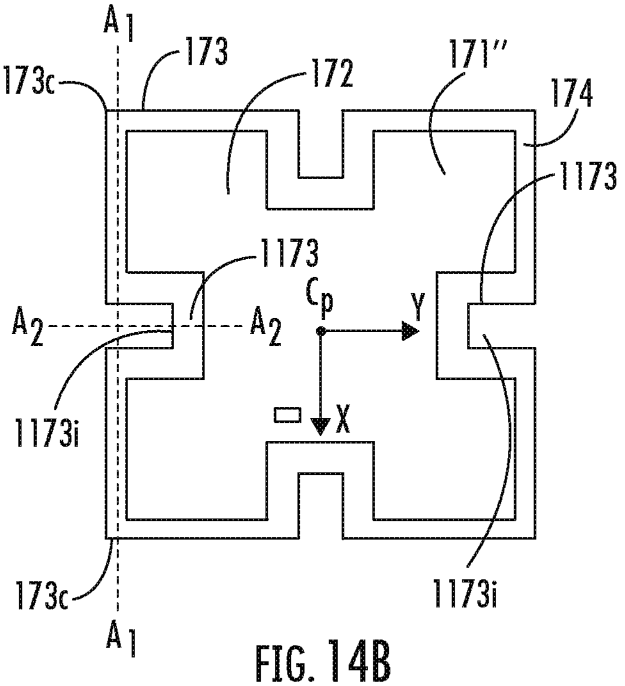
FIG. 14B is a greatly enlarged front view of a unit cell of the grid reflector shown in FIG. 14A.

FIGS. 14A and 14B illustrate another example of a grid reflector 170. Similar to FIGS. 13A, 13B, the grid reflector 170 comprises at least one shaped metal region 1173 positioned about the perimeter 173 of the respective unit cells 171". The shaped metal region 1173 can have an open interior space 1173*i* rather than the closed shaped metal region shown in FIGS. 13A/13B. The shaped metal region 1173 can have a perimeter 1173*p* surrounding an open interior space 1173*i* that is smaller than the open space 172 of the unit cells 171. The shaped metal region 1173 can have opposing first and second ends 1173*e* and first end 1173*e* extends into the first unit cell and the second end 1173*e* extends into the second unit cell. Grid reflectors 170 with shaped metal regions 1173 with open interior spaces 1173*i* can reduce a weight of the reflector while also providing increased current path.

Referring to FIGS. 13A, 13B, 14A, 14B, the shared metal segment 174 of the metal perimeter line 173 shared by neighboring 171*n* unit cells 171 can attach to at least one shaped metal region 1173 (above and below or to the right and left side thereof) and a first part of the shaped metal region 1173 resides inside a first unit cell 171 of the pair 171*p* of neighboring unit cells and a second part of the shaped metal region 1173 resides inside a second unit cell 171 of the pair 171*p* of neighboring 171*n* unit cells 171.

The shaped metal regions 1173 are shown as rectangles but other shapes may be used. The rectangles, where used, can be oriented such that two long sides extend laterally, and two long sides extend longitudinally, about a perimeter 173 of respective unit cells 171.

In some embodiments, the unit cells 171 comprise perimeters 173 with corners 173*c* and the grid reflector 170 can be configured so that a shaped metal region 1173 extends along a sub-length of a shared metal segment 174 (of immediately adjacent, neighboring unit cells 171), shown as metal line segments, of the perimeter 173 between a pair of spaced apart corners 173*c*.

Referring to FIGS. 13B and 14B, in some embodiments, the shaped metal regions 1173 are configured so that a first axis of symmetry $A_1$-$A_1$ aligns with the shared metal line segment 174 of the metal perimeter 173. The shaped metal regions 1173 can also be configured so that a second axis of symmetry $A_2$-$A_2$, that is perpendicular to the first axis of symmetry $A_1$-$A_1$, aligns with a center point Cp of a respective unit cell 171.

Figure 15A:
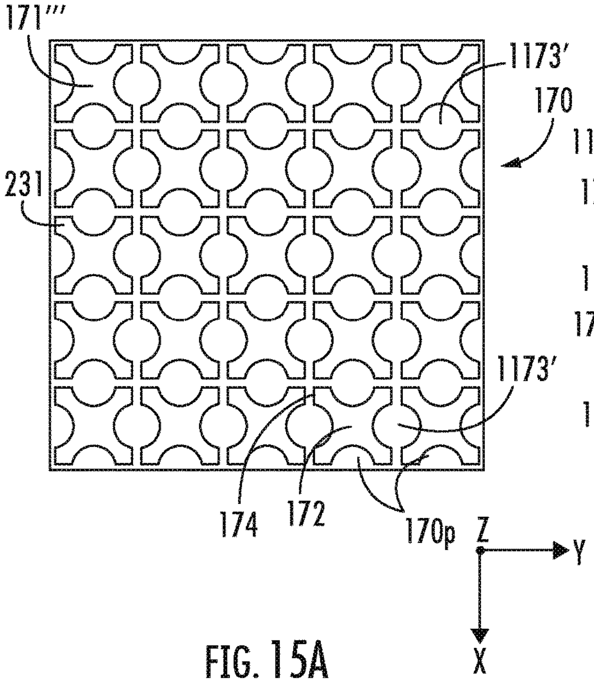
FIG. 15A is a front view of an example grid reflector for a base station antenna according to embodiments of the present invention.
Figure 16A:
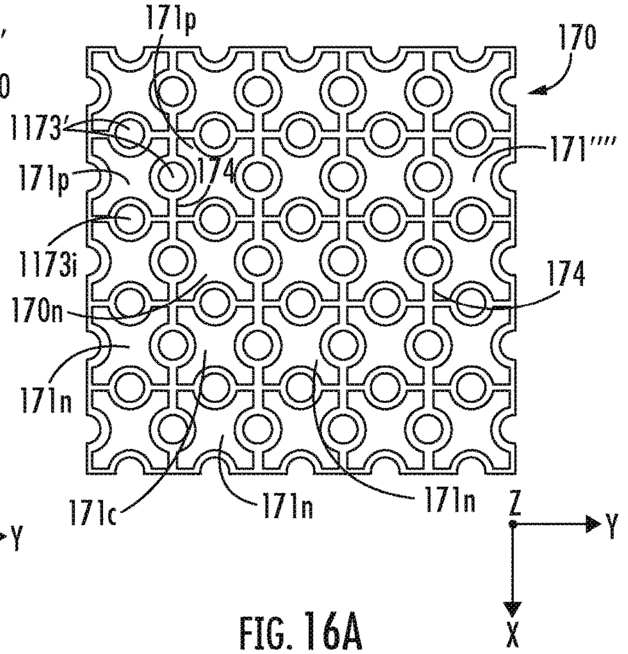
FIG. 16A is a front view of an example grid reflector for a base station antenna according to embodiments of the present invention.
Figure 15B:
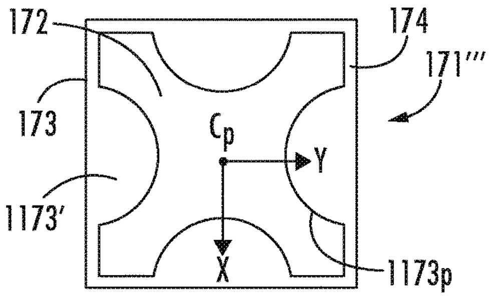
FIG. 15B is a greatly enlarged front view of a unit cell of the grid reflector shown in FIG. 15A.
Figure 16B:
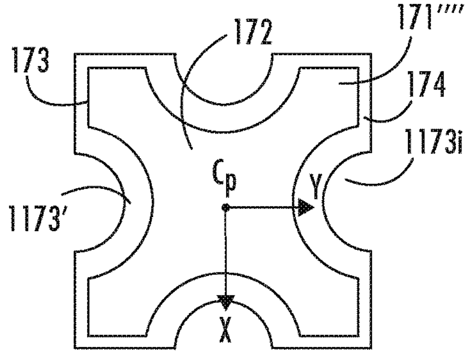
FIG. 16B is a greatly enlarged front view of a unit cell of the grid reflector shown in FIG. 16A.
Figure 17A:
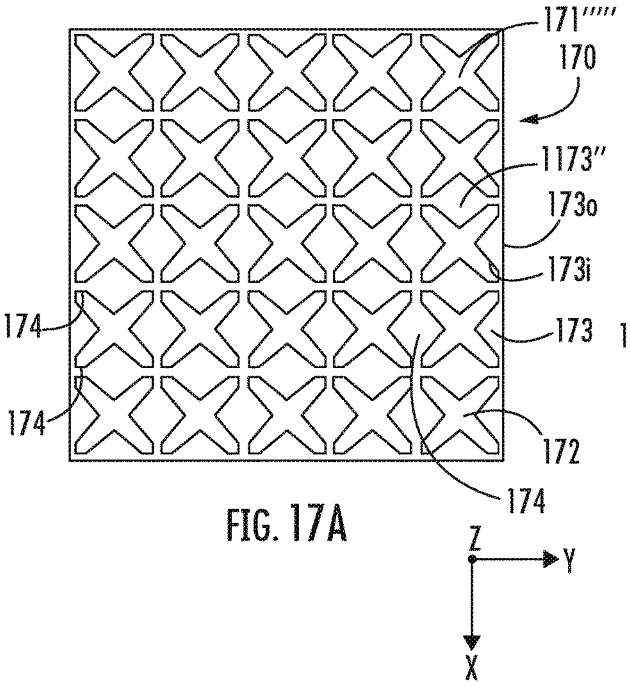
FIG. 17A is a front view of an example grid reflector for a base station antenna according to embodiments of the present invention.
Figure 26B:
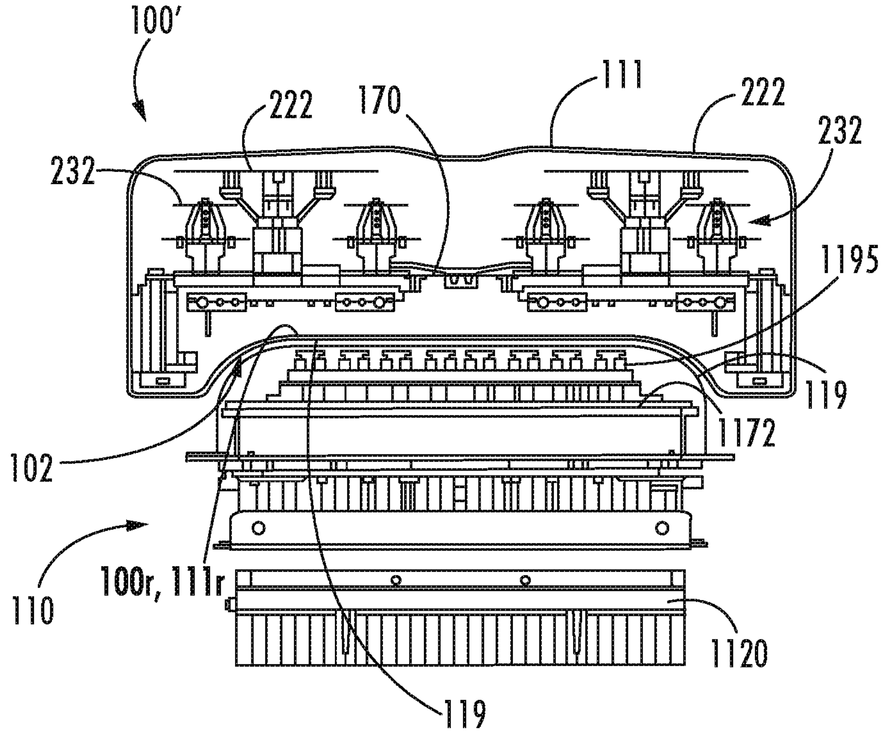

FIGS. 15A, 15B, 16A, 16B illustrate additional examples of the grid reflector 170 with metal shaped regions 1173' spaced apart about the perimeter 173 of the unit cells 171''', 171'''', respectively, and with the open center space 172 of the unit cells. In these embodiments, the shaped metal regions 1173' have a circular outer perimeter **1173*p* when in the grid 170 and arcuate when shown with respect to a single unit cell 171''' (FIGS. 15B, 16B). FIGS. 16A, 26B illustrate that the shaped metal regions 1173' can have an open interior space 1173*i*. The open interior space 1173*i* can be circular as shown or have other shapes such as polygonal, oval, triangular and the like. As before a pair 171*p* of neighboring 171*n* cells 171''' (FIG. 15A) or 171'''' (FIG. 16A) share a metal line segment 174 forming part of a respective perimeter 173**.

Figure 18A:
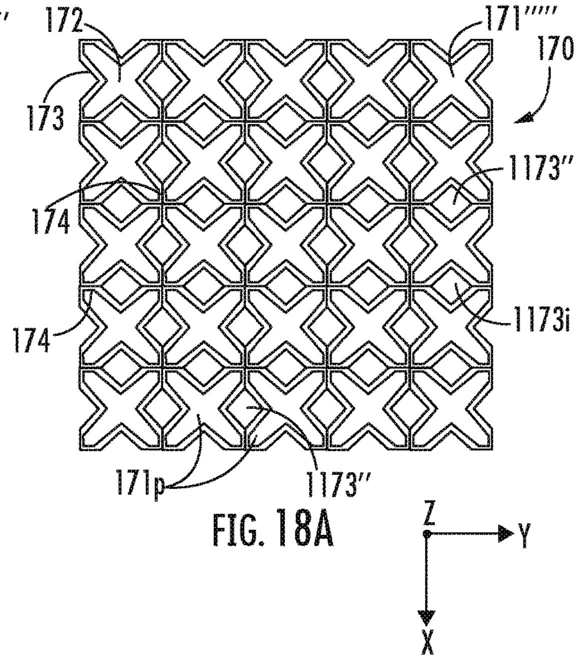
FIG. 18A is a front view of an example grid reflector for a base station antenna according to embodiments of the present invention.
Figure 17B:
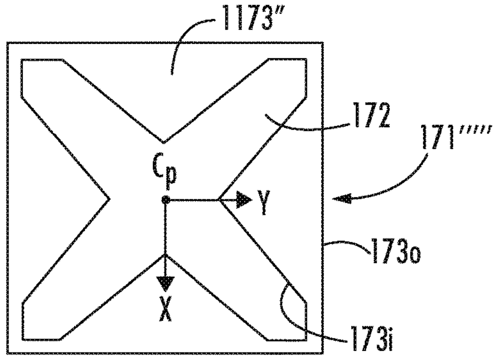
FIG. 17B is a greatly enlarged front view of a unit cell of the grid reflector shown in FIG. 17A.
Figure 18B:
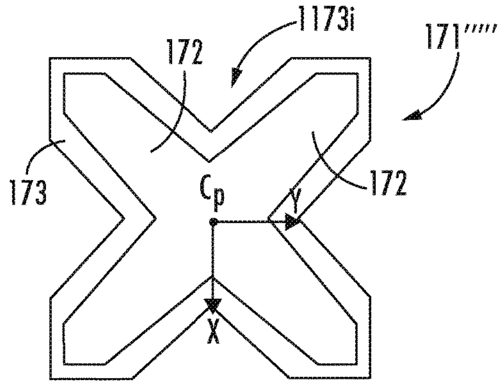
FIG. 18B is a greatly enlarged front view of a unit cell of the grid reflector shown in FIG. 18A.
Figure 19A:
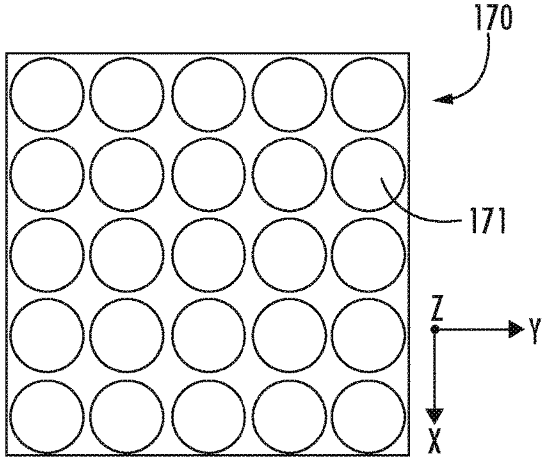
FIGS. 19A-19D are front views of additional embodiments of the grid reflector according to embodiments of the present invention.
Figure 19B:
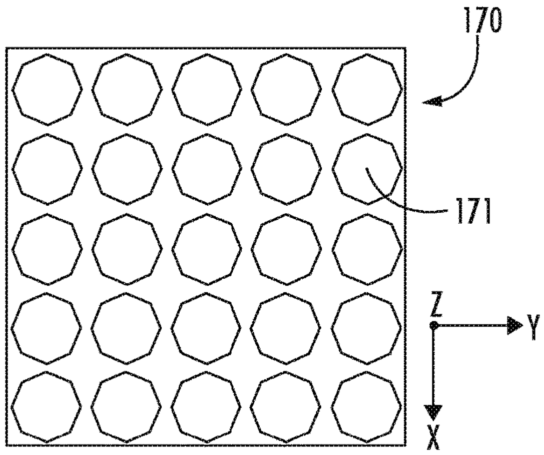
Figure 19C:
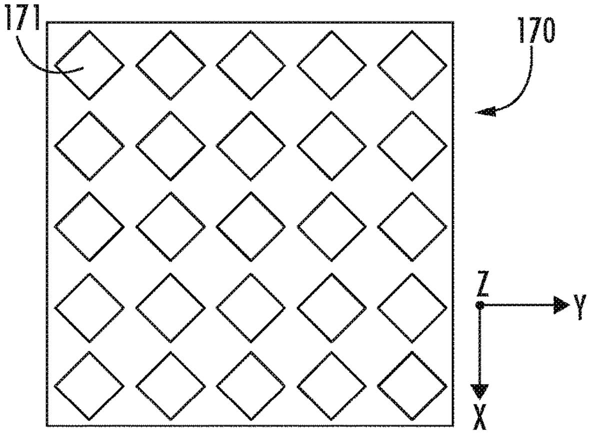
Figure 19D:
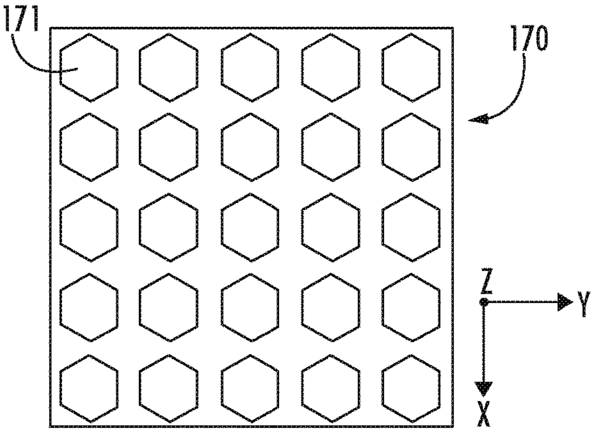

FIGS. 17A, 17B, 18A and 18B illustrate additional example grid reflectors 170. In these embodiments, the unit cells 171''''' each have a hollow "X" shape defining an open space 172 with an open center point Cp and open angular spaces that cross the center point Cp to form the "hollow" X shape. The metal perimeter 173 can have an inner perimeter **173*i* that has a different shape than an outer perimeter 1730 forming the metal perimeter 173. The inner perimeter 173 is shaped to provide the angular spaces of the open center 172. The shaped metal region 1173" positioned about the perimeter 173 can comprise a triangular shape for a respective unit cell 171''''' with a long side thereof that faces another long side of a neighboring triangular shape 1173' in the grid reflector 170. The shaped metal regions 1173' can define part of a perimeter segment 174 of neighboring unit cells 171'''''. FIGS. 18A, 18B illustrate that the shaped metal region 1173' can have an open or hollow interior space 1173*i* forming "diamond" shape two-dimensional cutouts in the grid reflector 170**.

FIGS. 19A-19D illustrate additional examples of grid reflectors 170 with different shapes of the open interior spaces 174 of respective unit cells 171, shown as circular, diamond and polygonal, such as octagonal and heptagon.

The unit cells 171 of the grid reflectors 170 can have other shapes and may be symmetrical.

In some embodiments, the unit cells 171 may have asymmetric configurations.

The grid reflector 170 can be configured so that the array of unit cells 171 can be asymmetrical about one or more axis.

The metal perimeters of respective unit cells 171 can be sufficiently narrow to accommodate the angle of incidence of RF energy from radiating elements behind the grid reflector while allowing the RF energy to propagate forward while concurrently reflecting RF energy from radiating elements in front of the grid reflector 170 as the RF energy from the radiating elements behind the grid reflector 170 may propagate forward in a number of angular directions.

Figure 20:
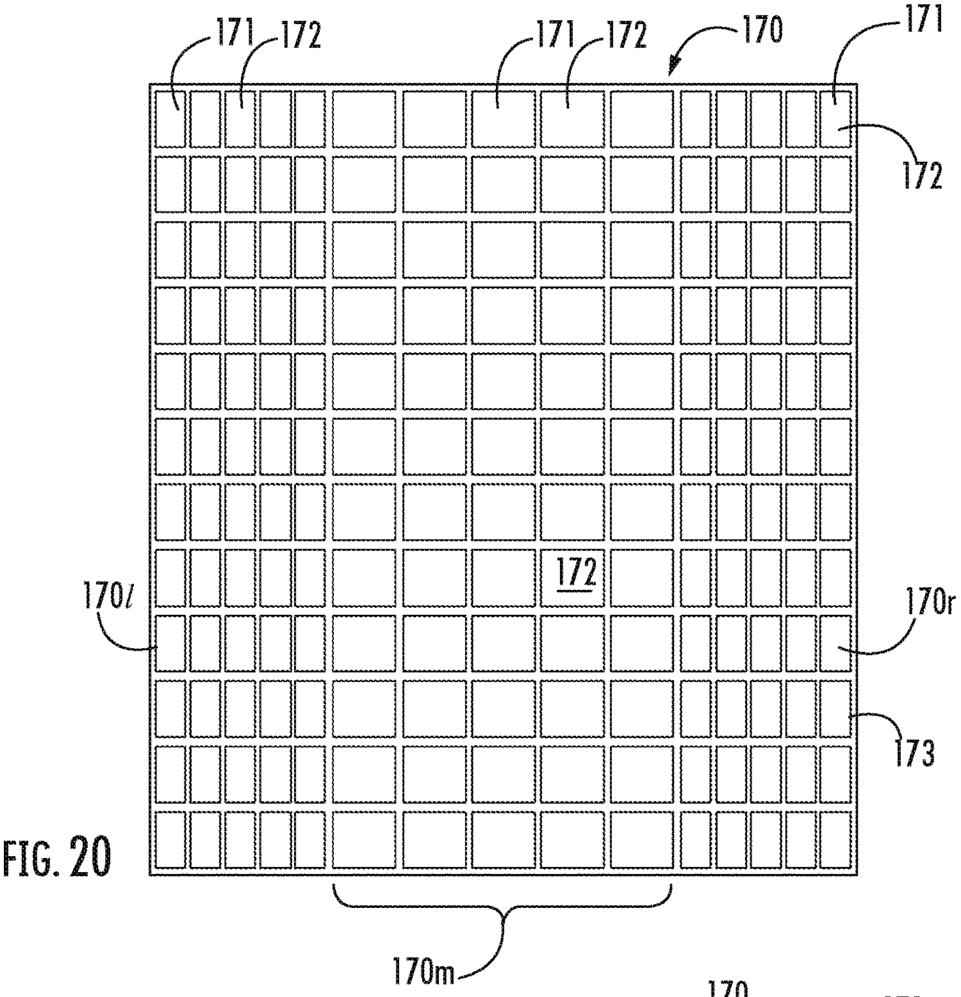
FIGS. 20-22 are front views of yet additional embodiments of the grid reflector according to embodiments of the present invention.
Figure 21:
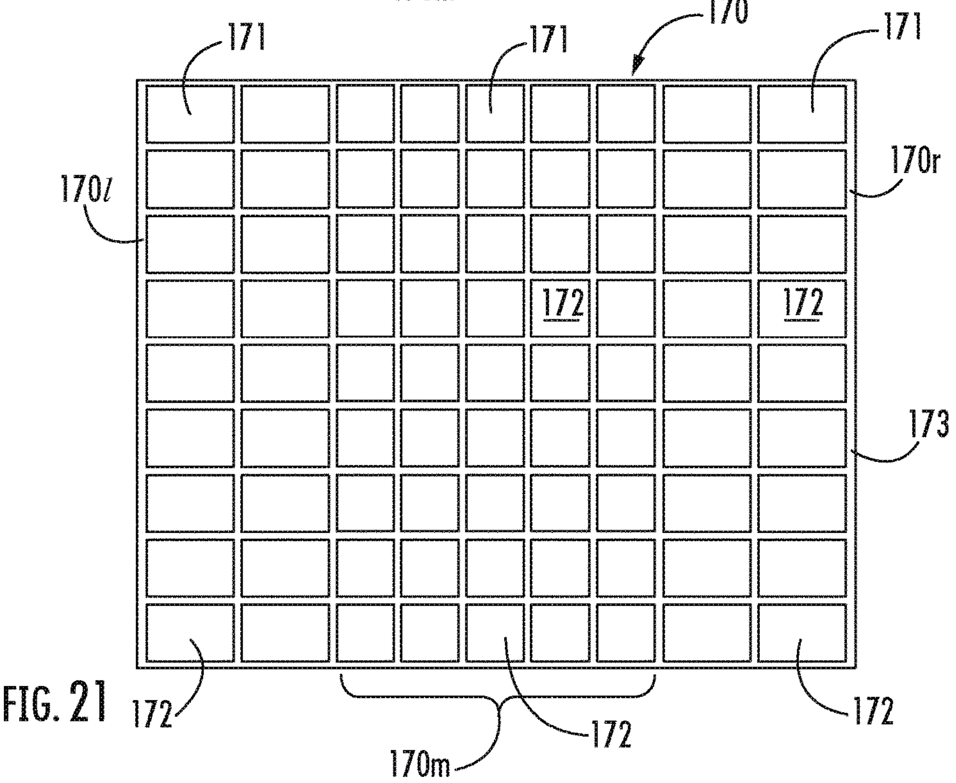
Figure 22:
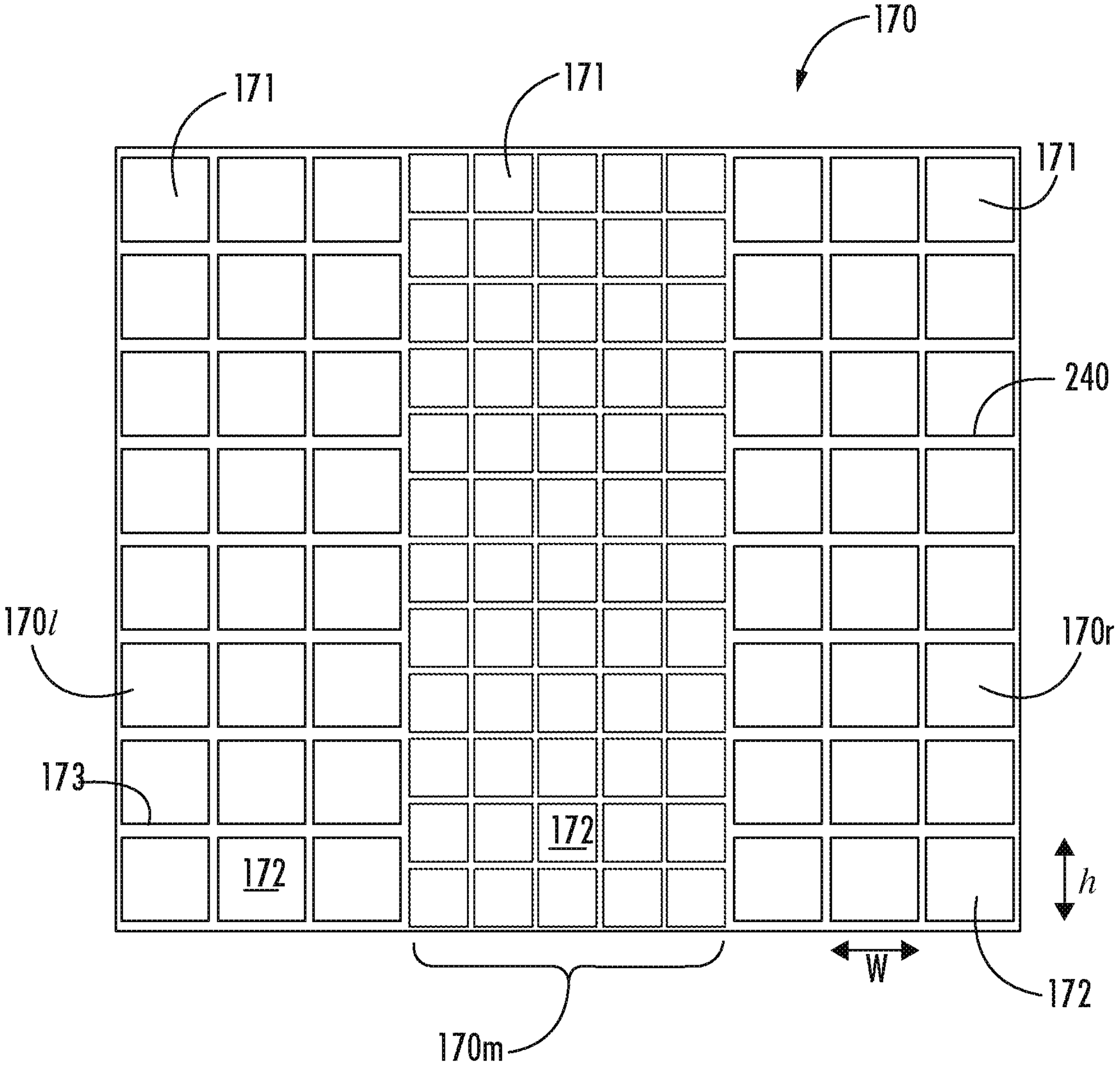

Referring to FIGS. 20-22, the grid reflector 170 can be configured so that there are different densities of unit cells 171 at different locations. In some embodiments the grid reflector 170 can be configured so that unit cells 171 may be asymmetric about one or more axes to, for example, improve cross-polarization performance. The metal perimeters 173 can vary in width about a respective perimeter of a unit cell 171.

FIG. 20 illustrates a greater density of unit cells 171 at left and right side portions, **170*r*, 170*l* relative to a medial portion 170*m*. FIG. 20 also illustrates that unit cells 171 located at a medial portion 170*m* of the grid reflector 170, can have a larger surface area, height and/or width, shown as a common height dimension and different width dimensions (and with larger center spaces 172) than unit cells 171 located at the left and right side portions 170*r*, 170*l***.

FIG. 21 illustrates a greater density of unit cells 171 at a medial portion **170*m* of the grid reflector 170 relative to the unit cells 171 at right and/or left side portions 170*r*, 170*l*. FIG. 21 also illustrates that unit cells 171 located at right and left side portions 170*r*, 170*l* can have a larger surface area, height and/or width, shown as a common height and larger width (with larger center spaces 172) than unit cells 171 located at the medial portion 170*m***.

FIG. 22 illustrates a greater density of unit cells 171 at a medial portion **170*m* of the grid reflector 170 relative to the unit cells 171 at right 170*r* and/or left side 170*l* portions. FIG. 22 also illustrates that unit cells 171 located at right and left side portions) 170*r*, 170*l* can have a larger surface area, height and width, (with larger center spaces 172) than unit cells 171 located at the medial portion 170*m***.

The grid reflector 170 can be configured to merge into or attach to longitudinally extending right and left side **214*s* of (solid) surfaces of the primary reflector 214 at one or more locations, such as along longitudinally extending outer sides 170*s* (FIG. 15A). The grid reflector 170** can be configured to have different unit cell configurations and/or sizes at different locations.

When configured to allow high-band energy to pass through the grid reflector 170, thick/wide grid perimeters 173 surrounding the open spaces 172 of the unit cells 171 should be avoided to reduce blockage at off-angle scans at high band.

In some embodiments, the grid reflector 170 of the passive antenna assembly 190 can be configured to act like a High Pass Filter essentially allowing low band energy to completely reflect as the grid is formed by a sheet of metal while allowing higher band energy, for example, about 3.5 GHz or greater, to pass through, typically substantially completely pass through. Thus, the grid reflector 170 is transparent or invisible to the higher band energy and a suitable out of band rejection response can be achieved.

Figure 23A:
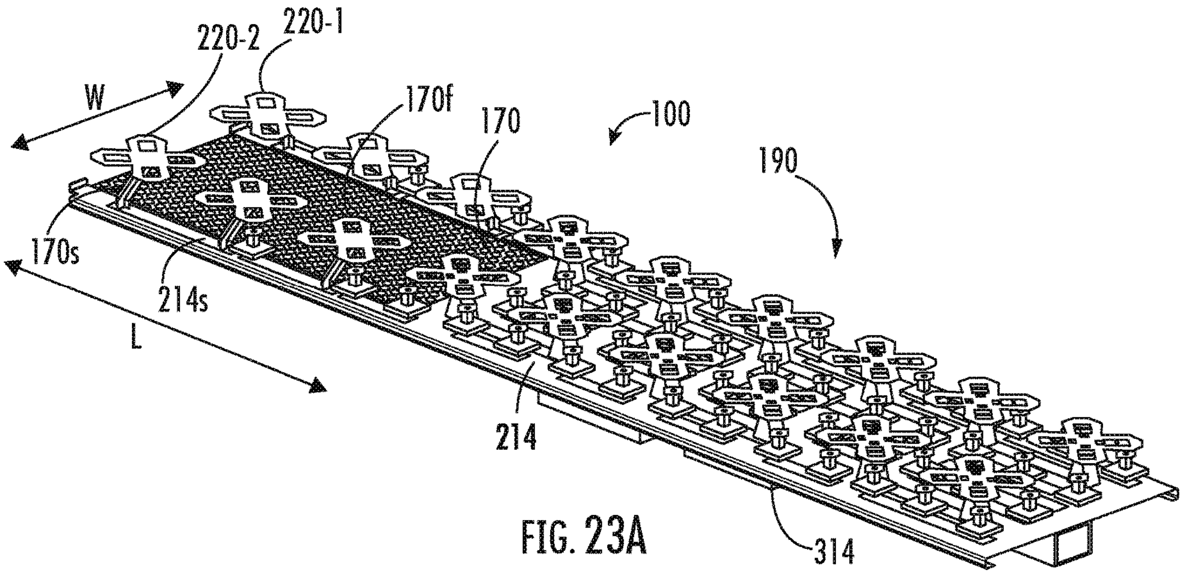
FIG. 23A is a front, side perspective view of an antenna assembly and example grid reflector of a base station antenna according to embodiments of the present invention.
Figure 23B:
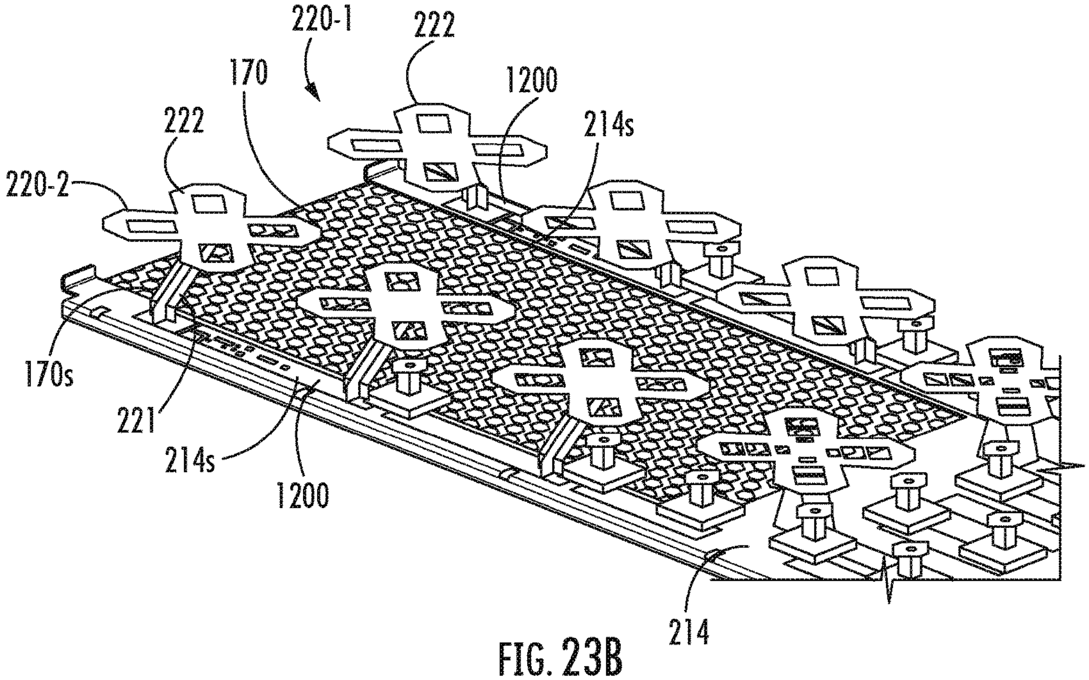
FIG. 23B is an enlarged front, side perspective view of a top portion of the antenna assembly and grid reflector shown in FIG. 23A.
Figure 24:
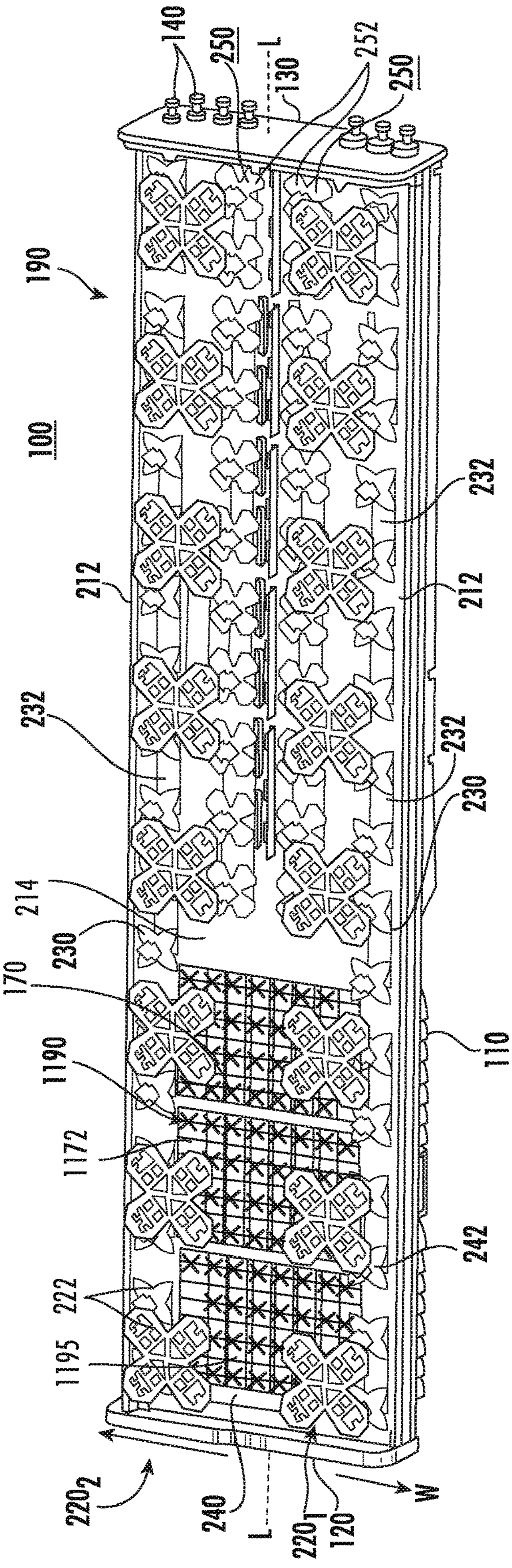
FIG. 24 is a front, side perspective view of a base station antenna with the front and rear radome omitted to illustrate placement of a mMIMO antenna array behind the grid reflector according to embodiments of the present invention.

Turning now to FIGS. 23A, 23B and 24, an example passive antenna assembly 190 is shown. The grid reflector 170 can merge into the primary reflector 214 that extends longitudinally and laterally. The primary reflector 214 may have a longitudinal length that is greater than a longitudinal length of the grid reflector 170. The primary reflector 214 can have a solid reflection surface for antenna elements residing in front of the primary reflector 214 and may reside over operational components 314, such as filters, tilt adjusters and the like.

The grid reflector 170 can reside a distance in a range of ⅛ wavelength to ¼ wavelength of an operating wavelength behind the low band dipoles 222, in some embodiments. The term "operating wavelength" refers to the wavelength corresponding to the center frequency of the operating frequency band of the radiating element, e.g., a low band radiating element 222. The grid reflector 170 can reside a distance in a range of 1/10 wavelength to ½ wavelength of an operating wavelength in front of the high band radiating elements 1195, in some embodiments. By way of example, in some particular embodiments, the grid reflector 170 can reside a physical distance of 0.25 inches and 2 inches from a ground plane or reflector 1172 that is behind a mMIMO array of radiating elements 1195 of an active antenna module 110 (FIG. 25, 26A, 26B). Other placement positions may be used.

In some embodiments, the ground plane or reflector 1172 of the active antenna module 110 can be electrically coupled to the grid reflector 170 and/or primary reflector 214 of the base station antenna 100, such as galvanically and/or capacitively coupled. In other embodiments, the ground plane or reflector 1172 of the active antenna module 110 is not electrically coupled to the grid reflector 170 and/or primary reflector 214.

Referring to FIG. 23A, the grid reflector 170 can have a longitudinal extent "L" and a lateral extent "W". The longitudinal extent L can extend a distance that is greater than the lateral extent W. The longitudinal extent L can be less than the lateral extent W. The grid reflector 170 has a front side 170*f* that faces the front side 100*f* of the housing 100*h*/radome 111*f*.

The antenna assembly 190 comprises multiple arrays of radiating elements, typically provided in six columns, with radiating elements that extend forwardly from the front side 170*f* of the reflector 170, with some columns of radiating elements continuing to extend in front of the primary reflector 214. The arrays of radiating elements of the antenna assembly 190 may comprise radiating elements 222 that are configured to operate in a first frequency band and radiating elements 232 that are configured to operate in a second frequency band. Other arrays of radiating elements may comprise radiating elements that are configured to operate in either the second frequency band or in a third frequency band. The first, second and third frequency bands may be different frequency bands (although potentially overlapping). In some embodiments, low band antenna element 222 with dipole arms can reside in front of the grid reflector 170, typically along right and left side portions 170*s* of the grid reflector 170 and/or primary reflector sides 214*s*.

Figure 23C:
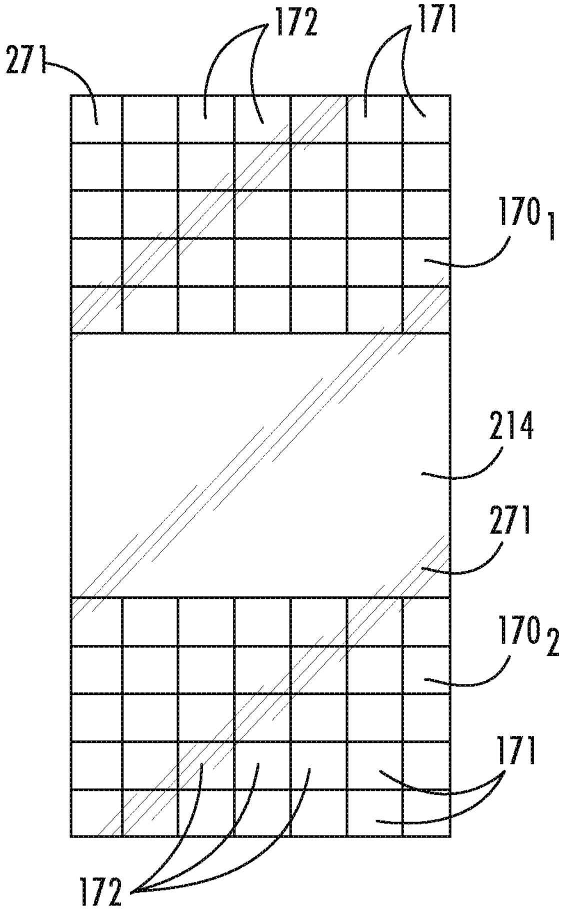
FIG. 23C is a front schematic view of a reflector comprising first and second grid reflectors and a primary reflector according to embodiments of the present invention.

FIG. 23C illustrates that the grid reflector 170 can be provided as a reflector body or assembly with a first grid reflector $\mathbf{170}_1$ and a second grid reflector $\mathbf{170}_2$ that are longitudinally spaced apart, typically separated by a primary reflector 214 having a continuous surface devoid of the grid unit cells 171.

As discussed above, FIG. 23C also illustrates that a dielectric cover 271 may be attached to the grid reflector 170 and extend across the unit cells 171. The dielectric cover 271 can have a dielectric constant that is at least 1 and may in a range of 1-6, in some embodiments, such as 1, 2, 3, 4, 5, 6 or any number in a range of 1-6, end points inclusive. Dielectric material with higher value dielectric constants may be appropriate in some embodiments.

The grid reflector 170 and the primary reflector 214 can be monolithically formed as a unitary (sheet) metal body in some embodiments. Alternatively, the grid reflector 170 and the primary reflector 214 can be provided as separate components that are directly or indirectly attached and electrically coupled together to provide a common electrical ground. The grid reflector 170 and the primary reflector 214 can both be sheet metal of the same or different thicknesses.

In some embodiments, the grid reflector 170 can be provided by a different substrate than the primary reflector 214. In some embodiments, the grid reflector 170 can be provided as a printed circuit board with conductive patches forming the array of unit cells 171. The grid reflector 170 can be provided as a flex circuit board with conductive patches. The grid reflector 170 can be provided as a non-metallic substrate with metallized patches.

Some of the radiating elements (discussed below) of the antenna 100 may be mounted to extend forwardly from the main reflector 214, and, if dipole-based radiating elements are used, the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the base station antenna 100 that are mounted thereon.

Still referring to FIGS. 23A, 23B and 24, the passive antenna assembly 190 of the base station antenna 100 can include one or more arrays 220 of low-band radiating elements 222, one or more arrays 230 of first mid-band radiating elements 232, one or more arrays 240 of second mid-band radiating elements 242 and optionally one or more arrays 250 of high-band radiating elements 252. The radiating elements 222, 232, 242, 252, 1195 may each be dual-polarized radiating elements. Further details of radiating elements can be found in co-pending WO2019/236203 and WO2020/072880, the contents of which are hereby incorporated by reference as if recited in full herein. Some of the high band radiating elements, such as radiating elements 1195, can be provided as a mMIMO antenna array and may be provided in the active antenna module 110 rather than in the housing 100*h* of the base station antenna 100.

The low-band radiating elements 222 can be mounted to extend forwardly from the main or primary reflector 214 and the grid reflector 170 and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays 220-1, 220-2 may be used to transmit and receive signals in the 700 MHz (or 800 MHZ) frequency band.

The first mid-band radiating elements 232 may likewise be mounted to extend forwardly from the main reflector 214 and/or grid reflector 170 and may be mounted in columns to form linear arrays 230 of first mid-band radiating elements 232. The linear arrays 230 of mid-band radiating elements 232 may extend along the respective side edges of the grid reflector 170 and/or the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230 of first mid-band radiating elements 232 may be configured to transmit and receive signals in the same portion of the second frequency band or in different portions of the second frequency band.

The second mid-band radiating elements 242 can be mounted in columns to form linear arrays 240 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some, or all, of the 2300-2700 MHz frequency band). In the depicted embodiment, the second mid-band radiating elements 242 may have a different design than the first mid-band radiating elements 232.

The high-band radiating elements 252 and/or 1195 can be mounted in columns in the upper medial or center portion of antenna 100 to form a multi-column (e.g., four or eight column) array 250 of high-band radiating elements 252 and/or 1195. The high-band radiating elements 1195 may be configured to transmit and receive signals in a third frequency band. In some embodiments, the third frequency band may comprise the 3300-4200 MHz frequency range or a portion thereof.

In the depicted embodiment, the arrays 220 of low-band radiating elements 222, the arrays 230 of first mid-band radiating elements 232, and the arrays 240 of second mid-band radiating elements 242 are all part of the passive antenna assembly 190, while the array 250 of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays 240 of second mid-band radiating elements 242 may be replaced with four linear arrays of ultra-high-band radiating elements that transmit and receive signals in a 5 GHz frequency band.

At least some of the low-band and mid-band radiating elements 222, 232, 242 may each be mounted to extend forwardly of and/or from the grid reflector 170 or the main reflector 214.

Each array 220 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, and each array 242 of second mid-band radiating elements 242 may be configured to form a pair of antenna beams, namely an antenna beam for each of the two polarizations at which the dual-polarized radiating elements are designed to transmit and receive RF signals. Each linear array 220, 230, 240 may be configured to provide service to a sector of a base station. For example, each linear array 220, 230, 240 may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements 222, 232, 242, 252, 1195 can be dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

Some or all of the radiating elements 222, 232, 242, 252, 1195 may be mounted on feed boards that couple RF signals to and from the individual radiating elements 222, 232, 242, 252, 1195, with one or more radiating elements 222, 232, 242, 252, 1195 mounted on each feed board. Cables (not shown) and/or connectors may be used to connect each feed board to other components of the antenna 100 such as diplexers, phase shifters, calibration boards or the like.

RF connectors or "ports" 140 can be mounted in the bottom end cap 130 that are used to couple RF signals from external remote radio units (not shown) to the arrays 220, 230, 240 of the passive antenna assembly 190. Two RF ports can be provided for each array 220, 230, 240 namely a first RF port 140 that couples first polarization RF signals between the remote radio unit and the array 220, 230, 240 and a second RF port 140 that couples second polarization RF signals between the remote radio unit and the array 220, 230, 240. As the radiating elements 222, 232, 242 can be slant cross-dipole radiating elements, the first and second polarizations may be a −45° polarization and a +45° polarization.

A phase shifter may be connected to a respective one of the RF ports 140. The phase shifters may be implemented as, for example, wiper arc phase shifters such as the phase shifters disclosed in U.S. Pat. No. 7,907,096 to Timofeev, the disclosure of which is hereby incorporated herein in its entirety. A mechanical linkage may be coupled to a RET actuator (not shown). The RET actuator may apply a force to the mechanical linkage which in turn adjusts a moveable element on the phase shifter in order to electronically adjust the downtilt angles of antenna beams that are generated by the one or more of the low-band or mid-band linear arrays 220, 230, 240.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

Referring to FIGS. 23A, 23B, feed boards 1200 can be provided in front of or behind the side segments 214*s* of the primary reflector 214. The feed boards 1200 connect to feed stalks 221 (or 222*f*) of radiating elements 222 (such as low band elements). The feed stalks 221 can be angled feed stalks that project outwardly and laterally inward to position the front end of the feed stalks 221 closer to center of the reflector 170 than a rearward end. The feed boards 1200 can be coupled and/or connected to the grid reflector 170 or to the primary reflector 214.

The radiating elements 220 can be dipole elements configured to operate in some or all the 617-960 MHz frequency band. A feed circuit comprising a hook balun can be provided on the feed stalk 221. Further discussions of example antenna elements including antenna elements comprising feed stalks can be found in U.S. Provisional Patent Application Ser. Nos. 63/087,451 and 62/993,925 and/or related utility patent applications claiming priority thereto, the contents of which are hereby incorporated by reference as if recited in full herein.

Some or all of the low or mid-band radiating elements 222, 232, respectively, may be mounted on the feed boards 1200 and can couple RF signals to and from the individual radiating elements 222, 232. Cables (not shown) and/or connectors may be used to connect each feed board to other components of the base station antenna 100 such as diplexers, phase shifters, calibration boards or the like.

Turning now to FIG. 25, an example active antenna module 110 is shown. The active antenna module 110 can include an RRU (remote radio unit) unit 1120 with radio circuitry. The active antenna module 110 can also include a filter and calibration printed circuit board assembly 1180, and an antenna assembly 1190 comprising a reflector or ground plane of a printed circuit board 1172 behind radiating elements 1195. The antenna assembly 1190 may also include phase shifters 1191, which may alternatively be part of the filter and calibration assembly 1180. The radiating elements 1195 can be provided as a massive MIMO array. The RRU unit 1120 is a radio unit that typically includes radio circuitry that converts base station digital transmission to analog RF signals and vice versa. One or more of the radio unit or RRU unit 1120, the antenna assembly 1190 or the filter and calibration assembly 1180 can be provided as separate sub-units that are attachable (stackable). The RRU unit 1120 and the antenna assembly 1190 can be provided as an integrated unit, optionally also including the calibration assembly 1180. Where configured as sub-units, different sub-units can be provided by OEMs or cellular service providers while still using a common base station antenna housing 100*h* and passive antenna assembly 190 thereof. The antenna assembly 1190 can couple to the filter and calibration board assembly 1180 via, for example, pogo connectors 111. Other connector configurations may be used for each of the connections, such as, for example 3-piece SMP connectors. The RRU unit 1120 can also couple to the filter and calibration board assembly 1180 via pogo connectors 111 thereby providing an all blind-mate connection assembly without requiring cable connections. Alignment of the cooperating components within a tight tolerance may be needed to provide suitable performance. In other embodiments, the radio circuitry can be provided with the antenna assembly as a single integrated unit.

The antenna module 110 can include a radome 119 and optionally a second radome 1119. The second radome 1119 covers the first radome 119 for aesthetic purposes and can be removed at installation, in some embodiments.

FIGS. 26A and 26B illustrate example embodiments of the base station antennas 100 and the active antenna modules 110. FIG. 26A illustrates that the rear 100*r* of the base station antenna 100 can have a flat surface and the active antenna assembly 1190 can be configured to face the rear 100*r* with the radomes 119, 111*r* therebetween and with the grid reflector 170 in front of the radiating elements 1195. FIG. 26B illustrates that the rear 100*r* of the base station antenna 100 can have recessed segment 102 and sized to receive the radome 119 of the active antenna unit 110, again with the radiating elements 1195 behind and facing the grid reflector 170.

Figure 27:
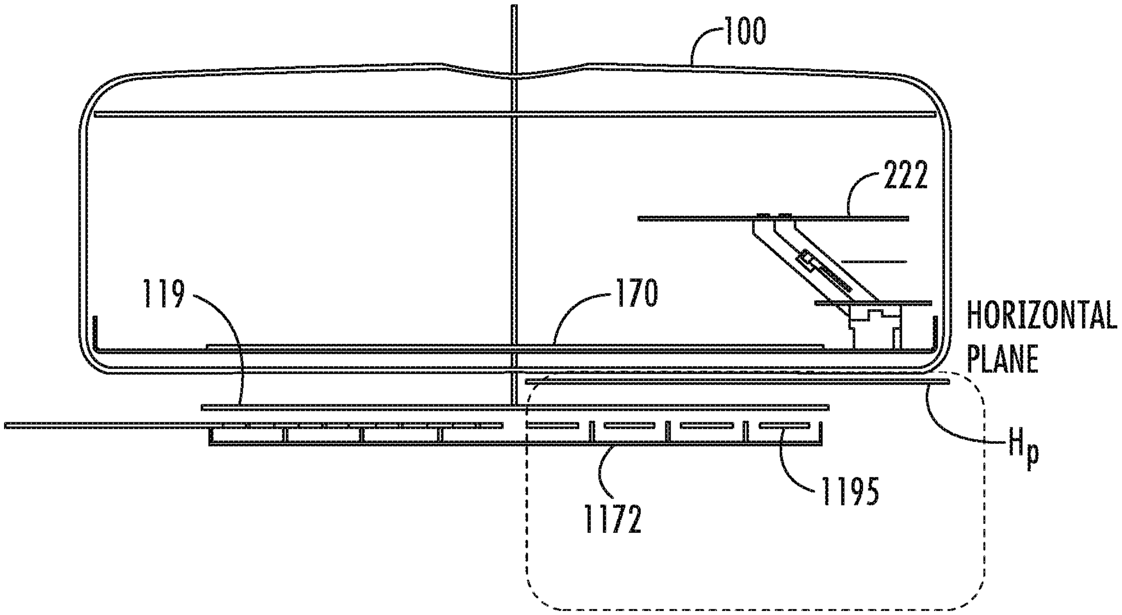
FIG. 27 is an enlarged simplified, sectional view of an example base station antenna and cooperating active antenna module according to embodiments of the present invention.

FIG. 27 is a simplified sectional view of an example base station antenna 100 with grid reflector 170 aligned with an active antenna module 110.

The grid reflector 170 can provide a wider band pass for high band, a higher suppression for low band and a large incident angle of support over cutout reflectors.

Figures 28A, 28B, 28C, 28D:
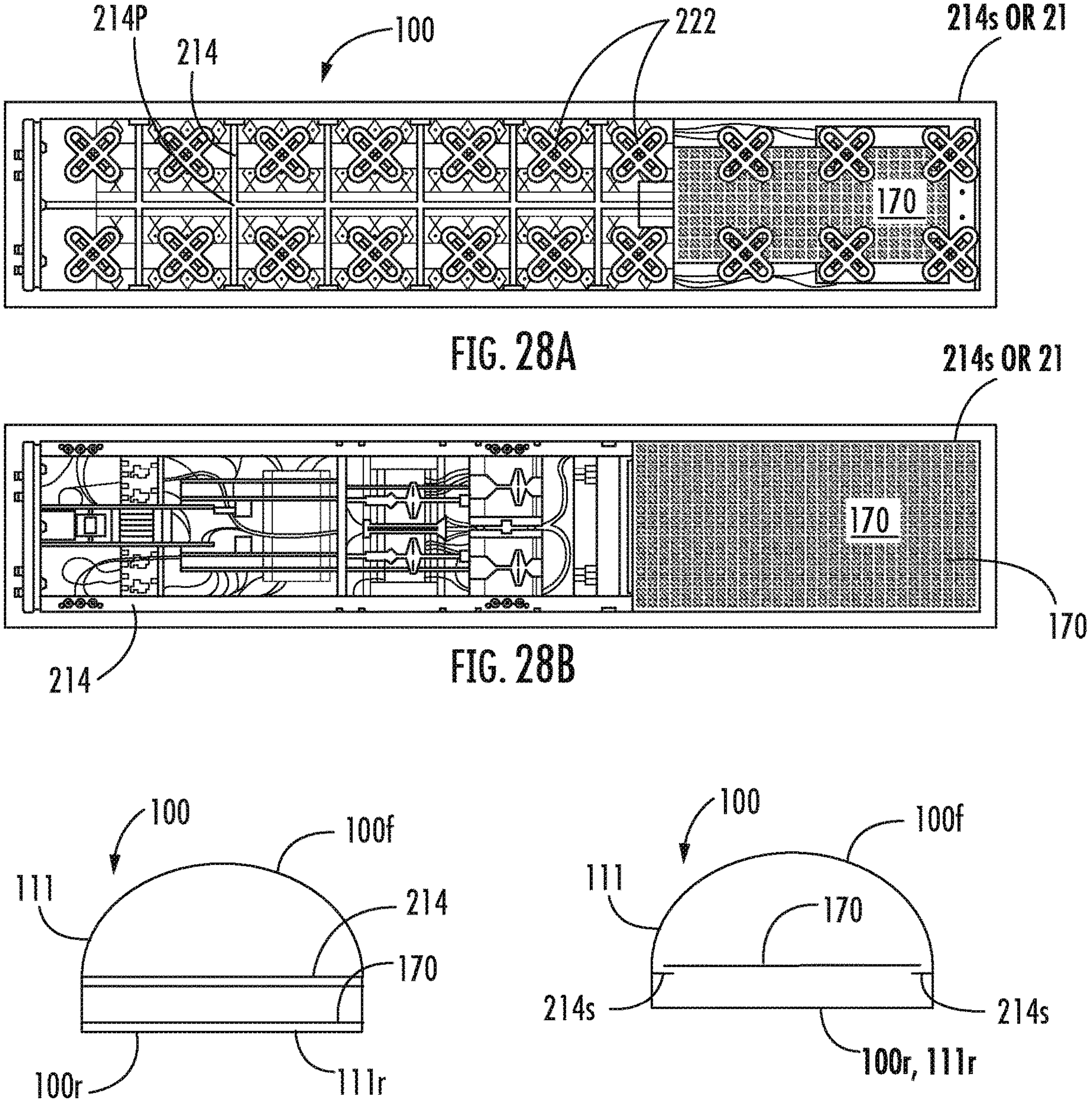
FIG. 28A is a front view of a portion of a base station antenna, shown without the front radome, illustrating an example grid reflector (e.g., FSS) according to embodiments of the present invention.
FIG. 28B is a rear view of the portion of the base station antenna shown in FIG. 28A, shown without the back radome according to embodiments of the present invention.
FIG. 28C is a simplified schematic lateral section view of a top portion of the base station antenna shown in FIGS. 28A, 28B, illustrating an example position of the FSS relative to the rear radome according to embodiments of the present invention.
FIG. 28D is a simplified schematic lateral section view of a top portion of the base station antenna shown in FIGS. 28A, 28B illustrating an alternate position of the FSS relative to the embodiment shown in FIG. 28C, according to embodiments of the present invention.

Turning now to FIG. 28A, the grid reflector 170 is shown with two linear columns of low band radiating elements 222 extending forward thereof. The linear columns extend over the primary reflector 214 below the grid reflector 170. The grid reflector 170 can be coupled to the right and left side segments 214*s* of the primary reflector 214 or can be held by a main body 21 of the grid reflector and coupled to the primary reflector 214. FIG. 28B shows an example rear side of the grid reflector 170 and primary reflector 214.

FIG. 28C illustrates the grid reflector 170 coupled to an internal, forward-facing surface of the rear radome 111*r*, rear 100*r* of the housing 100*h*. The grid reflector 170 can be in a different plane that is behind the plane of the primary reflector 214. The grid reflector 170 can be electrically coupled to the primary reflector 214 so that both are at a common ground. The rear radome 111*r* can cooperate with the grid reflector 170 for dielectric loading thereof. The term “dielectric loading” means that the rear radome 111*r*, 100*r* is configured to cooperate with the grid reflector 170 (e.g., FSS) via spacing and material having a dielectric constant to reduce or minimize reflections at a band that the grid reflector and/or FSS is configured to transmit through.

The grid reflector 170 may be provided as a flex circuit that conformably attaches to the internal surface of the rear (wall) 100*r* of the radome 111*r*. A double-sided tape, adhesive, bonding material or other attachment configuration may be used to attach the grid reflector 170 to the rear radome 111*r*. The rear radome 111*r* can have a dielectric constant in a range of 1-3.

In other embodiments, referring to FIG. 28D, that the grid reflector 170 can be attached to the primary reflector 214, shown as the spaced apart right and left side segments 214*s* of the primary reflector 214 in this figure. The primary surface 170*p* of the grid reflector 170 can be parallel to the primary surface 214*p* of the primary reflector 214. The primary surface of the grid reflector 170 can be co-planar with the primary surface 214*p* of the primary reflector 214. In other embodiments, the grid reflector 170 can reside behind a primary surface of the primary reflector 214 in a different plane.

Figure 28E:
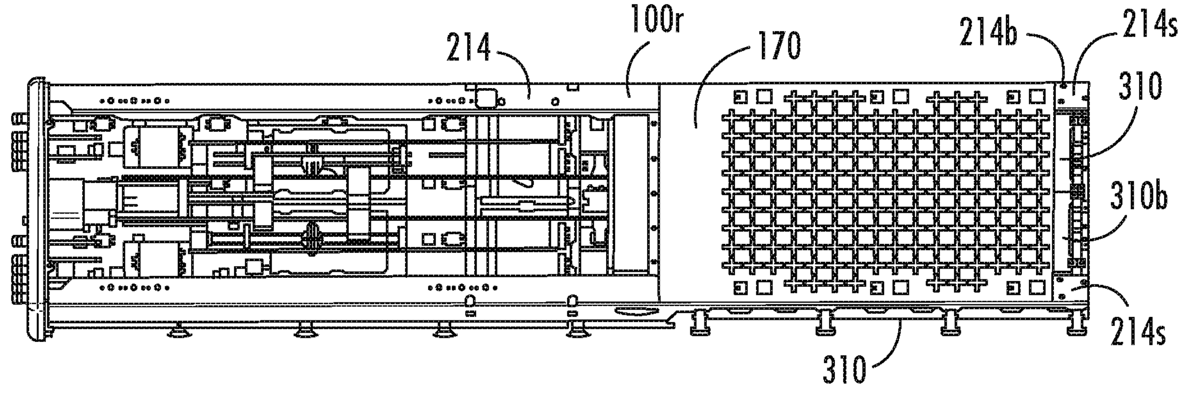
FIG. 28E is a rear view of base station antenna without a rear radome, showing the FSS and matching layers according to embodiments of the present invention.
Figure 28F:
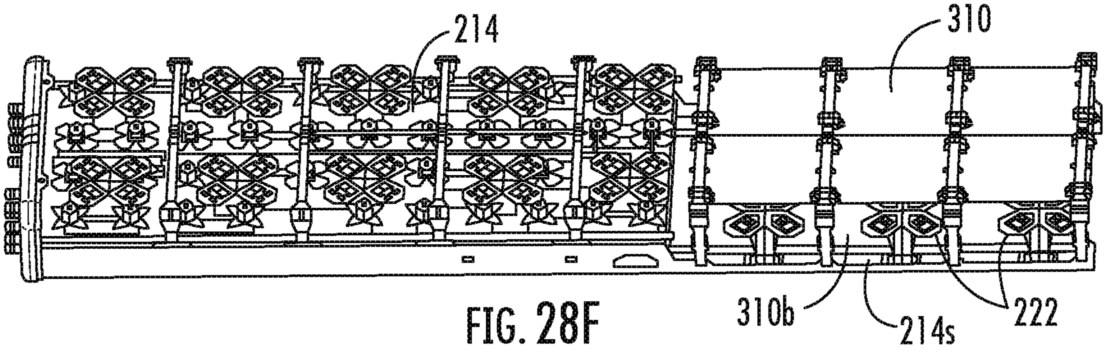
FIG. 28F is a front perspective view of the base station antenna shown in FIG. 28E, shown without the front radome, according to embodiments of the present invention.
Figure 28G:
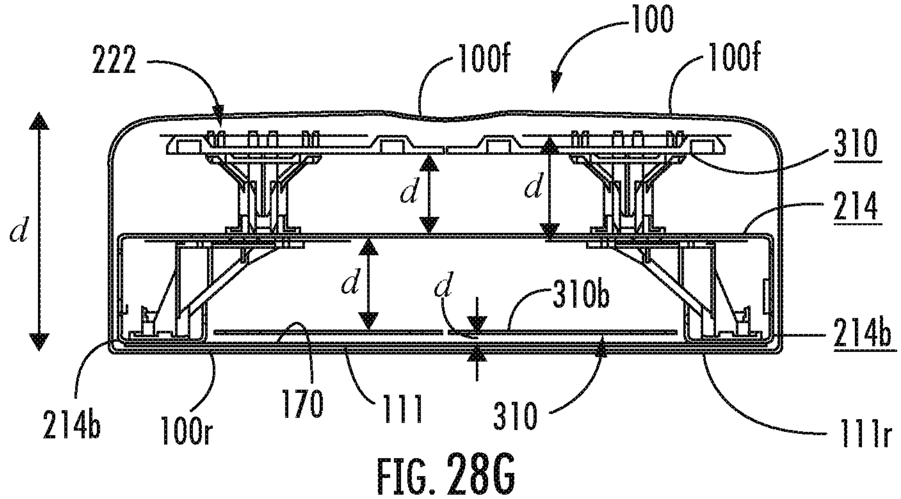
FIG. 28G is a simplified lateral section view of the base station antenna shown in FIGS. 28E/28F according to embodiments of the present invention.

Turning now to FIGS. 28E, 28F and 28G, the base station antenna 100 can have at least one matching layer 310 that can reside behind a primary surface of the front reflector 214 and in front of a grid reflector 170. The matching layer 310 that is behind the primary surface of the front reflector 214 can be referred to as a “back” matching layer 310*b*. In some embodiments, the back matching layer 310*b* can be closely spaced apart from the rear radome 111*r* and/or the grid reflector 170, typically a distance in a range of 0.1 mm to 25 mm, such as about 10-15 mm, and can be at about 10 mm, about 11 mm, and about 12 mm.

Still referring to FIGS. 28E, 28F, 28G, in some embodiments, at least one additional matching layer 310 can also reside forward of the primary reflector 214 and at least one matching reflector can reside behind the right and left forward sides 214*s* of the front reflector 214.

The primary reflector 214 can have the spaced apart right and left side segments 214*s* discussed above, which can bend rearward to define back segments 214*b*. The grid reflector 170 can be attached to the back segments 214*b* and/or the internal surface 111*i* of the rear radome 111*r*. The grid reflector 170 can be provided as a multi-layer printed circuit board and/or a flex circuit.

Turning now to FIGS. 29A-29D, the grid reflector 170 can be provided as a separate piece from the primary reflector 214. The grid reflector 170 can be provided as sheet metal grid reflector. The grid reflector 170 can have a coupling segment 170*c* for attaching to the primary reflector 214. The grid reflector 170 can be electrically coupled to the primary reflector 214. The grid reflector 170 can be co-planar with the primary reflector 214.

Figure 29A:
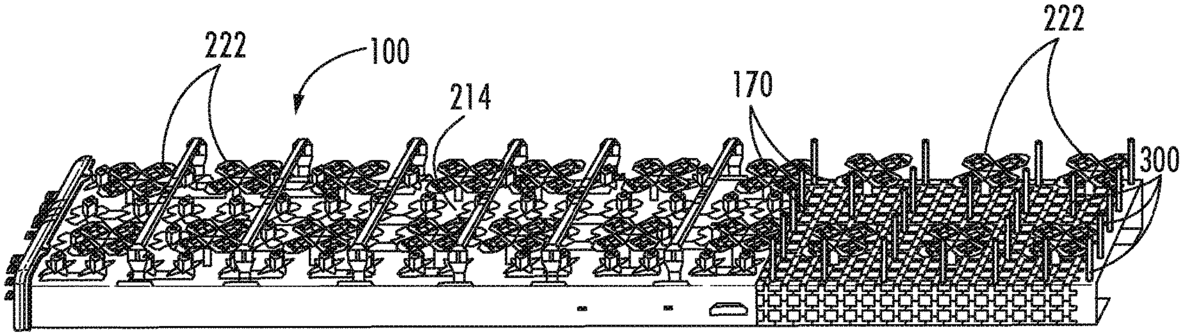
FIG. 29A is a front view of a portion of a base station antenna, shown without the front radome, illustrating another example FSS according to embodiments of the present invention.
Figure 37:
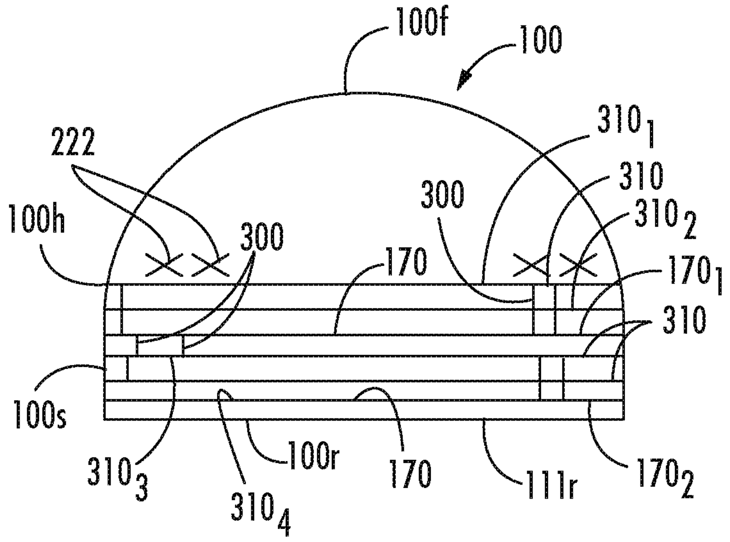
FIG. 37 is a simplified lateral sectional view of a base station antenna with a plurality of reflectors stacked in a front to back direction and with matching layers according to embodiments of the present invention.

FIG. 29A also illustrates that the base station antenna 100 can include a plurality of projecting matching layer support posts 300 that can support at least one matching layer 310 (FIGS. 28G, 37, for example).

Figure 29B:
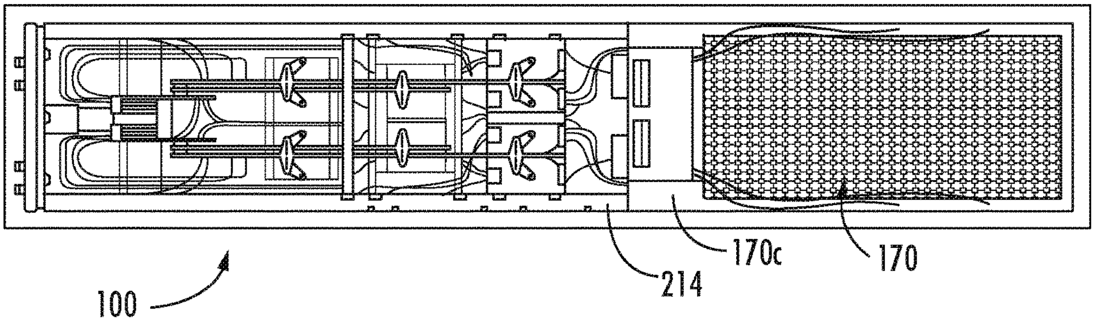
FIG. 29B is a rear view of the portion of the base station antenna shown in FIG. 29A, shown without the back radome according to embodiments of the present invention.
Figure 29C:
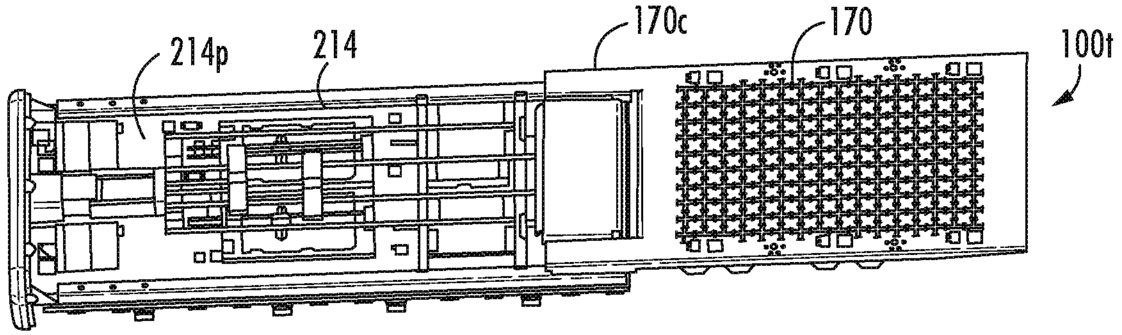
FIG. 29C is a rear view of the portion of a base station antenna similar to that shown in FIG. 29A, shown without the back radome according to embodiments of the present invention.

FIGS. 29B and 29C illustrate that the coupling segment 170*c* can include right and left side arms that extend longitudinally and that are laterally spaced apart. The right and left side arms can attach to adjacent segments of the primary reflector 214. The grid reflector 170 can be positioned rearward of the primary surface 214*p* of the primary reflector 214, closer to the rear radome 111*r*. In some embodiments, similar to the printed circuit board configuration of the grid reflector 170 discussed with respect to FIG. 28G, the back matching layer 310*b* can be closely spaced apart from the rear radome 111*r* and/or the grid reflector 170, typically a distance in a range of 0.1 mm to 25 mm, such as about 10-15 mm, and can be at about 12 mm.

Figure 29D:
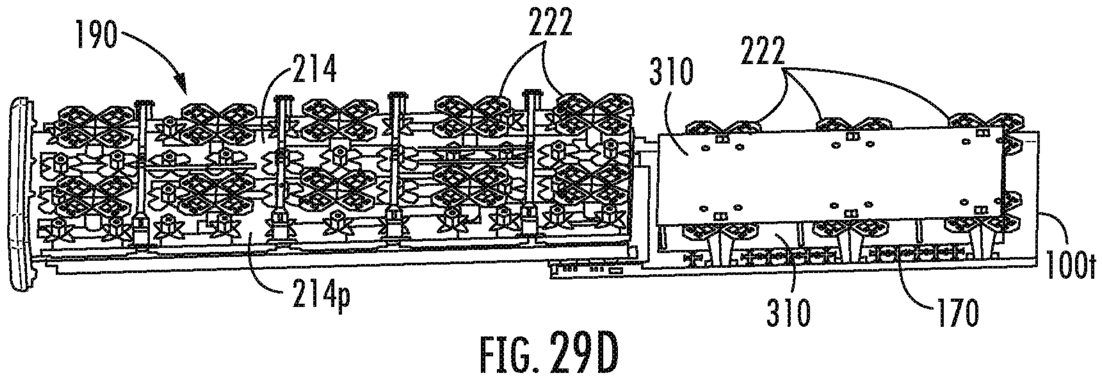
FIG. 29D is a front, perspective view of the base station antenna shown in FIG. 29C, shown without the front radome and without the side radomes, according to embodiments of the present invention.
Figure 29E:
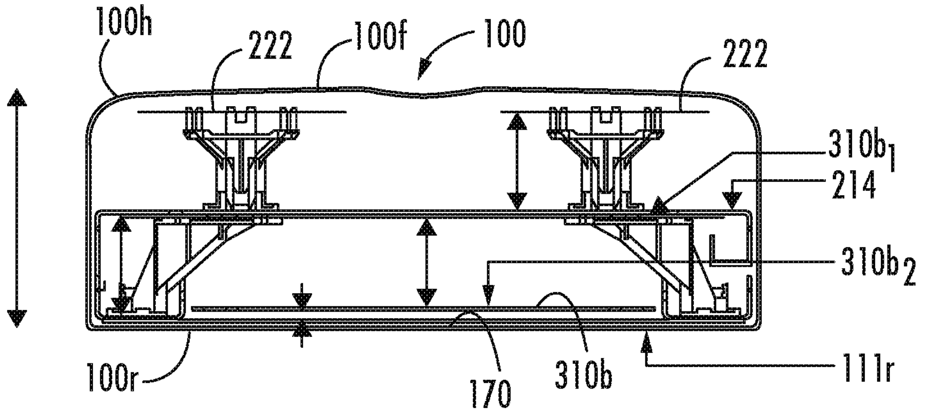
FIG. 29E is a simplified lateral section view of the base station antenna shown in FIGS. 29C/29D according to embodiments of the present invention.
Figure 30:
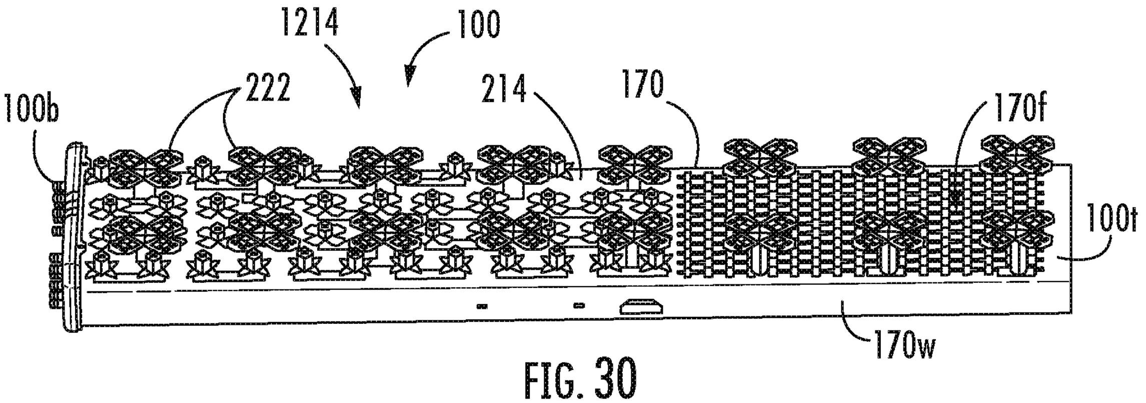
FIG. 30 is a front, side perspective view of a portion of a base station antenna (shown without the radome) according to embodiments of the present invention.

Referring to FIGS. 29C-29E, the base station antenna 100 can include two matching layers that reside behind the primary surface of the primary reflector 214, labeled as 310*b*$_1$, 310*b*$_2$ in FIG. 29E. The first back matching layer 310*b*$_1$ can reside closer to the primary surface 214*p* of the primary reflector 214 than the second back matching layer 310*b*$_2$. The first and second back matching layers 310*b*$_1$, 310*b*$_2$ can be stacked but spaced apart in a front to back direction, a distance that is in a range of 10-100 mm, such as about 60-70 mm, in some embodiments.

FIGS. 30-33 illustrates that the base station antenna 100 can have provide an integrated reflector 1214 that provides both the primary reflector 214 and the grid reflector 170 as a unitary (monolithic) structure.

Figure 31:
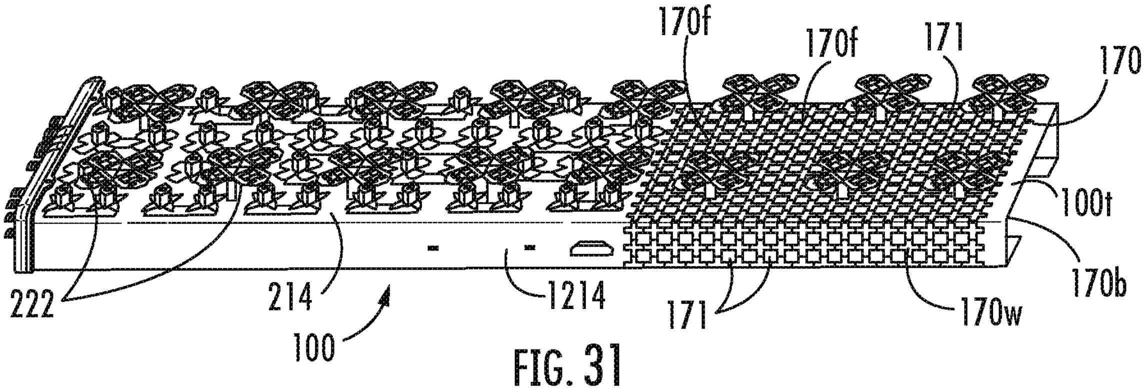
FIG. 31 is a front, side perspective view of a portion of a base station antenna (shown without the radome) according to other embodiments of the present invention.
Figure 32:
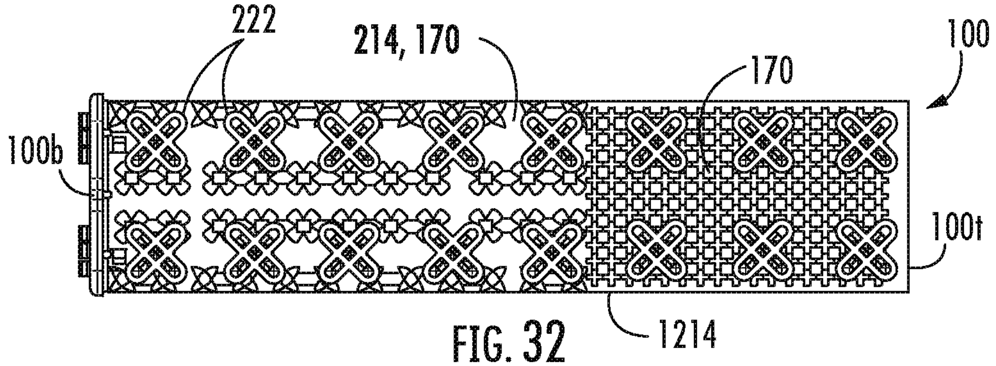
FIG. 32 is a front view of a portion of a base station antenna (shown without the radome) according to yet other embodiments of the present invention.
Figure 33:
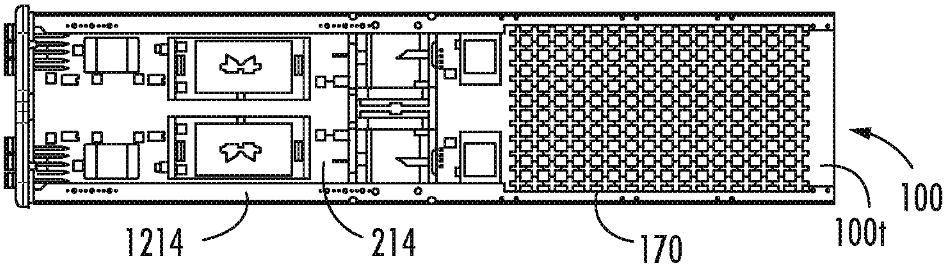
FIG. 33 is a rear view of the portion of the base station antenna shown in FIG. 32 according to embodiments of the present invention.

FIG. 31 illustrates that the grid reflector 170 can have a three-dimensional body 170*b* with unit cells 171 extending on the front surface 170*f* and also on rearwardly extending walls 170*w*. The front surface 170*f* can extend laterally and can merge into right and left side corners that connect to the rearwardly extending walls 170*w*. The rearwardly extending walls 170*w* can be orthogonal to the front surface 170*f*. The three-dimensional body 170*b* can be provided separate from the primary reflector 214.

Figure 34:
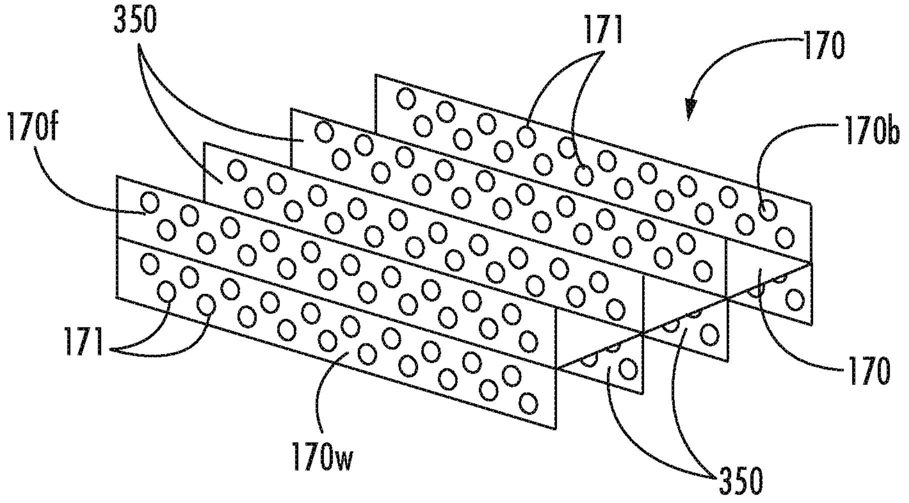
FIG. 34 is a side, front perspective view of an example three-dimensional reflector configured for a base station antenna according to embodiments of the present invention.
Figure 35:
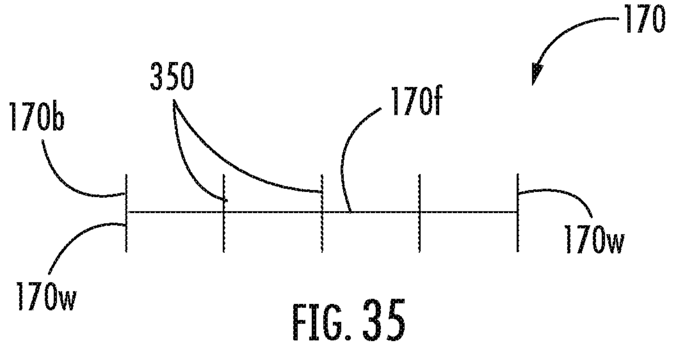
FIG. 35 is an end view of the reflector shown in FIG. 34.

As shown in FIGS. 34 and 35, the three-dimensional body 170*b* can also be configured to provide isolation walls 350 that project rearwardly from a rear facing surface and/or that project forwardly from a front facing surface 170*f*. The isolation walls 350 can be metal, metallized or provided as frequency selective surface/substrate reflector configuration.

As is also shown, the side walls 170*w* can extend both forwardly and rearwardly of the front surface 170*f* of the grid reflector 170, orthogonal thereto. The forward projection segment of the side walls 170*s* can be metal, metallized, or provided as a frequency selective surface/substrate.

Figure 36:
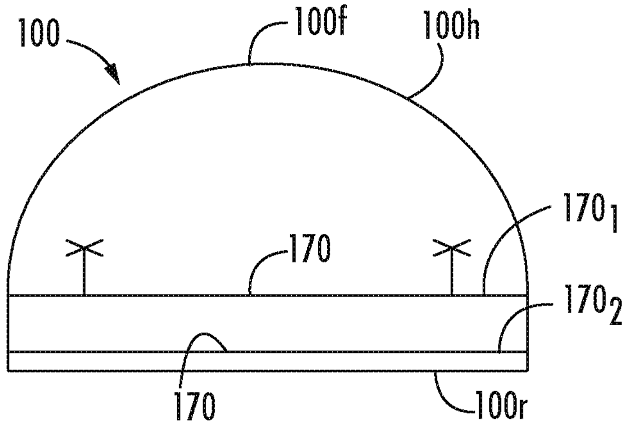
FIG. 36 is a simplified lateral sectional view of a base station antenna with a plurality of reflectors stacked in a front to back direction according to embodiments of the present invention.

FIGS. 36 and 37 illustrate that the base station antenna 100 can have first and second reflectors 170$_1$, 170$_2$ that can both be configured as grid reflectors 170 and that are stacked in a front-to-back orientation, one at least partially in front of another, inside the base station antenna housing 100*h*. A plurality of linear columns of radiating elements 222 can project forwardly of the first reflector 170$_1$. The second grid reflector 170$_2$ can reside closer to the rear 100*r* of the base station antenna 100 than the first grid reflector 170$_1$.

The first grid reflector 170$_1$ and the second grid reflector 170$_2$ can have different primary substrates and can be tuned to reflect and propagate RF energy in the same or in different frequency bands. One of the first grid reflector 170$_1$ or the second grid reflector 170$_2$ can be configured as a metal grid reflector 170 and the other of the first grid reflector 170$_1$ or the second grid reflector 170$_2$ can be configured as a non-metallic substrate with metal patches, such as a multi-layer circuit board or a flex circuit which may improve low band reflection.

The first grid reflector 170$_1$ can comprise unit cells 171 configured to pass RF energy in a second frequency band and absorb and/or reflect at least one of RF energy in a first frequency band and optionally also absorb and/or reflect RF energy in a third frequency band. The third frequency band can encompass frequencies between the first and second frequency bands.

Referring to FIG. 37, at least one of the first reflector 170$_1$ and the second reflector 170$_2$ can be configured to mount at least some of the matching layer support posts 300. As shown, at least one matching layer 310 (shown as two matching layers, stacked and spaced apart in a front-to-back direction) can reside behind the first reflector 170$_1$. The support posts 300 for supporting that matching layer 310 can project rearward of the first reflector 170$_1$ and/or forward of the second reflector 170$_2$. Alternatively, the support posts 300 can project inwardly from the sides 100*s* of the housing 100*h* to mount a respective matching layer 310 (not shown).

Still referring to FIG. 37, the base station antenna 100 can have a plurality of matching layers 310 in front of the first reflector 170$_1$ and a plurality of matching layers behind the first grid reflector 170$_1$. As shown, there are four matching layers 310$_1$, 310$_2$, 310$_3$, 310$_4$, with first and second matching layers 310$_1$, 310$_2$ behind and 310$_3$, 310$_4$, in front of the grid reflector 170$_1$.

It is also contemplated that the base station antenna 100 can have a grid reflector 170 without any matching layers 310 by adjusting spacing of high band radiating elements in the active antenna module 110 and the low band radiating elements 222 relative to each other and the front radome 100*f* and/or back radome 100*r* using a low dielectric constant radome material, for example.

Figure 38A:
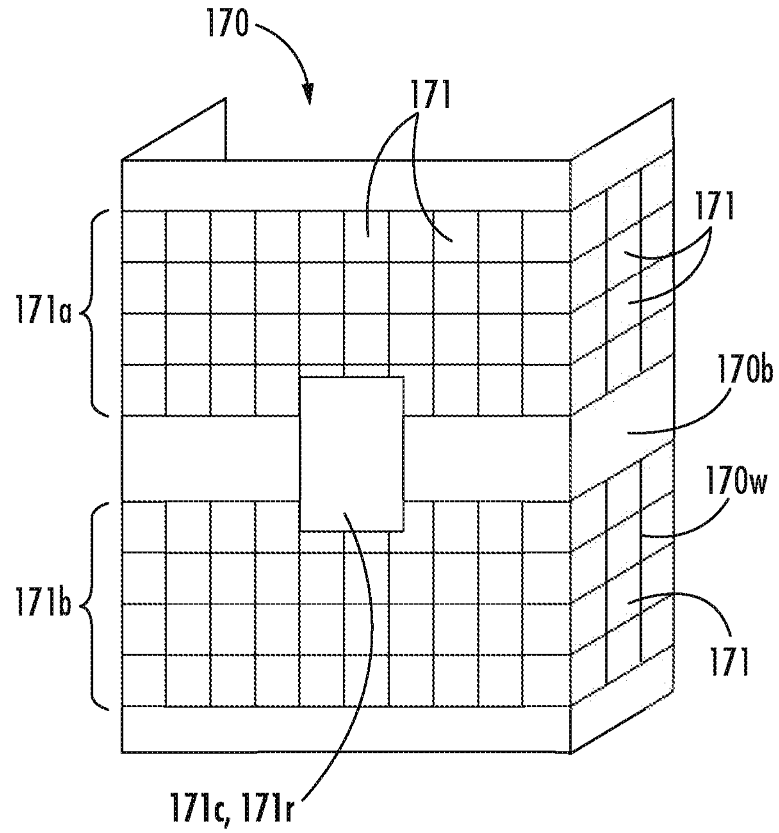
FIG. 38A is a front, side perspective view of another example reflector for a base station antenna according to embodiments of the present invention.
Figure 38B:
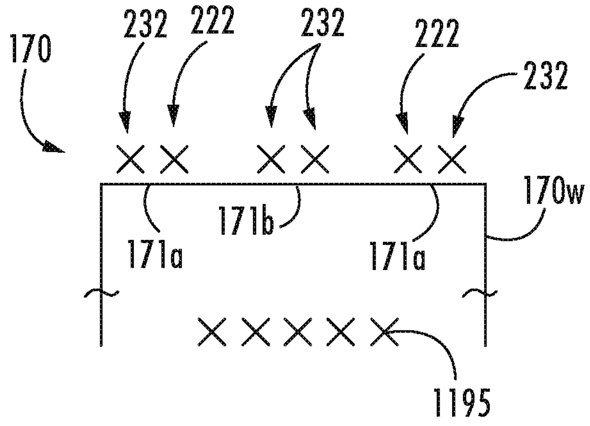
FIG. 38B is a simplified end view of the reflector shown in FIG. 38A illustrating cooperating radiating elements according to embodiments of the present invention.

Referring to FIGS. 38A and 38B, the grid reflector 170 can have a grid of unit cells 171 with a first subset 171*a* of the unit cells 171 tuned for blocking and/or reflecting RF energy in a first frequency band while allowing RF energy in a second frequency band to propagate therethrough. The grid reflector 170 can also have a second subset 171*b* of the unit cells 171 tuned for blocking and/or reflecting RF energy in the first frequency band and RF energy in a third frequency band. The third frequency band comprises frequencies between the first and second frequency bands.

The first subset 171*a* of the unit cells 171 can be positioned at an upper portion of the base station antenna 100. The second subset 171*b* of the unit cells 171 can include unit cells that are below and/or to right and left sides of the first subset 171*a* of the unit cells 171. The grid reflector 170 can include a region 171*r*, optionally with a third subset 171*c* of the unit cells 171, that can be tuned for blocking and/or reflecting RF energy in the first frequency band, the second frequency band and the third frequency band. The region 171*r* can be a closed metal or metallized surface and does not require unit cells and can provide increased rigidity/structural support. Some of the unit cells 171 in the second subset 171*b* of the unit cells 171 can be to the left side and/or right side of the first subset of the unit cells 171*a*. The first subset 171*a* of the unit cells 171 can reside behind low band radiating elements 222 and in front of high band radiating elements 1195 (e.g., a mMIMO array). The second subset 171*b* of the unit cells 171 can reside behind mid-band 232 radiating elements. The first frequency band can be low band, the second frequency band can be a high band frequency band, the third frequency band can be mid-band with at least some frequencies between the first and second frequencies.

The reflector 170 can be provided as a three-dimensional structure or body 170*b* that includes unit cells 171 that are positioned rearwardly of some of the first subset 171*a* of the unit cells 171.

Figure 39A:
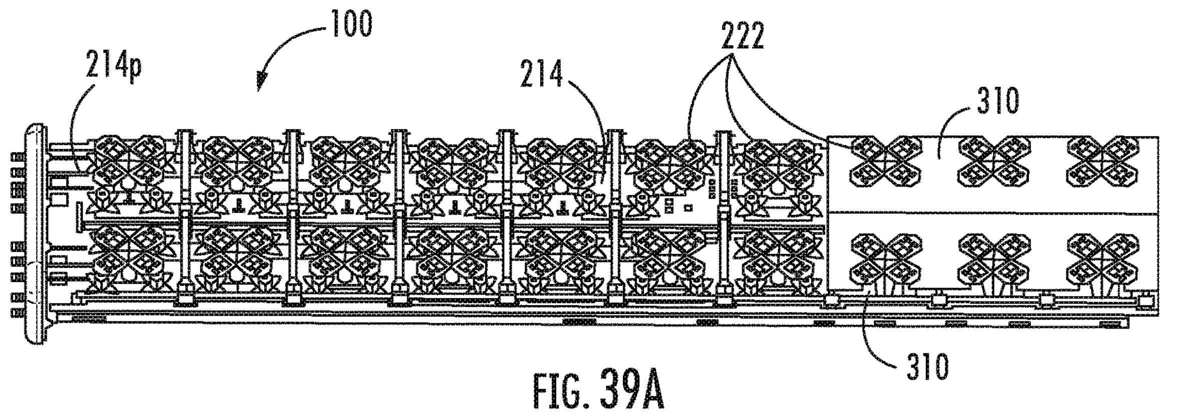
FIG. 39A is a front, side perspective view of a portion of a base station antenna, shown without the front radome, illustrating another example FSS configuration according to embodiments of the present invention.
Figure 39B:
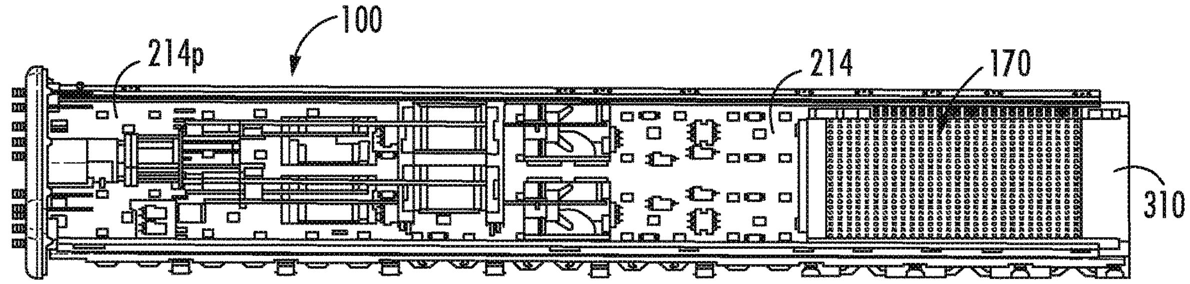
FIG. 39B is a rear view of the portion of the base station antenna shown in FIG. 39A, shown without the back radome according to embodiments of the present invention.
Figure 39C:
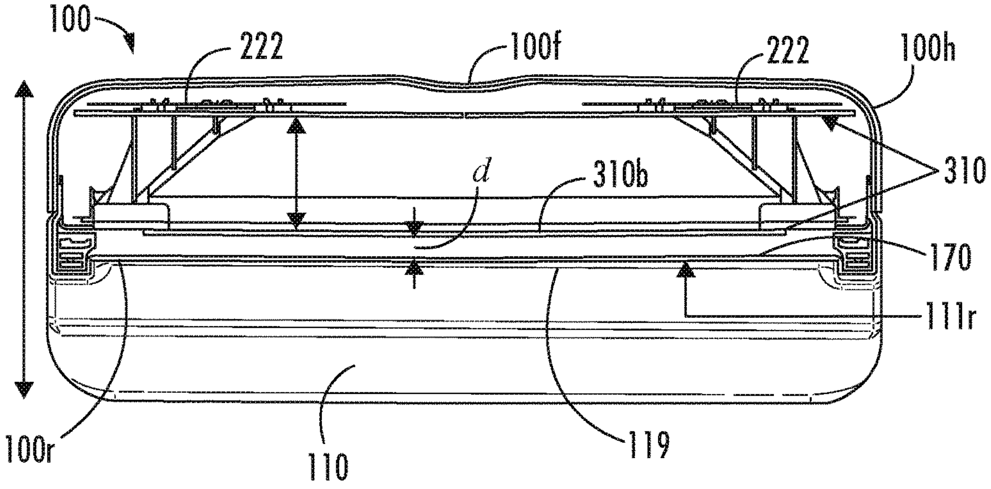
FIG. 39C is a simplified lateral section view of the base station antenna shown in FIGS. 39A/39B according to embodiments of the present invention.

Turning now to FIGS. 39A-39C, as discussed above with respect to 28C, the grid reflector 170 can be provided as a printed circuit board reflector, optionally a flex circuit, that can be attached or coupled to the rear radome 111*r*. The base station antenna 100 can also include at least one back matching layer 310. The at least one matching layer 310 can include at least one back matching layer 310*b* that is positioned behind a primary surface of the primary reflector 214 and in front of the grid reflector 170. The at least one back matching layer 310*b* can reside a distance "d" in front of the rear radome 111*r* and/or grid reflector 170 where "d" is a distance in a range of 0.1 mm to 25 mm, such as about 10-15 mm, and can be at about 10 mm, about 11 mm, and about 12 mm.

Figure 40:
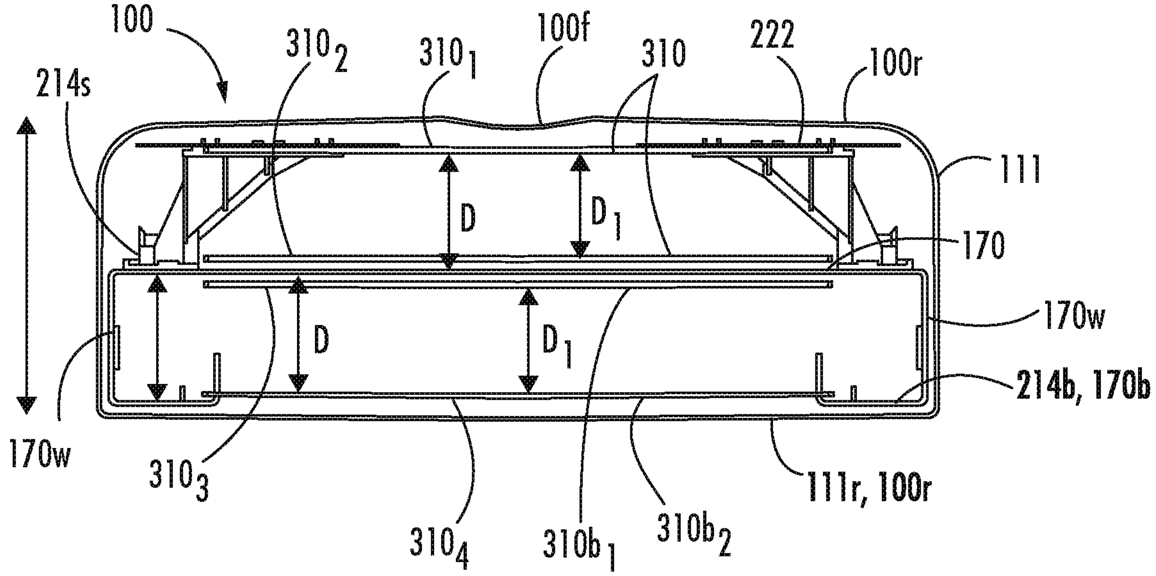
FIG. 40 is a simplified lateral section view of a base station antenna illustrating a matching layer, adjacent the rear radome and in back of a reflector such as a FSS and/or grid reflector, according to embodiments of the present invention.

FIG. 40 illustrates that the base station antenna 100 can comprise at least four matching layers $\mathbf{310}_1$-$\mathbf{310}_4$, stacked in a front to back direction, in the base station antenna housing 100*h*. Two of the matching layers $\mathbf{310}_3$, $\mathbf{310}_4$ can be back matching layers $\mathbf{310}b_1$, $\mathbf{310}b_2$ as shown. The grid reflector 170 can be co-planar with (the primary surface of the) the primary reflector 214. The most rearward back reflector $\mathbf{310}b_2$ can reside adjacent the rear radome 111*r*, typically at a distance of 1-20 mm from the rear radome 111*r*. The two center or medial matching layers $\mathbf{310}_2$, $\mathbf{310}_3$, can be provided on opposing primary surfaces of the grid reflector 170, and in close proximity thereto, such as within about 2-10 mm thereof. The most forward matching layer $\mathbf{310}_1$ and the most rearward matching layer $\mathbf{310}_4$ can be equally spaced at a distance "D" from the grid reflector 170. The most forward matching layer $\mathbf{310}_1$ and the most rearward matching layer $\mathbf{310}_4$ can be equally spaced at a distance DI from the corresponding medial matching layer $\mathbf{310}_2$, $\mathbf{310}_3$, respectively.

The reflector 214 and/or the FSS 170 can have back segments 214*b*, 170*b* that extend rearward of the primary surface 214, 170, respectively, and reside adjacent the rear wall 100*r* and/or rear radome 111*r*.

FIG. 40 also illustrates that the grid reflector 170 can have side walls 170*w* that extend rearward and can also comprise an array of apertures forming an FSS and/or grid reflector surface that can be orthogonal to the front radome 100*f* and/or front FSS surface 170*f*. The side walls 170*w* can be bent metal segments that extends off and behind the front surface 170*f*.

FIGS. 41A-41F illustrate additional example embodiments of stacked first and second reflectors $\mathbf{170}_1$, $\mathbf{170}_2$, spaced apart in a front to back direction of the base station antenna 100. An array of radiating elements 1195 can be positioned behind the first and second reflectors $\mathbf{170}_1$, $\mathbf{170}_2$, typically in an active antenna module 110. The array of radiating elements 1195 can comprise a mMIMO array of radiating elements as discussed hereinabove.

Referring to FIGS. 41C, 41D, 41E and 41F, the first reflector $\mathbf{170}_1$ can include a plurality of spaced apart cutouts 1201. Feed boards 1200 can extend across/along these cutouts 1201 and feed stalks 222*f* can connect a radiating element 222 to a feed board 1200. The feed boards 1200 can reside behind the primary front surface 170*f* of the reflector $\mathbf{170}_1$, in some embodiments and can comprise a conductive (e.g., copper ground plane patterned surface/circuit). The radiating elements 222 can be provided in different configurations and are not limited to the configurations shown.

Figure 41A:
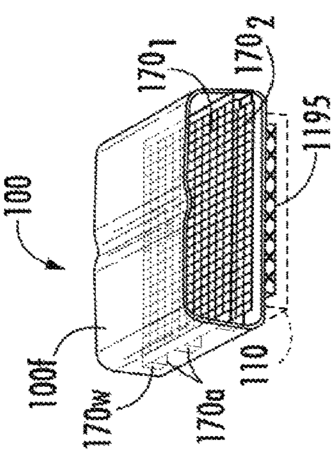
FIGS. 41A-41G are front, side, partially transparent views of portions of a base station antenna showing examples of stacked reflector configurations according to embodiments of the present invention.
Figure 41B:
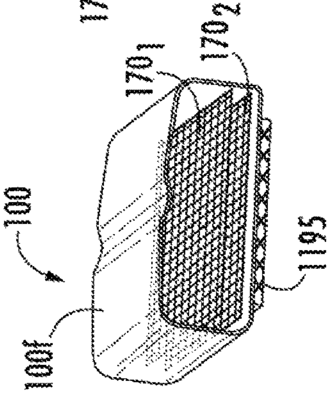
Figure 41C:
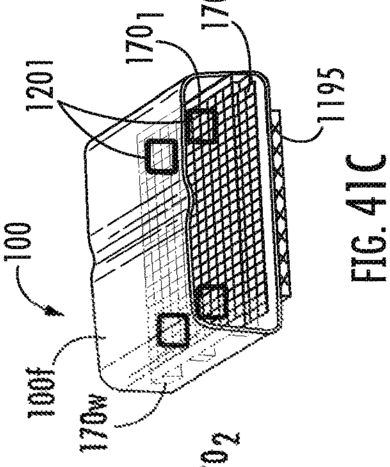
Figure 41D:
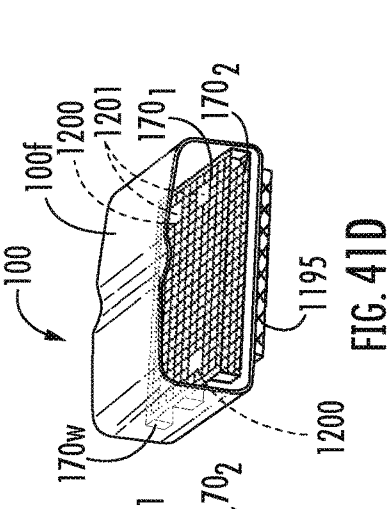
Figure 41E:
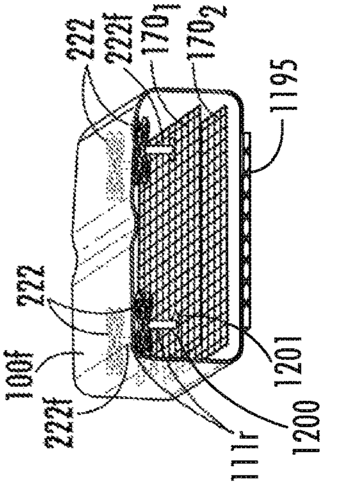
Figure 41F:
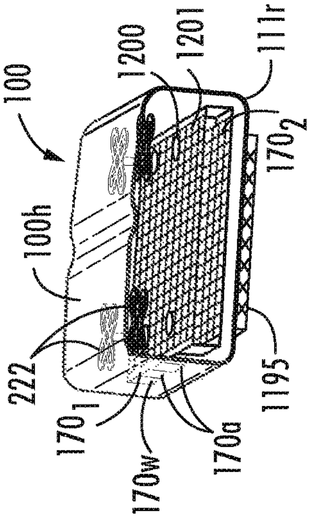
Figure 41G:
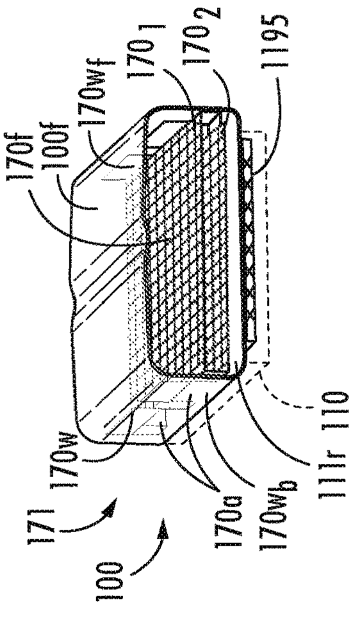

FIGS. 41A, 41F, 41G illustrate that at least one of the first and second reflectors $\mathbf{170}_1$, $\mathbf{170}_2$ can have a rearwardly extending portion defining at least a portion of a side wall 170*w*. A respective side wall 170*w* can be metal or provided as a printed circuit board or combinations thereof. The side walls 170*w* can be a bent portion of one or more of the first and second reflectors $\mathbf{170}_1$, $\mathbf{170}_2$. The side walls 170*w* can provide structural support for the reflector(s) 170 and/or radiating elements 222 mounted thereto. The side walls 170*w* may also or alternatively be configured to improve a radiation pattern provided by one or more of the radiating elements 222 and/or radiating elements 1195 in front of and/or behind the reflector(s) $\mathbf{170}_1$, $\mathbf{170}_2$.

The first/front reflector $\mathbf{170}_1$ can be at a common plane with the primary reflector 214 (a front to back position that is aligned with the primary reflector 214).

One or both of the first and second reflectors $\mathbf{170}_1$, $\mathbf{170}_2$ can be configured so that the grid pattern extends across an entire lateral extent thereof. In other embodiments, the grid pattern may terminate at feed boards 1200 or solid metal surfaces thereof or coupled thereto.

FIGS. 41B, 41E illustrate that the first and second reflectors $\mathbf{170}_1$, $\mathbf{170}_2$ can be provided without a bent side. One or both of the reflectors $\mathbf{170}_1$, $\mathbf{170}_2$ can couple to internal mounting structures such as laterally extending and/or longitudinally rails to position them in alignment and in position in the base station antenna 100, for example. One or both of the first and second reflectors $\mathbf{170}_1$, $\mathbf{170}_2$ can be coupled to a radome or surface of a housing provided by the base station antenna 100.

Referring to FIGS. 41A, 41F, and 41G, the side walls 170*w* may be solid metal (e.g., solid sheet metal) or may have apertures 170*a* or cutouts extending between strip segments extending rearward and/or forward of the front primary surface 170*f* of the grid reflector 170.

As is also shown in FIG. 41G, the side walls 170*w* can extend both forwardly and rearwardly of the front surface 170*f* of the first and/or second grid reflector $\mathbf{170}_1$, $\mathbf{170}_2$, shown as extending forwardly and rearwardly of the front/first reflector $\mathbf{170}_1$, orthogonal thereto. At least part of the side walls 170*w* can be formed by bending a segment of sheet metal forming the grid reflector 170 forward and/or rearward.

At least part of the side walls 170*w* can be provided by a metal grid or otherwise configured to provide an isolation surface/wall or an FSS, e.g., metal, metallized, or provided as a frequency selective surface/substrate.

As shown in FIG. 41G, the side wall(s) 170*w* can have a front segment 170*wf* that extends forward of the front of the reflector 170*f*. The side wall(s) 170*w* can also have a rear/back segment 170*wb* that extends behind the front segment with the front of the reflector extending laterally therebetween. The front segment 170*wf* can have a different configuration from the back segment 170*wb*. The front segment 170*wf* can be solid metal or formed of an FSS, in some embodiments. The rear/back segment 170*wb* can be solid, have apertures 170*a* and/or a grid pattern 171.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a first frequency selective surface (FSS);

a second FSS residing behind the first FSS; and an active antenna unit residing behind the first FSS, wherein the first FSS comprises a grid of unit cells with a first subset of the unit cells tuned for blocking and/or reflecting RF energy in a first frequency band while allowing RF energy in a second frequency band to propagate therethrough, wherein the first FSS further comprises a second subset of the unit cells tuned for blocking and/or reflecting RF energy in the first frequency band and RF energy in a third frequency band, and wherein the third frequency band comprises frequencies between the first and second frequency bands.

2. The base station antenna of claim 1, wherein the first FSS has a first primary surface and the second FSS has a second primary surface, and wherein the first and second primary surfaces are parallel to each other.

3. The base station antenna of claim 1, further comprising a first plurality of radiating elements residing in front of the first FSS and a second plurality of radiating elements residing behind the first FSS and behind the second FSS.

4. The base station antenna of claim 3, wherein the first plurality of radiating elements operate in the first frequency band and the second plurality of radiating elements operate in the second frequency band, and wherein the second plurality of radiating elements reside in the active antenna unit.

5. The base station antenna of claim 1, wherein at least one of the first FSS and/or the second FSS comprises a pattern of unit cells provided by conductive patches in or on a dielectric substrate.

6. The base station antenna of claim 3, wherein the first FSS and the second FSS are configured to allow RF energy in the second frequency band to propagate therethrough.

7. The base station antenna of claim 1, wherein the second FSS is directly attached to a radome.

8. The base station antenna of claim 1, further comprising a primary reflector, wherein the first FSS is parallel to or co-planar with the primary reflector, and the first FSS has a shorter length than the primary reflector.

9. The base station antenna of claim 1, wherein the first FSS is attached to a primary reflector.

10. The base station antenna of claim 1, wherein the first FSS has a three-dimensional shape.

11. The base station antenna of claim 10, wherein the first FSS comprises laterally spaced apart right side and left side portions that extend longitudinally, wherein the right and left side portions define corners with orthogonal wall segments defining portions of the first FSS.

12. The base station antenna of claim 1, further comprising at least one matching layer behind the first FSS.

13. The base station antenna of claim 12, further comprising at least one matching layer in front of the first FSS.

14. The base station antenna of claim 1, wherein the first subset of the unit cells are positioned at an upper portion of the base station antenna, and wherein the second subset of the unit cells comprise unit cells that are to the right side of the first subset of the unit cells and also comprises unit cells that are to the left side of the first subset of the unit cells.

15. A base station antenna, comprising:

a first frequency selective surface (FSS);

a second FSS residing behind the first FSS;

a first column of radiating elements and a laterally spaced apart second column of radiating elements, both the first column and the second column positioned to be forward of the first FSS; and an active antenna unit residing behind the second FSS, wherein the first FSS comprises a pattern of unit cells in sheet metal and merges into or is coupled to a primary reflector positioned below the first FSS in a longitudinal direction, and wherein the first column and the second column of radiating elements include some radiating elements that are in front of the primary reflector below the first FSS and some that are in front of the first FSS.

16. The base station antenna of claim 15, further comprising at least one matching layer in front of the first FSS.

17. The base station antenna of claim 15, wherein the at least one matching layer in front of the first FSS resides behind dipole arms of at least some of the radiating elements of the first and second columns of radiating elements.

18. A base station antenna, comprising:

a first frequency selective surface (FSS);

a second FSS residing behind the first FSS; and an active antenna unit residing behind the first FSS, wherein the radome is a rear radome of the base station antenna, wherein the second FSS is attached to an internal facing surface of a rear radome, and wherein the rear radome cooperates with the first FSS for dielectric loading thereof.

19. A base station antenna, comprising:

a first frequency selective surface (FSS);

a second FSS residing behind the first FSS;

an active antenna residing behind the first FSS;

a first plurality of radiating elements residing in front of the first FSS; and a second plurality of radiating elements held in an active antenna unit and residing behind the first FSS and behind the second FSS, wherein the first FSS comprises a grid of unit cells, wherein the grid of unit cells is configured to pass RF energy in the second frequency band and is also configured to absorb and/or reflect at least one of RF energy in the first frequency band and RF energy in a third frequency band, and wherein the third frequency band encompasses frequencies between the first and second frequency bands.

20. The base station antenna of claim 19, further comprising at least one matching layer in front of the first FSS and at least one matching layer in back of the first FSS.

* * * * *